United States Patent
Hayes et al.

(10) Patent No.: US 8,943,701 B2
(45) Date of Patent: *Feb. 3, 2015

(54) AUTOMATED LAYOUT AND POINT TRANSFER SYSTEM

(75) Inventors: James N. Hayes, Urbana, OH (US);
Chris W. Snyder, Union City, OH (US);
Kevin M. Morrissey, Xenia, OH (US);
Ayman Hajmousa, Dayton, OH (US);
Brandon Scott Bayer, Troy, OH (US);
Eric Keith Unger, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/450,769

(22) Filed: Apr. 19, 2012

(65) Prior Publication Data
US 2012/0203502 A1 Aug. 9, 2012

Related U.S. Application Data

(63) Continuation-in-part of application No. 13/287,028, filed on Nov. 1, 2011, now Pat. No. 8,281,495, which is a continuation of application No. 12/824,716, filed on Jun. 28, 2010, now Pat. No. 8,087,176.

(51) Int. Cl.
*G01C 15/02* (2006.01)
*G01B 11/27* (2006.01)
*G01C 15/00* (2006.01)
*G01S 17/87* (2006.01)
*G01S 17/89* (2006.01)
*G01S 7/481* (2006.01)

(52) U.S. Cl.
CPC ............... *G01C 15/002* (2013.01); *G01S 17/87* (2013.01); *G01S 17/89* (2013.01); *G01S 7/481* (2013.01)
USPC .................................. 33/280; 33/1 G; 33/286

(58) Field of Classification Search
CPC .............................. G01C 15/006; G01C 15/06
USPC ............................................ 33/280, 1 G, 286
See application file for complete search history.

(56) References Cited

U.S. PATENT DOCUMENTS

| | | | |
|---|---|---|---|
| 4,029,415 A * | 6/1977 | Johnson | 356/4.08 |
| 4,598,481 A | 7/1986 | Donahue | |
| 4,820,041 A | 4/1989 | Davidson | |
| 4,836,671 A | 6/1989 | Bautista | |
| 5,076,690 A | 12/1991 | deVos | |
| 5,100,202 A | 3/1992 | Hughes | |
| 5,100,229 A | 3/1992 | Lundberg | |
| 5,137,354 A | 8/1992 | deVos | |
| 5,272,814 A * | 12/1993 | Key | 33/290 |
| 5,294,970 A | 3/1994 | Dornbusch | |

(Continued)

*Primary Examiner* — Christopher Fulton
(74) *Attorney, Agent, or Firm* — Frederick H. Gribbell; Aaron S. Brodsky

(57) ABSTRACT

A two-dimension layout system identifies points and their coordinates, and transfers identified points on a solid surface to other surfaces in a vertical direction. Two leveling laser light transmitters are used with a remote unit to control certain functions. The laser transmitters rotate about the azimuth, and emit vertical (plumb) laser planes. After being set up using benchmark points, the projected lines of the laser planes will intersect on the floor of a jobsite at any point of interest in a virtual floor plan, under control of a user with the remote unit. An "active target" can be used to more automatically create benchmarks. A laser distance meter can be installed on base units to automatically scan a room or a wall to determine certain key features.

28 Claims, 43 Drawing Sheets

(56) References Cited

U.S. PATENT DOCUMENTS

| | | |
|---|---|---|
| 5,579,102 A | 11/1996 | Pratt |
| 5,598,269 A | 1/1997 | Kitaevich |
| 6,140,957 A | 10/2000 | Wilson |
| 6,501,543 B2 | 12/2002 | Hedges |
| 6,545,751 B2 | 4/2003 | Beliveau |
| 7,110,092 B2 | 9/2006 | Kasper |
| 7,148,958 B2 * | 12/2006 | Ohtomo et al. ............ 356/141.3 |
| 7,644,505 B2 * | 1/2010 | Zeng et al. ...................... 33/293 |
| 7,992,310 B2 * | 8/2011 | Litvin et al. ...................... 33/286 |
| 8,087,176 B1 * | 1/2012 | Hayes et al. ...................... 33/280 |
| 8,269,984 B2 * | 9/2012 | Hinderling et al. ........... 356/614 |
| 8,281,495 B2 * | 10/2012 | Hayes et al. ...................... 33/280 |
| 8,307,562 B2 * | 11/2012 | Bascom et al. .................. 33/286 |
| 8,553,212 B2 * | 10/2013 | Jaeger et al. ................... 356/138 |
| 8,595,946 B2 * | 12/2013 | Hayes et al. ...................... 33/280 |
| 2012/0186088 A1 * | 7/2012 | Amor .............................. 33/228 |
| 2012/0198711 A1 * | 8/2012 | Hayes .............................. 33/228 |

\* cited by examiner

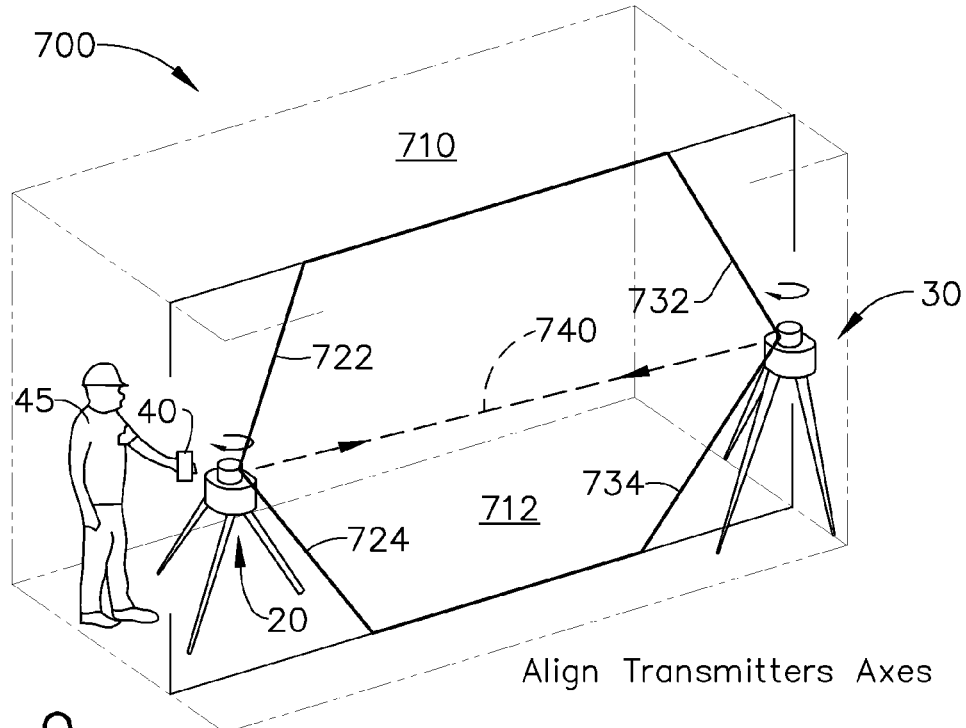
FIG. 9  Align Transmitters Axes
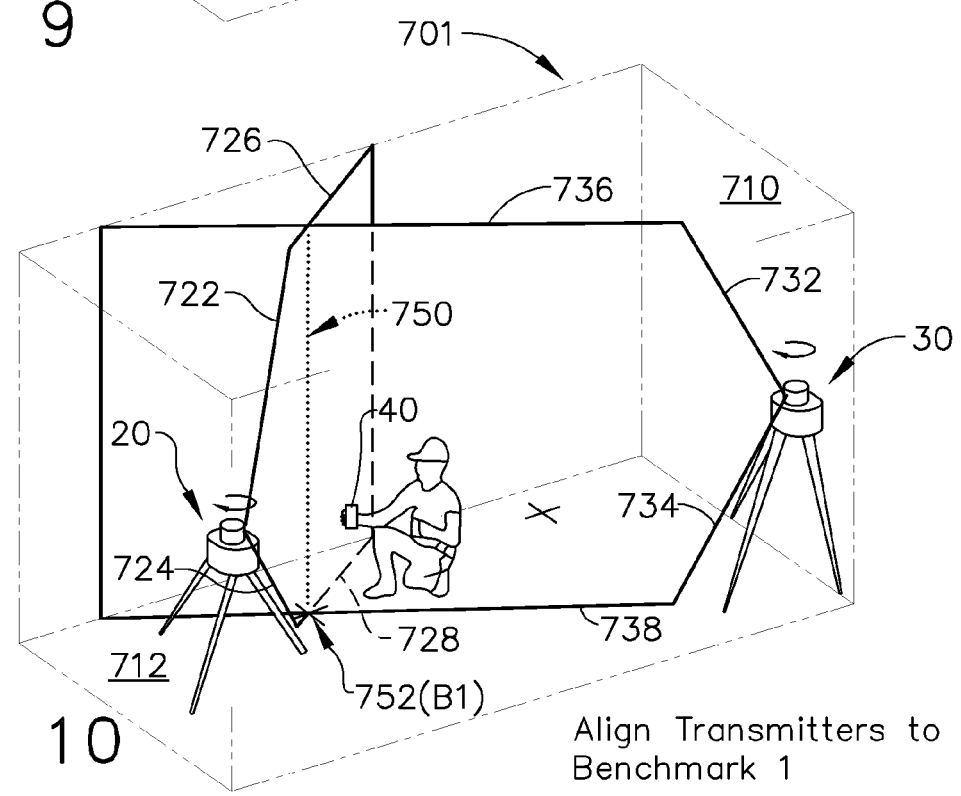
FIG. 10  Align Transmitters to Benchmark 1

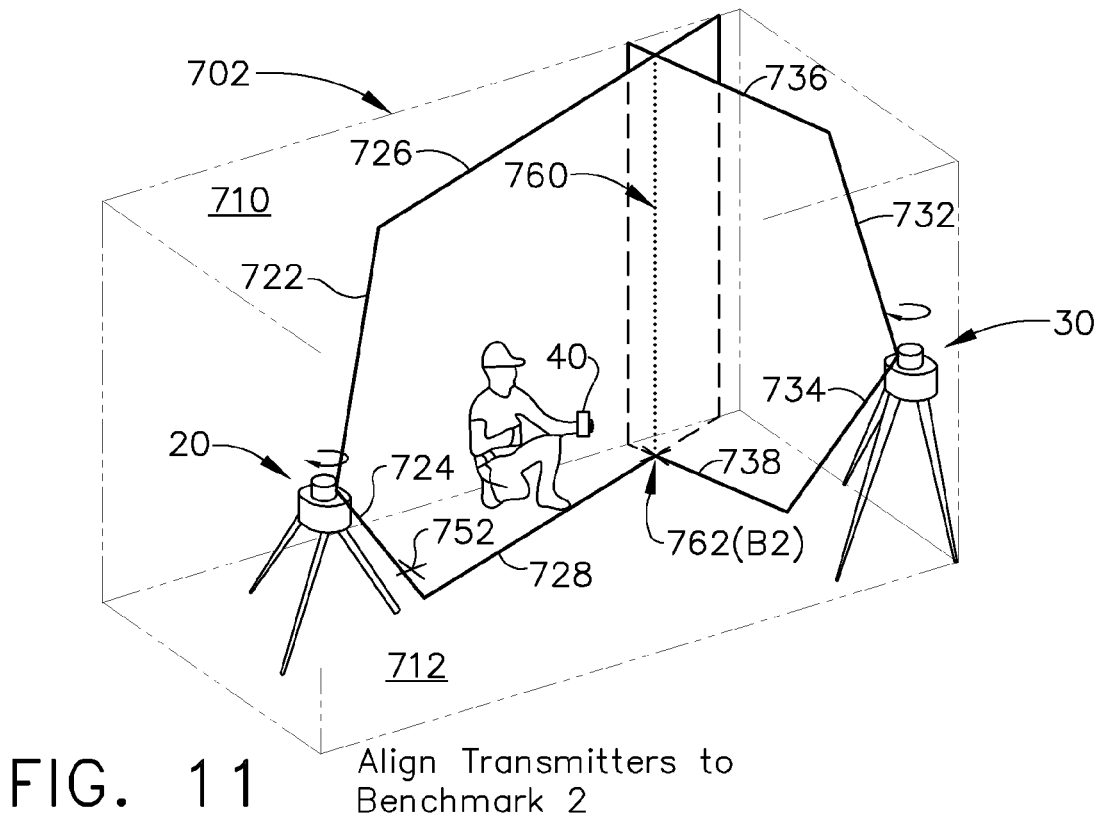
FIG. 11    Align Transmitters to Benchmark 2
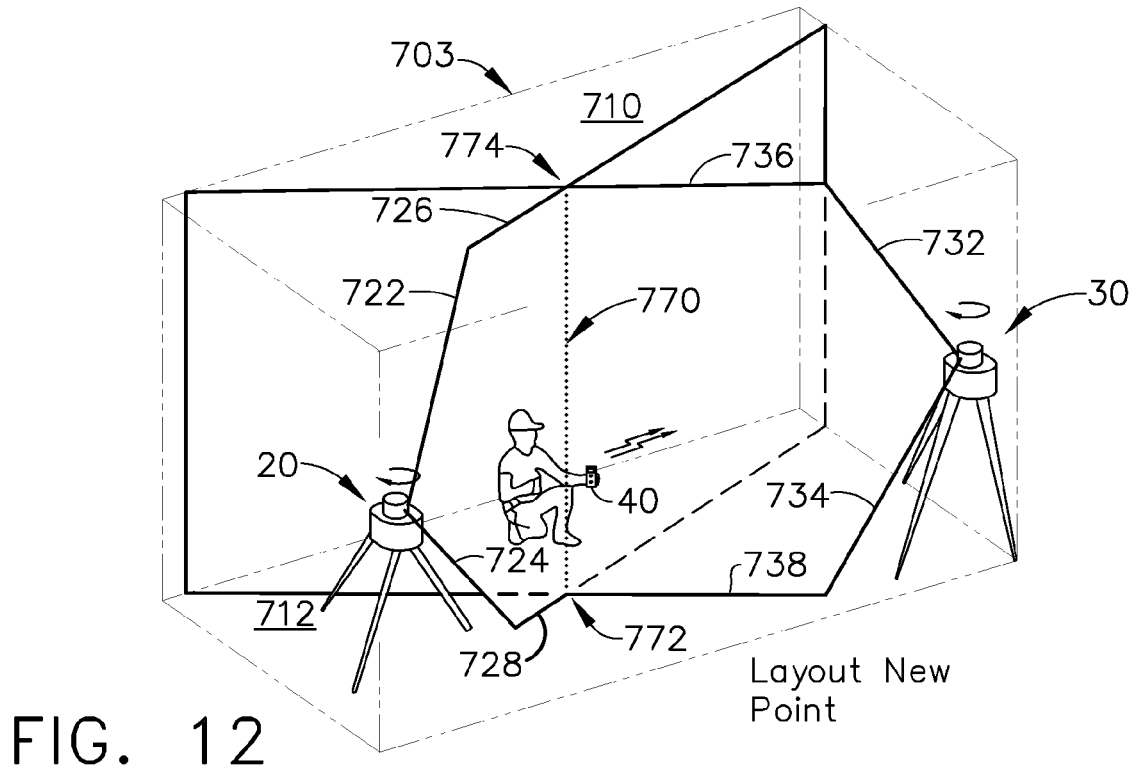
FIG. 12    Layout New Point

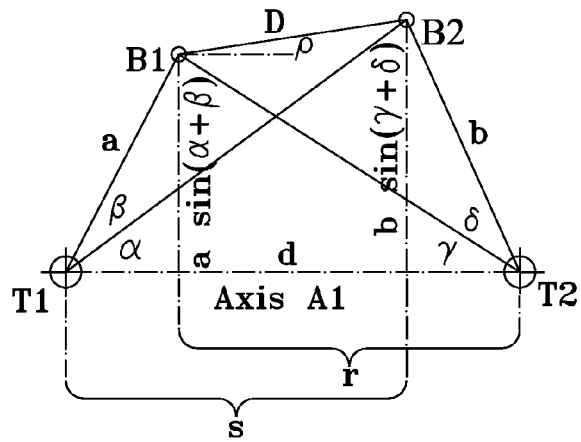
FIG. 22   Set Up Diagram
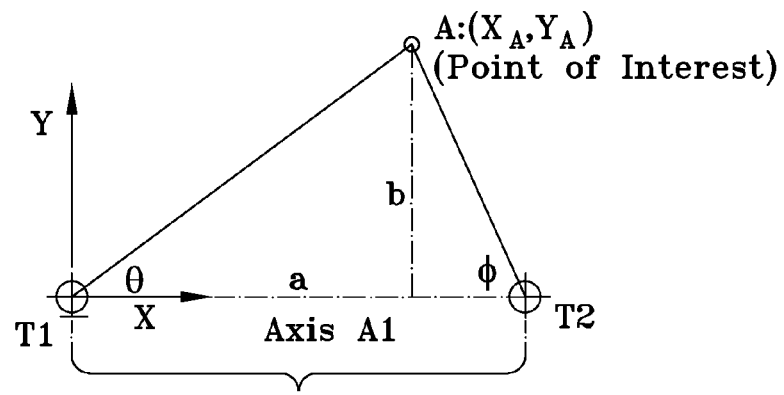
FIG. 23   Locate Point of Interest Diagram
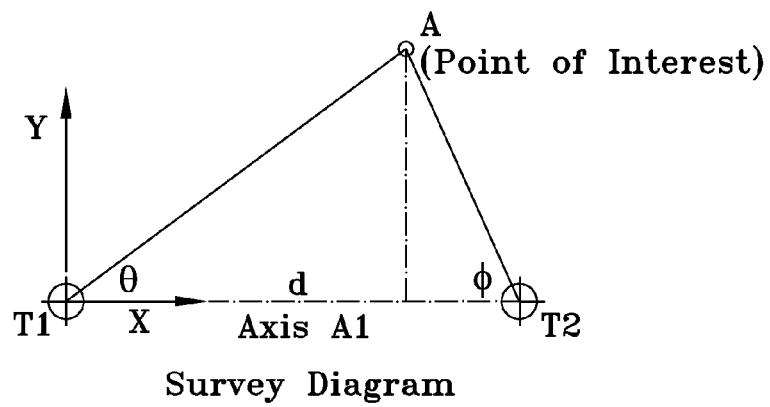
Survey Diagram
FIG. 24

AUTOMATED LAYOUT AND POINT TRANSFER SYSTEM

CROSS-REFERENCE TO RELATED APPLICATIONS

The present application is a continuation-in-part of application Ser. No. 13/287,028, titled "TWO DIMENSION LAYOUT AND POINT TRANSFER SYSTEM," filed on Nov. 1, 2011, now U.S. Pat. No. 8,281,495, which is a continuation of application Ser. No. 12/824,716, titled "TWO DIMENSION LAYOUT AND POINT TRANSFER SYSTEM," filed on Jun. 28, 2010, now U.S. Pat. No. 8,087,176.

TECHNICAL FIELD

The technology disclosed herein relates generally to layout "surveying" equipment and is particularly directed to a two-dimension layout system of the type which identifies points and their coordinates, and transfers identified points on a surface to other surfaces in a vertical direction. Embodiments are specifically disclosed using two laser light transmitters with a remote unit to control certain functions. The laser transmitters may be identical. Preferably the laser transmitters include a self-leveling capability, and exhibit a rotation about the azimuth, and a vertical (plumb) laser plane (or rotating line) output. When the system is set up it is capable of aiming (by rotation) each of the vertical (laser light) plane outputs from the transmitters (which are positioned at some distance apart), so that the projected lines (of the laser light planes) will cross on the surface at any given desired point on the jobsite. In addition, the extent (divergence) of the projected laser light planes are such that they also cross overhead on the ceiling, which crossing point occurs at a location that is truly plumb above the corresponding crossing point on the surface. A further feature of the system provides an "implied" plumb line that is projected in space, and is represented by the intersection of the two planes between the point intersections on the surface and the ceiling. This implied plumb line is visible if a solid surface (or perhaps smoke) is placed in the volumetric space where the plumb line is projected. The system includes a methodology for simplified layout and direct point transfer to the ceiling.

The laser transmitters are mounted on base units that are placed on the floor surface of a construction jobsite, and vertical laser planes can be aimed at user-selected points of interest (e.g., corners of an enclosed space or room), and benchmarks can be established at those points of interested on a virtual floor plan. Alternatively, a rod of a known, fixed length can be placed on the floor surface, and the vertical laser planes emitted by the base units can be aimed at the ends of that fixed rod, and benchmarks can be established at those positions. Once the alignment axis between the base units is known, and the base unit azimuth angles to each rod end are known, and the physical length of the rod is entered into a virtual floor plan, then the entire virtual floor plan can be automatically scaled to the true dimensions of the jobsite.

An active target having a wireless transmitter and an omni-directional optical sensor can be placed on the same floor surface as the two base units of a construction jobsite, and the active target can control the movements of the vertical laser planes emitted by the base units until they both intersect at the omni-directional sensor of the active target. The azimuth angle information aiming at the active target, along with the alignment axis between the base units, can be used to automatically create a benchmark on the jobsite floor. A second active target position can then be established to automatically create a second benchmark on the jobsite floor. The jobsite room can then be scaled for use on a virtual floor plan, and other points of interest can then be located and laid out.

An enhanced capability base unit is provided with a vertical laser plane transmitter and a laser distance measuring device, both mounted on a rotatable platform, and preferably both aiming in the same vertical plane. This equipment allows for even greater automation: a single enhanced capability base unit can scan a given space of a jobsite to determine the dimensions of that space, and to establish benchmarks from user-selected points of interest, such as corners of a room. A virtual floor plan can be generated from that information, and a second base unit can be placed on the same floor surface to establish an alignment axis, and then to locate and lay out other points of interest. A single enhanced capability base unit with a vertical laser plane transmitter and a laser distance measuring device can be used to scan a wall on a jobsite to automatically establish a perpendicular line from the base unit to that wall (of any length). The user can then easily create a perpendicular chalk line on the jobsite floor, and then can readily create multiple parallel chalk lines that will each be perpendicular to that wall. A pair of enhanced capability base units, each with a vertical laser plane transmitter and a laser distance measuring device, can be used to establish benchmarks from user-selected points of interest, such as corners of a room on a jobsite. Once two benchmarks have been established, the entire room dimensions readily can be scaled, and other points of interest then can be located and laid out on a new virtual floor plan.

STATEMENT REGARDING FEDERALLY SPONSORED RESEARCH OR DEVELOPMENT

None.

BACKGROUND

The present invention relates generally to a laser system that provides the elements for visually locating points of interest on a two-dimensional horizontal surface for use in primarily interior construction environments. A simple, accurate and cost effective system for the layout of floor plans at the jobsite has long been in need. Conventional GPS is not usable inside standard steel construction buildings. Previous laser based systems have been overly complex and expensive, missing the mark in almost every area required for this market.

In prior art laser based positioning systems, such as disclosed in U.S. Pat. No. 5,100,229, three or more laser transmitters (beacons) are placed around the perimeter of a work site. Each transmitter emits a plane of light approximately 45 degrees to vertical while continuously rotating at a constant speed. The beams from each transmitter must each have their own unique and highly controlled speed of rotation, or alternatively their own unique modulation frequency, so they may be distinguished from each other. A strobe on each provides a reference signal to start a series of timing events that are ultimately utilized to triangulate position. The system can be used for two-dimensional or three-dimensional applications. The complexity of this method is very high, and the requirement of having constant rotational laser scanning is critical. In addition, it is computationally intensive, especially when setting up the system.

Another prior apparatus, such as disclosed in U.S. Pat. No. 5,076,690, uses a rotating laser beam to scan retro-reflective bar coded targets placed around the perimeter of the job site.

The portable transmitter/receiver utilizes optical collection optics to receive the retro-reflected energy from at least three of the targets. A rotational encoder assumes a relatively constant rotation speed and interpolates between each perimeter slot of the encoder disk a precision azimuth angle for each acquired target. After a set-up procedure that uses at least two known benchmarks, the working field is 'scaled' so that any other point of interest can be found with a two-dimensional working plane. A complex method to precision calibrate and characterize each leading edge of each rotary encoder slot is required to provide the level of precision sought in the construction layout application. Job site obstructions also become a challenge when acquiring sufficient targets in the right place, with respect to the position of the transmitter, to provide a strong calculation of position.

Still another method of laser based positioning is disclosed in U.S. Pat. No. 7,110,092. Two parallel laser beams are emitted at a known distance from each other. The beams are rotated together at a constant speed, thus defining the working plane. A laser receiver is used to determine when each beam becomes incident on the sensing element. Because the rotation of the beams is assumed to be constant, the timing of the two beams incident on the receiver becomes faster at greater distances and thus is a smaller percentage of the time it takes to traverse the entire perimeter. Distance is extrapolated from this information. Further, if an index is provided to indicate the start of rotation of the laser beams, then position can be found. Constant rotation speed is again very critical, and the position calculation for this method typically has not been sufficient accuracy for what is required for typical construction jobsite layout.

Still other laser based methods have been used to provide the construction layout function. Several of them, such as those manufactured and marketed by SL Laser, Leica, and Flexijet, utilize a pointing laser beam that is mounted on a rotating base that can provide azimuth angle and a frame with a rotatable sextant that can provide altitude angle. In this manner a laser beam can be pointed in the direction of a desired point of interest and projected onto a surface. The indicated point location is accurate only if the surface onto which it is projected is both flat and at the theoretically expected elevation. Otherwise serious errors can occur, and become increasingly large as the incident projection angle onto the surface becomes steeper.

It is seen that there remains a need for a more effective positioning system for use in the construction industry and, more specifically, for floor layout indoors. This need encompasses the desire for more simplicity so that its concept of operation and method of use is much more intuitive to the user. Set up of the system should be straightforward and fast. In addition, there is a need to provide a visual system for interior use. Doing so will add to the intuitive nature of the system as well as reduce the overall expense of the system, because the function of automatically detecting an encoded or modulated laser signal is not required. Lastly, there is a need to provide a system where the projection onto a surface is not subject to flatness errors of the incident surface.

SUMMARY

Accordingly, it is an advantage to provide a floor layout system that includes two base units that can have an alignment axis established therebetween, and a remote unit that communicates with both of the base units, in which the system is configured to provide a visual presentation of virtual points on a jobsite physical surface that have predetermined coordinates, relative to locations of at least two benchmark points.

It is another advantage to provide a base unit that has a laser transmitter having an optical emission that creates a vertical laser light plane, a laser receiver with a null position-detecting capability, in which the receiver is mounted to detect laser light offsets in the horizontal direction, and a leveling mechanism.

It is yet another advantage to provide a remote unit that has a computer processing circuit and a memory circuit, along with a communication circuit that can communicate to at least one base unit of a floor layout system, in which the remote unit also has a display and a user controlled input device; the remote unit also is in communication with a virtual building plan, and its display is capable of depicting at least two benchmark points and at least one known virtual point that is to be visually indicated on a jobsite physical surface.

It is still another advantage to provide a method for setting up a floor layout system, in which the system includes two base units each having a laser transmitter, wherein a user will perform certain functions on a jobsite, including: (a) positioning the two base units on a jobsite floor, (b) aligning the two laser transmitters of both base units to create an alignment axis, (c) locating two benchmark points with intersecting laser light from the two laser transmitters, and (d) determining azimuth angles of the two laser transmitters for those benchmark points.

It is a further advantage to provide a method for using a floor layout system having "known" points of a building plan, in which the system includes two base units each with a laser transmitter, and including a remote unit that is in communication with the base units; wherein a user performs certain functions, including: (a) positioning the two laser transmitters of the base units on a jobsite floor to establish an alignment axis therebetween, (b) providing a virtual jobsite floor plan, (c) determining coordinates of two benchmark points of the virtual floor plan and determining azimuth angles of the two laser transmitters corresponding to those benchmark points, (d) entering coordinates for a point of interest on the virtual floor plan, and slewing the two laser transmitters to those coordinates, and (e) visually indicating the physical point of interest on the jobsite floor, by use the laser light lines produced by the laser transmitters.

It is yet a further advantage to provide a method for using a floor layout system to enter "unknown" points of a jobsite into a virtual floor plan, in which a system has two base units each with a laser transmitter, and a remote unit that is in communication with the base units; wherein a user performs certain functions, including: (a) positioning the two laser transmitters of the base units on a jobsite floor to establish an alignment axis therebetween, (b) providing a virtual jobsite floor plan, (c) determining coordinates of two benchmark points of the virtual floor plan and determining azimuth angles of the two laser transmitters corresponding to those benchmark points, (d) selecting an "unknown" physical point of interest on the jobsite floor, (e) slewing the two laser transmitters so that they create visible intersecting light lines at that physical point of interest, (f) entering the azimuth angles for the two laser transmitters to determine the corresponding coordinates of that point of interest on the remote unit, and (g) using reverse calculations, plotting that physical point of interest on the virtual floor plan of the remote unit.

It is still another advantage to provide a method for using a floor layout system to create benchmarks for a virtual floor plan, based on certain points of interest, in which a system has two base units each with a laser transmitter and a remote unit that is in communication with the base units; wherein the user establishes an alignment axis between the two base units, and then aims both base units at a first point of interest, such as a corner, and records the azimuth angle information; the user then aims both base units at a second point of interest and records those azimuth angles; the user then measures the actual distance between those two points of interest, and scales the data for the virtual floor plan to be created, thereby establishing the benchmarks for the physical system.

It is a yet further advantage to provide a method for using a floor layout system to create benchmarks on a jobsite, using an active target to establish benchmark positions for a virtual floor plan.

It is still a further advantage to provide an active target apparatus which includes an automatic processing circuit with instructions to automatically communicate to at least one base unit using a wireless transmitter, and which includes an omni-directional photosensor with an appropriate gain and demodulation interface to detect laser light that strikes the photosensor, and which can send instructions to the base units to slew their laser fan beam transmitters back and forth until the fan beams are centered on the omni-directional sensor of the active target.

It is another advantage to provide a method for using a floor layout system to establish benchmarks on a jobsite for creating a virtual floor plan, in which two base units each with a laser transmitter are used to create an alignment axis, and then to establish the end point positions of a rod of fixed length that is placed on the floor of a jobsite, and then to record the azimuth angles to establish the exact angular positions of the fixed rod, and then to scale the system on a virtual floor plan into the physical distances of the actual jobsite.

It is still another advantage to provide a base unit that has a laser transmitter with an optical emission to create a vertical laser light plane, a laser receiver with a null position-detecting capability, a leveling mechanism, and a distance measuring device that can be aimed along the same vertical plane as the laser transmitter.

It is a further advantage to provide a method for using a floor layout system on an existing space that has no initial virtual floor plan by placing a base unit with a laser transmitter that acts as a distance measuring device, and to automatically scan the entire space for the distances to each of the vertical surfaces in that space while recording the azimuth angles and distances between the base unit and the target vertical surfaces, and to then establish benchmarks based on that information.

It is yet a further advantage to provide a method for using a floor layout system in which the system includes a base unit having a laser transmitter to create a vertical fan beam, a remote unit that is in communication with the base unit, and providing a distance measuring device on the base unit for establishing a precise distance between the base unit and a vertical target in the space; wherein a user uses the base unit to establish multiple distances at corresponding azimuth angles between one of the walls of the space and the base unit, to slew in a horizontal plane the distance measuring device so that it can find a shortest distance to the wall surface, and establish that as the perpendicular line to that wall, thereby squaring up a vertical plane from the base unit to the wall using the distance measuring device.

It is still a further advantage to provide a method for using a floor layout system on a jobsite having a space with no initial virtual floor plan, in which the system includes two base units each with a laser transmitter, and at least one transmitter including a distance measuring device, and including a remote unit that is in communication with the base units; wherein the user establishes an alignment axis between the base units, and then aims the laser transmitters both at the same point of interest on the floor surface to establish a first virtual benchmark, by recording the azimuth angles and the actual distance to that virtual point, which is simplified if the virtual point is along a vertical wall surface; this now becomes a benchmark, and the same methodology can be used by aiming at a second point of interest along a second vertical surface to create a second benchmark; the system can now be scaled to create the virtual floor plan.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a layout and point transfer system is provided, which comprises: (a) a first base unit, having a first laser light transmitter that emits a first laser light plane, and a first processing circuit; and (b) a second base unit, having a second laser light transmitter that emits a second laser light plane, and a second processing circuit; wherein: (c) the system is configured to register locations of the first and second base units on a physical jobsite surface with respect to at least two previously surveyed benchmark points that are also located on the physical jobsite surface; and (d) the system is configured to provide a visual representation of a virtual point on the physical jobsite surface, by aiming first laser light plane and the second laser light plane, to indicate a location of the virtual point.

In accordance with another aspect, a base unit for use in a floor layout and point transfer system is provided, which comprises: a first laser light transmitter that emits a substantially vertical plane of laser light, the first laser light transmitter being rotatable about a substantially vertical axis; a laser light receiver having: a null-position photosensor that is mounted to detect laser light offsets in a substantially horizontal direction, and an amplifier circuit interfacing between the null-position photosensor and the laser light receiver; and a leveling mechanism.

In accordance with yet another aspect a method for setting up a layout and point transfer system is provided, in which the method comprises the following steps: (a) providing a first base unit which includes a first laser light transmitter that emits a first laser light plane; (b) providing a second base unit which includes a second laser light transmitter that emits a second laser light plane; (c) positioning the first base unit and the second base unit at two different locations on a solid surface of a jobsite; (d) determining an alignment axis between the first base unit and the second base unit; (e) aiming the first laser light transmitter and the second laser light transmitter so that a first benchmark point is indicated by intersecting laser light lines along the solid surface, which are produced by the first and second laser light planes; and determining a first set of azimuth angles of the first and second laser light transmitters; (f) aiming the first laser light transmitter and the second laser light transmitter so that a second benchmark point is indicated by intersecting laser light lines along the solid surface, which are produced by the first and second laser light planes; and determining a second set of azimuth angles of the first and second laser light transmitters; and (g) by use of the first and second sets of azimuth angles, determining positions of the first and second base units with respect to the first and second benchmark points.

In accordance with still another aspect, a base unit for use in a layout and point transfer system is provided, which comprises: a laser light transmitter that emits a substantially vertical plane of laser light, the laser light transmitter being rotatable about a substantially vertical axis; a distance measuring device that is rotatable about the substantially vertical axis; a laser light receiver having: a null-position photosensor that is mounted to detect laser light offsets in a substantially horizontal direction, and an amplifier circuit interfacing between the null-position photosensor and the laser light receiver; and a leveling mechanism.

In accordance with a further aspect, a layout and point transfer system is provided, which comprises: (a) a first base unit, having a rotatable first laser light transmitter that emits a first laser light plane, a first communications circuit, and a first processing circuit; and (b) a second base unit, having a rotatable second laser light transmitter that emits a second laser light plane, a second communications circuit, and a second processing circuit; (c) an active target, having an omni-directional laser light sensor, a third communications circuit, and a third processing circuit; wherein: (d) the active target controls aiming of the first and second laser light transmitters so that the first and second laser light planes both become aimed at the omni-directional laser light sensor, for establishing a position of the active target as a benchmark for use by the system.

In accordance with a yet further aspect, a method for setting up a layout and point transfer system is provided, in which the method comprises the following steps: (a) providing a first base unit which includes a first processing circuit, a first communications circuit, a first azimuth angle measuring instrument, a rotatable first laser light transmitter that emits a first laser light plane, and a rotatable first distance measuring device that measures distance to a target; (b) providing a second base unit which includes a second processing circuit, a second communications circuit, a second azimuth angle measuring instrument, and a rotatable second laser light transmitter that emits a second laser light plane; (c) providing a remote unit that includes a third processing circuit, a third communications circuit, a memory circuit, a display, and an input sensing device that allows a user to enter commands to the remote unit, the remote unit being in communication with the first and second base units; (d) positioning the first base unit and the second base unit at two different locations on a solid surface of a jobsite; (e) determining an alignment axis between the first base unit and the second base unit; (f) starting a new virtual jobsite floor plan in the memory circuit of the remote unit, for a field of work at the jobsite; (g) selecting a first physical point on the solid surface of the jobsite and aiming the first laser light transmitter and the second laser light transmitter so that the first physical point is indicated by both laser light lines that are produced by the first and second laser light planes; (h) determining a first set of azimuth angles of the first and second laser light transmitters; (i) determining a first distance between the first physical point and the first distance measuring device; (j) recording the first set of azimuth angles and first distance in the memory circuit of the remote unit, thereby creating a first benchmark for the virtual floor plan stored in the memory circuit; and (k) calculating a second distance between the first and second base units, thereby scaling the field of work.

In accordance with still another aspect, a method for setting up a layout and point transfer system is provided, in which the method comprises the following steps: (a) providing a first base unit which includes a first processing circuit, a first communications circuit, a first azimuth angle measuring instrument, a rotatable first laser light transmitter that emits a first laser light plane, and a rotatable first distance measuring device that measures distance to a target; (b) providing a second base unit which includes a second processing circuit, a second communications circuit, a rotatable second laser light transmitter that emits a second laser light plane, and a rotatable second distance measuring device that measures distance to a target; (c) providing a remote unit that includes a third processing circuit, a third communications circuit, a memory circuit, a display, and an input sensing device that allows a user to enter commands to the remote unit, the remote unit being in communication with the first and second base units; (d) positioning the first base unit and the second base unit at two different locations on a solid surface of a jobsite; (e) determining an alignment axis between the first base unit and the second base unit; (f) starting a new virtual jobsite floor plan in the memory circuit of the remote unit, for a field of work at the jobsite; (g) selecting a first physical point on the solid surface of the jobsite and aiming the first laser light transmitter and the second laser light transmitter so that the first physical point is indicated by both laser light lines that are produced by the first and second laser light planes; (h) determining a first azimuth angle of the first laser light transmitter; (i) determining a first set of distances between the first physical point and the first and second distance measuring devices; (j) recording the first azimuth angle and first set of distances in the memory circuit of the remote unit, thereby creating a first benchmark for the virtual floor plan stored in the memory circuit; and (k) calculating a second distance between the first and second base units, thereby scaling the field of work.

In accordance with a still further aspect, a method for automatically finding a perimeter of a space is provided, in which the method comprises the following steps: (a) providing a first base unit which includes a first processing circuit, a first communications circuit, a first azimuth angle measuring instrument, a rotatable first laser light transmitter that emits a first laser light plane, and a rotatable distance measuring device that measures distance to a target; (b) providing a remote unit that includes a second processing circuit, a second communications circuit, a memory circuit, a display, and an input sensing device that allows a user to enter commands to the remote unit, the remote unit being in communication with the first base unit; (c) positioning the first base unit at a user-selected location on a solid surface of a space on a jobsite; (d) scanning the space by rotating the distance measuring device and recording a plurality of angles and distances to raised surfaces of the jobsite, for a plurality of angular positions; and (e) creating a virtual floor plan in the memory circuit of the remote unit, based upon the plurality of recorded angles and distances.

In accordance with another aspect, a method for determining a perpendicular line up to a wall is provided, in which the method comprises the following steps: (a) providing a base unit which includes a processing circuit, an azimuth angle measuring instrument, a rotatable laser light transmitter that emits a laser light plane, and a rotatable distance measuring device that measures distance to a target; (b) positioning the base unit at a user-selected location on a solid surface of a space on a jobsite; (c) scanning a wall of the space by rotating the distance measuring device and recording a plurality of angles and distances to the wall for a plurality of angular positions; (d) determining two angular positions where a distance to the wall is substantially equal at both the angular positions; and (e) aiming the laser light transmitter at an angular direction that bi-sects the two angular positions, and turning on the laser light transmitter so that it creates a visible laser light line along the solid surface, thereby indicating a visible perpendicular line to the wall.

In accordance with yet another aspect, a method for setting up a layout and point transfer system is provided, in which the method comprises the following steps: (a) providing a first base unit which includes a first processing circuit, a first communications circuit, a first azimuth angle measuring instrument, a rotatable first laser light transmitter that emits a first laser light plane, and a rotatable first distance measuring device that measures distance to a target; (b) providing a second base unit which includes a second processing circuit, a second communications circuit, a second azimuth angle measuring instrument, a rotatable second laser light transmitter that emits a second laser light plane, and a rotatable second distance measuring device that measures distance to a target; (c) providing a remote unit that includes a third processing circuit, a third communications circuit, a memory circuit, a display, and an input sensing device that allows a user to enter commands to the remote unit, the remote unit being in communication with the first and second base units; (d) positioning the first base unit and the second base unit at two different locations on a solid surface of a jobsite; (e) determining an alignment axis between the first base unit and the second base unit; (f) starting a new virtual jobsite floor plan in the memory circuit of the remote unit; (g) selecting a first physical point on at least one raised surface of the jobsite and aiming the first laser light transmitter and the second laser light transmitter so that the first physical point is indicated by both laser light lines that are produced by the first and second laser light planes; determining a first set of azimuth angles of the first and second laser light transmitters; determining a first set of distances between the first physical point and the first and second distance measuring devices; and recording the first set of azimuth angles and first set of distances in the memory circuit of the remote unit, thereby creating a first benchmark for the virtual floor plan stored in the memory circuit; and (h) selecting a second physical point on at least one raised surface of the jobsite and aiming the first laser light transmitter and the second laser light transmitter so that the second physical point is indicated by both laser light lines that are produced by the first and second laser light planes; determining a second set of azimuth angles of the first and second laser light transmitters; determining a second set of distances between the second physical point and the first and second distance measuring devices; and recording the second set of azimuth angles and second set of distances in the memory circuit of the remote unit, thereby creating a second benchmark for the virtual floor plan stored in the memory circuit.

In accordance with still another aspect, a method for setting up a layout and point transfer system is provided, in which the method comprises the following steps: (a) providing a first base unit which includes a first processing circuit, a first communications circuit, a first azimuth angle measuring instrument, and a rotatable first laser light transmitter that emits a first laser light plane; (b) providing a second base unit which includes a second processing circuit, a second communications circuit, a second azimuth angle measuring instrument, and a rotatable second laser light transmitter that emits a second laser light plane; (c) providing a remote unit that includes a third processing circuit, a third communications circuit, a memory circuit, a display, and an input sensing device that allows a user to enter commands to the remote unit, the remote unit being in communication with the first and second base units; (d) providing an active target that includes an omni-directional laser light sensor, a fourth communications circuit, and a fourth processing circuit; (e) positioning the first base unit and the second base unit at two different locations on a solid surface of a jobsite, and positioning the active target at a third location on the solid surface; (f) determining an alignment axis between the first base unit and the second base unit; (g) starting a new virtual jobsite floor plan in the memory circuit of the remote unit; (h) activating the active target; (i) under control of the active target, aiming the first laser light transmitter and the second laser light transmitter so that the omni-directional laser light sensor is impacted by both the first and second laser light planes; determining a first set of azimuth angles of the first and second laser light transmitters; and recording the first set of azimuth angles in the memory circuit of the remote unit, thereby creating a first benchmark for the virtual floor plan stored in the memory circuit; (j) moving the active target to a fourth location on the solid surface; (k) under control of the active target, aiming the first laser light transmitter and the second laser light transmitter so that the omni-directional laser light sensor is impacted by both the first and second laser light planes; determining a second set of azimuth angles of the first and second laser light transmitters; and recording the second set of azimuth angles in the memory circuit of the remote unit, thereby creating a second benchmark for the virtual floor plan stored in the memory circuit; (l) determining an actual distance between the first benchmark and the second benchmark, and recording the actual distance in the memory circuit of the remote unit; and (m) scaling the virtual floor plan to actual dimensions of the jobsite, based upon the actual distance between the first and second benchmarks.

In accordance with a further aspect, a method for setting up a layout and point transfer system is provided, in which the method comprises the following steps: (a) providing a first base unit which includes a first processing circuit, a first communications circuit, a first azimuth angle measuring instrument, and a rotatable first laser light transmitter that emits a first laser light plane; (b) providing a second base unit which includes a second processing circuit, a second communications circuit, a second azimuth angle measuring instrument, and a rotatable second laser light transmitter that emits a second laser light plane; (c) providing a remote unit that includes a third processing circuit, a third communications circuit, a memory circuit, a display, and an input sensing device that allows a user to enter commands to the remote unit, the remote unit being in communication with the first and second base units; (d) providing a first active target that includes a first omni-directional laser light sensor, a fourth communications circuit, and a fourth processing circuit; (e) providing a second active target that includes a second omni-directional laser light sensor, a fifth communications circuit, and a fifth processing circuit; (f) positioning the first base unit and the second base unit at two different locations on a solid surface of a jobsite, positioning the first active target at a third location on the solid surface, and positioning the second active target at a fourth location on the solid surface; (g) determining an alignment axis between the first base unit and the second base unit; (h) starting a new virtual jobsite floor plan in the memory circuit of the remote unit; (i) activating the first active target; (j) under control of the first active target, aiming the first laser light transmitter and the second laser light transmitter so that the first omni-directional laser light sensor is impacted by both the first and second laser light planes; determining a first set of azimuth angles of the first and second laser light transmitters; and recording the first set of azimuth angles in the memory circuit of the remote unit, thereby creating a first benchmark for the virtual floor plan stored in the memory circuit; (k) deactivating the first active target; (l) activating the second active target; (m) under control of the second active target, aiming the first laser light transmitter and the second laser light transmitter so that the second omni-directional laser light sensor is impacted by both the first and second laser light planes; determining a second set of azimuth angles of the first and second laser light transmitters; and recording the second set of azimuth angles in the memory circuit of the remote unit, thereby creating a second benchmark for the virtual floor plan stored in the memory circuit; (n) determining an actual distance between the first benchmark and the second benchmark, and recording the actual distance in the memory circuit of the remote unit; and (o) scaling the virtual floor plan to actual dimensions of the jobsite, based upon the actual distance between the first and second benchmarks.

In accordance with a yet further aspect, a method for setting up a layout and point transfer system is provided, in which the method comprises the following steps: (a) providing a first base unit which includes a first processing circuit, a first communications circuit, a first azimuth angle measuring instrument, and a rotatable first laser light transmitter that emits a first laser light plane; (b) providing a second base unit which includes a second processing circuit, a second communications circuit, a second azimuth angle measuring instrument, and a rotatable second laser light transmitter that emits a second laser light plane; (c) providing a remote unit that includes a third processing circuit, a third communications circuit, a memory circuit, a display, and an input sensing device that allows a user to enter commands to the remote unit, the remote unit being in communication with the first and second base units; (d) providing a fixed-length rod, the rod having a first indicia proximal to a first end and a second indicia proximal to a second, opposite end along a longitudinal axis, the rod having a known actual length between the first and second indicia; (e) positioning the first base unit and the second base unit at two different locations on a solid surface of a jobsite, and positioning the fixed-length rod at a third location on the solid surface; (f) determining an alignment axis between the first base unit and the second base unit; (g) starting a new virtual jobsite floor plan in the memory circuit of the remote unit; (h) aiming the first laser light transmitter and the second laser light transmitter so that the first indicia of the rod is indicated by intersecting laser light lines that are produced by the first and second laser light planes; determining a first set of azimuth angles of the first and second laser light transmitters; and recording the first set of azimuth angles in the memory circuit of the remote unit, and thereby creating a first benchmark for the virtual floor plan stored in the memory circuit; (i) aiming the first laser light transmitter and the second laser light transmitter so that the second indicia of the rod is indicated by intersecting laser light lines that are produced by the first and second laser light planes; determining a second set of azimuth angles of the first and second laser light transmitters; and recording the second set of azimuth angles in the memory circuit of the remote unit, and thereby creating a second benchmark for the virtual floor plan stored in the memory circuit; and (j) scaling the virtual floor plan to the known actual length, which represents the physical distance between the first and second benchmarks.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIGS. 9-13 are diagrammatic views of how a human user would use the system of FIG. 1, first to align a pair of transmitter axes, then to align the transmitters to two different benchmark points, then to align the laser planes to a floor point, and finally to align the laser planes along a plumb line of a wall surface.

FIG. 22 is a diagram showing positions of physical points and angles involved in a set-up routine.

FIG. 23 is a diagram showing positions of physical points and angles involved in a routine for locating a known point of interest.

FIG. 24 is a diagram showing positions of physical points and angles involved in a routine for entering an unknown point of interest.

DETAILED DESCRIPTION

Figure 1:
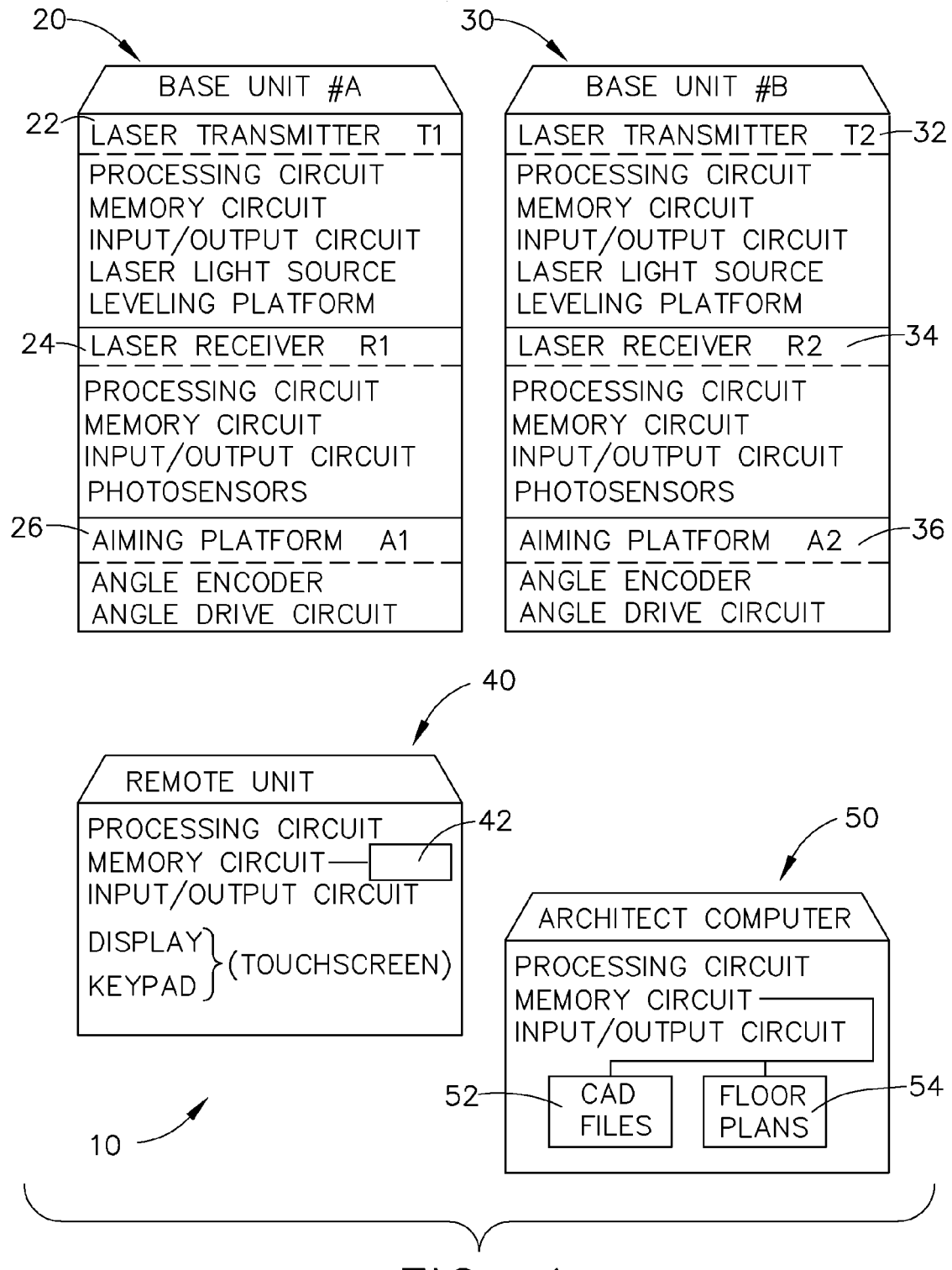
FIG. 1 is a block diagram of the major components of a layout and point transfer system, as constructed according the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

System Set-Up; Introduction

It is assumed that there exists at least two known points (also sometimes referred to as "benchmarks" herein) on the jobsite which can be utilized for the setting up the system. These benchmark points would have been established from previous survey efforts. FIGS. 9-11 illustrate a basic example of how the system can be set up. A first step (see FIG. 9) illustrates an alignment of the transmitters' output vertical planes to each other with the use of an RF (radio frequency) remote unit. This establishes an axis between the centerlines of each transmitter "base unit" device and indexes the angular encoders to that. This process can be performed by visually aligning the transmitter planes to each other, but may be facilitated with the addition of a split photocell or omni-directional sensor on the transmitter base units that would guide and lock into place the respective planes, adding convenience and precision to the process.

A second step (see FIG. 10) illustrates the establishment of the first known benchmark. The vertical planes from each transmitter base unit are commanded to position over the point of interest by the handheld radio remote unit, and then their coordinates are entered. The second known benchmark is entered in a similar manner, in a third step (as illustrated in FIG. 11). After this third step, the remote unit's computer system has sufficient set-up information to calculate the location and "find" any other point of interest within the working area. The above example steps will be discussed below, in greater detail.

Finding a "Known" Point; Introduction

FIG. 12 illustrates a basic configuration of laser transmitters and output laser plane configurations for a system that was previously set-up. The vertical laser light planes emitted by the base unit laser transmitters can be visible red laser light; however, other light wavelengths could be used instead, such as infrared, green, or other light wavelengths as well. For many of the applications using this system, it will be preferable for the laser light to be of a visible wavelength, and the description hereinbelow will assume that is the case.

The laser planes emanate from the two laser transmitters' rotors, which have capability of rotation about the vertical instrument axis. This allows each laser transmitter the ability to position its visible vertical plane at any angle about its rotation axis, and then to hold static at that position. The laser transmitters are located at a distance (not necessarily known) from each other; in this example, they are positioned near each corner of the room. As can be seen from FIG. 12, a first point is formed on the floor at the intersection of the two laser planes. In addition, a second point is formed on the ceiling, above the first point on the floor. If the two laser planes are truly vertical with respect to gravity, then the point on the ceiling is in a location that is plumbed over the point on the floor. Another interesting aspect is the formation of an implied plumb line where the two laser planes intersect.

When the system is set up on a jobsite, the laser planes can be commanded to rotate into position so that the intersection identifies any point of interest (on the floor or ceiling) that the user chooses. This is accomplished via the remote unit (using, for example, a radio link or an IR link) that communicates with the two base unit laser transmitters, thereby allowing the user mobility throughout the room and enabling him/her to be at the physical location where the layout work is being performed.

Figure 13:
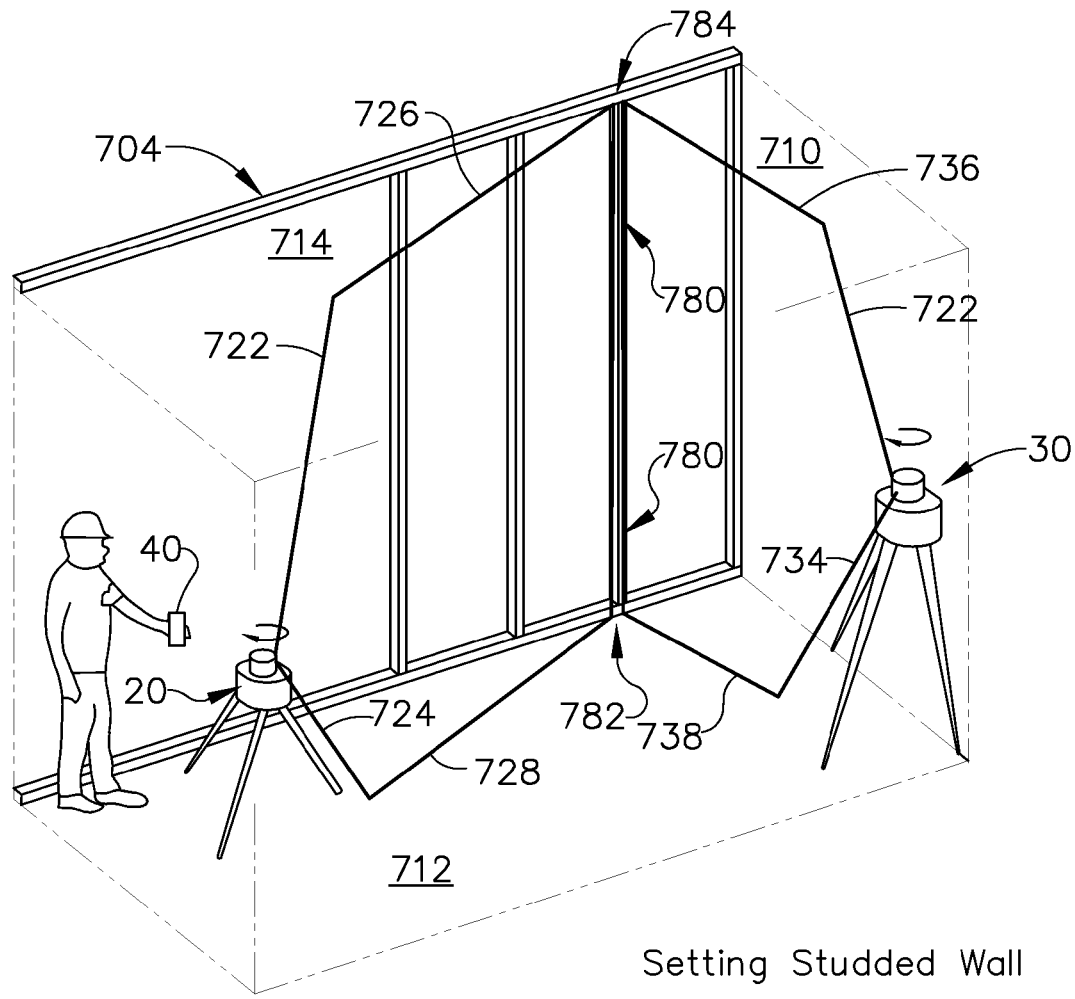

Once the set-up is completed the user may enter coordinates of interest into the handheld remote unit. When this occurs each vertical laser plane can be commanded to slew into position so that the visible intersection will reveal the physical location. Points of interest may also be downloaded from other support software so that the user can simply choose various points of interest from a listing. Floor layout can proceed accordingly. Because there exists a "second" intersection on the ceiling that is continuously plumbed over the "first" intersection on the floor, point transfer from floor to ceiling can proceed simultaneously. This is of use in laying out sprinkler systems and the like. In addition, there is a vertical implied plumb line at the intersection of the two vertical planes (i.e., between the two floor and ceiling intersection points). This vertical implied plumb line can be used to help align and set studded walls—an example of this methodology is illustrated in FIG. 13. These examples will be discussed below, in greater detail.

Details of System Hardware

Referring now to FIG. 1, an entire layout and point transfer system, generally designated by the reference numeral 10, is depicted in block diagram form. A first base unit is generally designated by the reference numeral 20, and is also referred to on FIG. 1 as "BASE UNIT #A." A second base unit is generally designated by the reference numeral 30, and is also referred to on FIG. 1 as "BASE UNIT #B."

Base unit 20 includes a laser transmitter "T1," at reference numeral 22. Laser transmitter 22 includes a processing circuit, a memory circuit, an input/output circuit, a laser light source, and a leveling platform.

Base unit 20 contains a laser receiver "R1," in a preferred mode of this system. This laser receiver is also designated by the reference numeral 24, and includes a processing circuit, a memory circuit, an input/output circuit, and at least one photosensor. Different configurations of photosensors can be used for this laser receiver, as discussed below in greater detail.

Base unit 20 further includes an aiming platform "A1," which is designated by the reference numeral 26. This aiming platform includes an angle encoder, and an angle drive circuit. This aiming platform 26 will be described in greater detail below.

Base unit 30 includes a laser transmitter, in this instance referred to as "T2," and designated by the reference numeral 32. Laser transmitter 32 also includes a processing circuit, memory circuit, input/output circuit, laser light source, and a leveling platform.

Base unit 30 also includes a laser receiver referred to as "R2," and generally designated by the reference numeral 34. This laser receiver also includes a processing circuit, memory circuit, input/out circuit, and photosensors.

Base unit 30 also includes an aiming platform, referred to as "A2," and generally designated by the reference numeral 36. This second aiming platform includes an angle encoder, and an angle drive circuit. These are similar to the same types of devices in the aiming platform 26, and will be discussed below in greater detail.

The system 10 also includes a remote unit, which is generally designated by the reference numeral 40 on FIG. 1. Remote unit 40 includes a processing circuit, a memory circuit, an input/out circuit, a display, and a keypad. Alternatively, remote unit 40 could include a touch screen display which would incorporate the main functions of a keypad, without having a separate keypad on the unit. The memory circuit of remote unit 40 can have two components: a first internal component, and either an external component or a "bulk memory" component, which is designated by the reference numeral 42 on FIG. 1. The external characteristic of memory circuit 42 could be comprised of a flash memory or other type of portable memory device, such as a "stick ROM." Such a portable memory device could be carried by a user, and could be plugged into a port of the remote unit 40, if desired. This will be discussed in greater detail below.

Another possible component of system 10 is a computer generally designated by the reference numeral 50. This computer is referred to as an "ARCHITECT COMPUTER," on FIG. 1. Although the owner of computer 50 may or may not truly be an architect, for the purposes of this description, it will be assumed that computer 50 includes floor plans or some other type of computer files that were either created or used by an architect, or by some type of building engineer. This assumes that the system 10 is going to be used on a jobsite in which a building will be constructed. Of course, other types of outdoor structures or perhaps highways can use the technology disclosed herein, and such a jobsite may not have any type of enclosed building structure at all. In other words, many of the principles of the technology disclosed herein will also work well on jobsites that are entirely outdoors.

The computer 50 includes a processing circuit, a memory circuit, and an input/output circuit. The memory circuit of computer 50 will either contain floor plans (designated at 54), or some other type of computer files such as computer-aided drafting (CAD) files at 52, on FIG. 1. It should be noted that the remote unit 40 itself could have some type of computer-aided architecture or CAD software installed thereon (depending on how "powerful" the computer/memory system is for the remote unit), and in that event, the virtual floor plan could also be directly contained in memory circuit 42, and displayed in two, or perhaps even three dimensions.

It will be understood that all of the main units illustrated on FIG. 1 include some type of input/output circuit, and these types of circuits include communications circuits. Such communication circuits possibly could be plug-in ports, such as USB ports; moreover, such input/output circuits also can include wireless communications circuits, such as low power radio-frequency transmitters and receivers, or other types of wireless communications ports that use other wavelengths, such as infrared light, for transmitting and receiving data between the various units. This type of technology is already available today, although certainly there will be newer forms invented in the future, that can still be used in the system 10 of FIG. 1.

Figure 2:
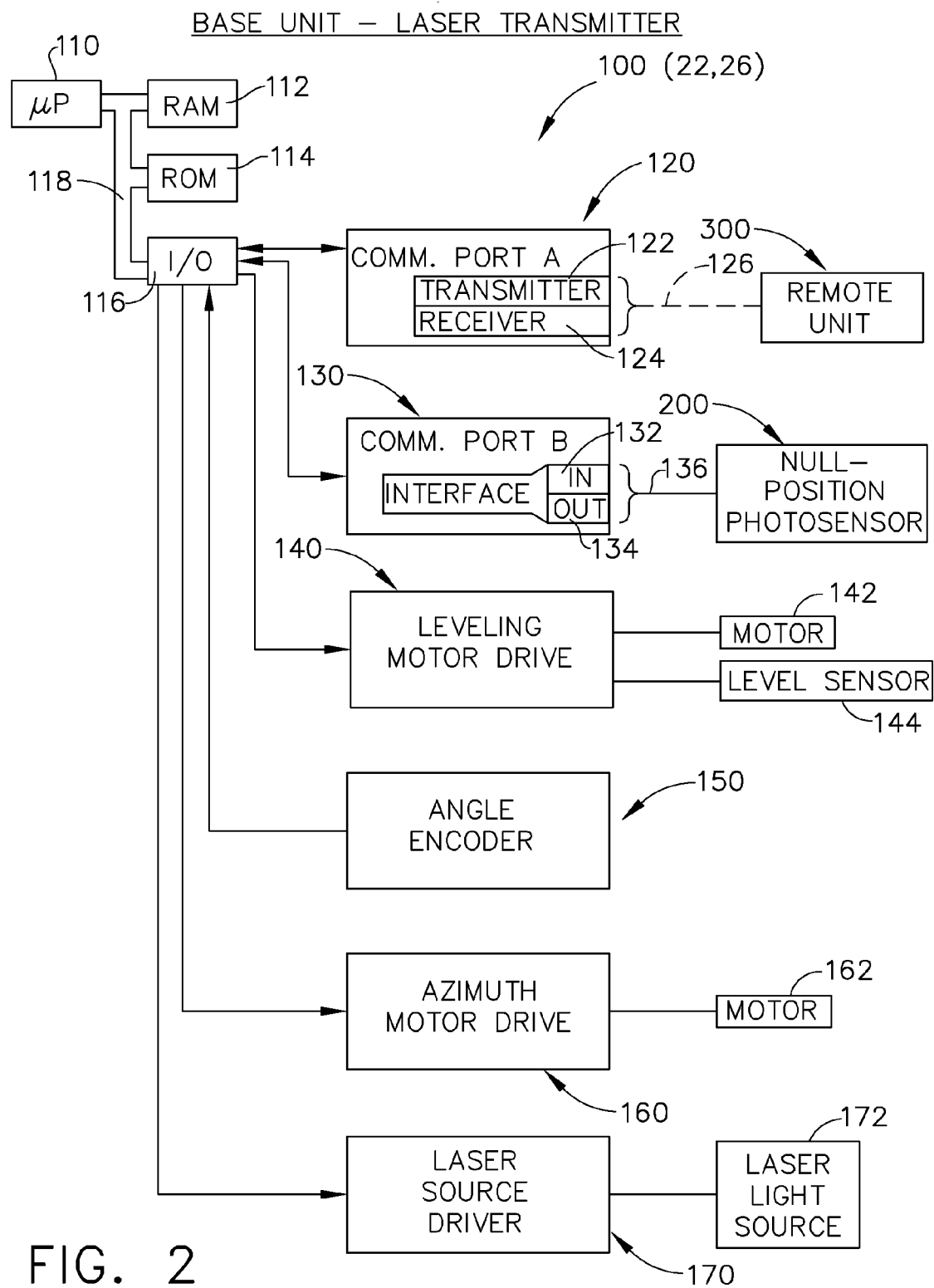
FIG. 2 is a block diagram of the major components of a laser transmitter that is part of a base unit depicted in FIG. 1.

Referring now to FIG. 2, a block diagram of a laser transmitter used in one of the base units is illustrated, and is generally designated by the reference numeral 100. Laser transmitter 100 includes a processing circuit 110, which will have associated random access memory (RAM) at 112, associated read only memory (ROM) at 114, and at least one input/output circuit at 116. These devices 112, 114, and 116 communicate with the processing circuit 110 by use of a bus 118, which typically is referred to as an address bus or a data bus, and can also contain other types of signals, such as interrupts and perhaps other types of timing signals.

The input/output circuit 116 will sometimes also be referred to herein as an I/O circuit. This I/O circuit 116 is a primary interface between the real world devices and the processing circuit 110. It is in communication with various communications devices and also various types of motor drive circuits and sensor circuits.

The input/output circuit 116 is in communication with a communications port A, which is generally designated by the reference numeral 120. Communications port 120 includes a transmitter circuit 122 and receiver circuit 124. Communications port 120 is provided to exchange data information with the remote unit 40, which on FIG. 2 is referred to as the remote unit 300. The communication link between remote unit 300 and communications port 120 is designated by the reference numeral 126. In a preferred mode of this system, the communication link 126 will be wireless, although certainly a cable could be connected between the communications port 120 and the remote unit 300, if desired.

A second communications port, referred to as port B is generally designated by the reference numeral 130 on FIG. 2. This port 130 comprises a data interface with an input circuit at 132 and output circuit at 134. Communications port 130 transfers data to and from a null-position photosensor, generally designated by the reference numeral 200, using a communication path 136. While it would be possible for communication link 136 to be wireless, there is no particular need for that to be so. The null-position photosensor 200 will typically be mounted directly on the base unit, as will be the laser transmitter 100. Therefore, a direct "wired" link will be typical.

Laser transmitter 100 also includes a leveling motor drive circuit, generally designated by the reference numeral 140. This drive circuit provides the voltage and current for a leveling motor 142. In addition, it receives signals from a level sensor 144, and these input signals will determine what types of commands will be sent to the motor 142 from the drive circuit 140. If desired, this can be a self-contained system that may not need to communicate with the processing circuit 110. However, the laser transmitter 100 will typically desire knowledge of whether or not the base unit has actually finished its leveling function before the laser transmitter 100 begins to function in its normal mode of operation. In addition, the processing circuit 110 may well desire to control the leveling motor drive circuit 140, essentially to keep it de-energized at times when it is not critical for the base unit to actually be attempting to level itself with respect to gravity.

Laser transmitter 100 also includes an angle encoder 150, in a preferred embodiment. Angle encoder 150 will provide input signals to the processing circuit 110, so that it knows exactly where the laser transmitter is being pointed with respect to the azimuth direction. This could be a wholly manual operation, if desired to reduce system cost by eliminating the encoder. However, for a fully automated system, the angle encoder 150 will be necessary.

Laser transmitter 100 preferable will also include an azimuth motor drive, generally designated by the reference numeral 160. Motor drive 160 will provide the proper current and voltage to drive the azimuth motor 162, which is the motive force to aim the laser transmitter. This again could be part of a self-contained system, working with the angle encoder 150; however, on FIG. 2, it is illustrated as being controlled by the processing circuit 110.

Laser transmitter 100 also includes a laser light source driver circuit 170, which provides the current and voltage to drive a laser light source 172. This typically will be a laser diode, although it could be an other type of laser light beam emitter, if desired. As described above, the laser light source will typically be emitting visible light, although a non-visible light source could be desirable for certain applications, and a laser light source emitting infrared light could be used in that situation. The laser source driver 170 is controlled by processing circuit 110 in the configuration illustrated on FIG. 2.

The laser transmitter 100 will typically be a "fan beam" laser transmitter for use in the system 10. However, it will be understood that other types of laser light sources could be used, including a rotating laser beam (such as a dithering laser beam), if desired. There must be some minimum amount of divergence to create a laser light "plane" so that the laser light will at least intersect the floor surface of a jobsite, and preferably also intersect a ceiling surface for spaces on jobsites. The system 10 will have many uses, even if the laser light source only is pointing at a floor surface, but system 10 expands its usefulness if the divergence angle of the laser plane is designed to intersect not only the floor, but also the ceiling of the space. In this description, it will be assumed that the laser light source is a fan beam laser or an equivalent, so that either (i) a continuous plane of laser light is being emitted by each laser transmitter 100 at both base units 20 and 30, or (ii) a moving beam of laser light (i.e., a stream of photons in a line that moves its aiming angle over time) is emitted by both base units 20 and 30 in a manner so as to create two "planes" of laser light that each emulates a fan beam.

Figure 3:
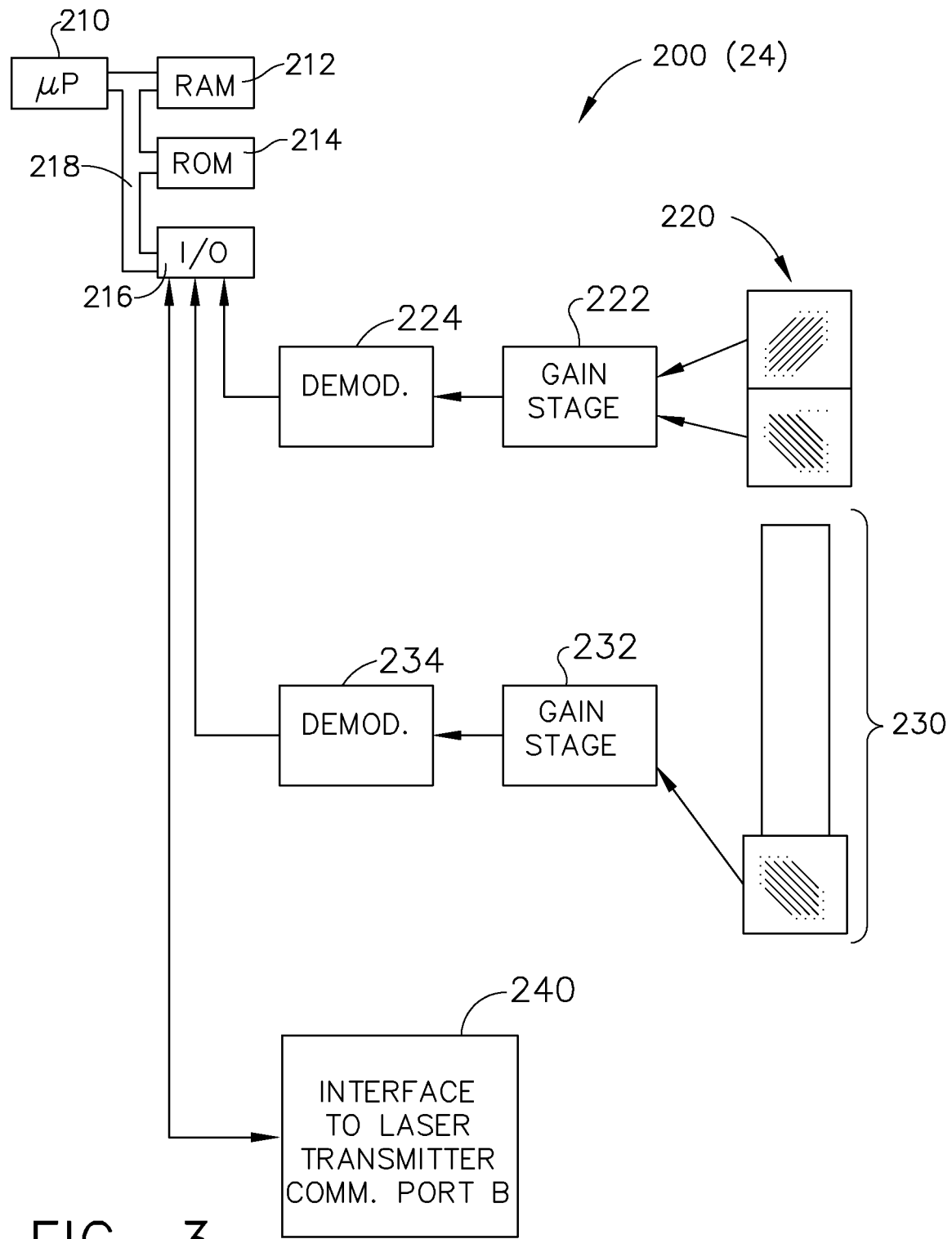
FIG. 3 is a block diagram of the major components of a laser receiver that is part of a base unit that is depicted in FIG. 1.

Referring now to FIG. 3, a laser receiver generally designated by the reference numeral 200 is depicted in block diagram form. Laser receiver 200 includes a processing circuit 210, which has associated RAM 212, ROM 214, and an input/output interface circuit 216. These devices communication with the processing circuit 210 over a bus 218, typically including at least data and address lines.

The input/output circuit 216 receives signals from some type of photosensor. On FIG. 3 two different types of photosensors are depicted. A "butt end" photosensor is depicted at the reference numeral 220, and this assumes there are only two individual photocells. Each of these photocells of the photosensor 220 provides an electrical signal to a gain stage 222. The output of the gain stage is directed to a demodulation circuit 224, and the output of that circuit directs a signal to the I/O circuit 216. It will be understood that a demodulation circuit will not be necessary unless the laser light signals themselves are of a modulated type of signal. In most applications for the system 10, a modulated laser light signal will be desirable, and thus a demodulation circuit 224 will be used in those instances.

The second type of photosensor is depicted as a portion of what is sometimes referred to as a "rod sensor" and is designated by the reference numeral 230. An exemplary "full" rod sensor is disclosed in U.S. Pat. No. 7,110,092, which issued on Sep. 19, 2006, which disclosure is incorporated by reference herein in its entirety. It will be understood that the second photosensor 230 can comprise virtually any type of "all-around" light-sensing device, i.e., a photosensor that is able to detect incoming light from essentially any angle.

A typical "full" rod sensor would have two photocells, one at each end of the light-conducting rod. However, rod sensor 230 has only a single photocell in FIG. 3, which produces an electrical signal that is directed to a gain stage 232, which outputs a signal to a demodulation stage 234. As in the other type of photosensor circuit described above, the demodulation circuit 234 is only necessary if the laser light source emits a modulated signal, which would be typical for this system 10.

An interface circuit 240 is also provided in the laser receiver 200. This is a separate interface circuit from the I/O circuit 216. Interface circuit 240 communicates position information to the laser transmitter communications port B, which will be used in helping "aim" the laser transmitters during a portion of the set-up mode of operation, as discussed below.

Figure 4:
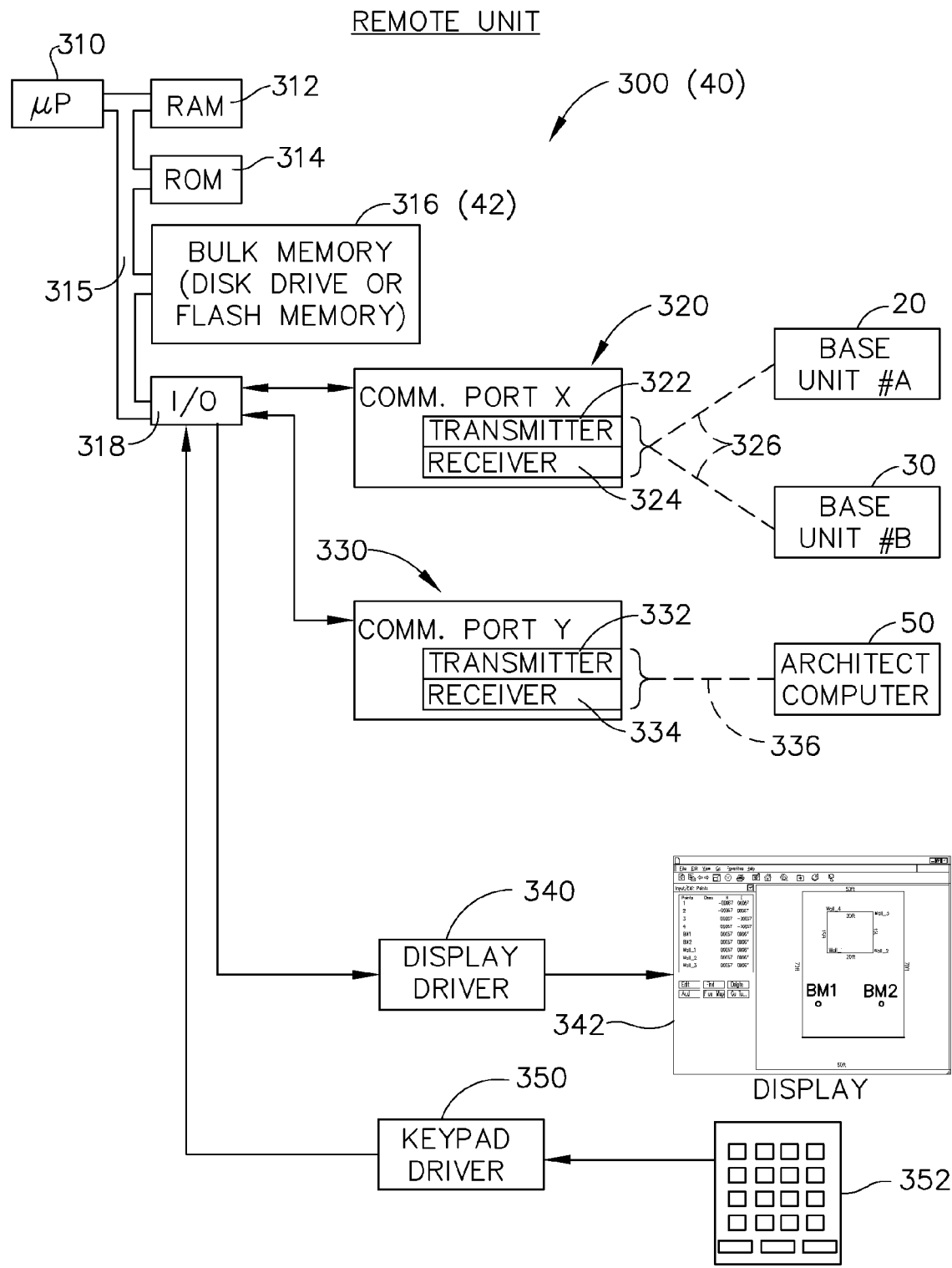
FIG. 4 is a block diagram of the major components of a remote unit that is part of the system of FIG. 1.

Referring now to FIG. 4, a block diagram is provided for a remote unit, which is generally designated by the reference numeral 300. Remote unit 300 includes a processing circuit 310, with associated RAM 312, ROM 314, some type of bulk memory or external memory 316, and an input/output circuit 318. These circuits are all in communication with the processing circuit 310 via a bus 315, which normally would carry data signals and address signals, and other types of microprocessor signals, such as interrupts.

The bulk memory 316 could be a disk drive, or perhaps some type of flash memory. If in the form of flash memory, it could be an external memory device (such as a "portable memory device") that can plug into the remote unit, via a USB port, for example. In that situation, there would be a USB interface between the bulk memory device 316 and the bus 315.

The I/O circuit 318 will be in communication with a first communications port 320, which is designated as communications port "X" on FIG. 4. Communications port 320 includes a transmitter circuit 322, and a receiver circuit 324. Communications port 320 is designed to communicate with the base units 20 and 30, typically using a wireless signal via a wireless pathway 326 (as noted on FIG. 4). As described in greater detail below, the base units 20 and 30 will communicate azimuth angular information with the remote unit, and that information arrives via the wireless path 326 to and from communications port 320.

A second communications port 330 is included in remote unit 300, and this is designated as communications port "Y" on FIG. 4. Communications port 330 includes a transmitter circuit 322 and receiver circuit 334. This communications port 330 is provided to exchange information with the architect computer 50, via a communication link 336. On FIG. 4, communication link 336 is depicted as a wireless link, although it certainly could be constructed by use of an electrical cable or an optical cable, if desired. Communications port 330 will exchange floor layout data with the architect computer 50; more specifically, it can receive a floor plan and store it in the bulk memory circuit 316. In addition, if the remote unit 300 receives information about a new or "unknown" point of interest in the physical jobsite floor plan, then that information can not only be saved in the bulk memory circuit 316, but could be also communicated back to the architect computer 50, via the communications port 330 to be placed in the original floor plan. Or, a revised floor plan (which includes the new point of interest) can be saved as a file in bulk memory circuit 316, and that entire file could be transferred to the architect computer 50.

It will be understood that the architect computer 50 could comprise a "fixed" unit that essentially remains in the architect's office, and passes data to the remote unit 300 while the remote unit is physically at the office, or perhaps they remotely communicate with one another via a wide area network, such as the Internet. Alternatively, the architect computer 50 could comprise a "portable" unit that is transported to the jobsite, and communicates with portable unit 300 while on site. Finally, as portable computers become even smaller in physical size, it is more likely that the portable unit and the architect computer will eventually become merged into a single device.

A display driver circuit 340 is in communication with the I/O circuit 318. Display driver circuit 340 provides the correct interface and data signals for a display 342 that is part of remote unit 300. If remote unit 300 is a laptop computer, for example, then this would be the standard display seen in most laptop computers. Or, perhaps the remote unit 300 is a calculator-sized computing device, such as a PDA (Personal Digital Assistant), in which case the display would be a much smaller physical device. Display 342 could be a touch screen display, if desired.

One example of a type of remote unit that could work in this system (with some modification) is the portable "layout manager," which is an existing hand held computer sold by Trimble Navigation Limited, Model Number LM80. It should be noted that one cannot simply take the LM80 and immediately use it as a remote unit in the present system; the software must be modified to perform the necessary calculations, which are described below. In addition, the input/output circuits must be modified to be able to communicate commands and data both to and from the base units.

A keypad driver circuit 350 is in communication with I/O circuit 318. Keypad driver circuit 350 controls the signals that interface to an input sensing device 352, such as a keypad, as depicted on FIG. 4. Again, if the display 342 is of a touch screen type, then there may not be a separate keypad on remote unit 300, because most of the command or data input functions will be available by touching the display itself. There may be some type of power on/off switch, but that would not necessarily be considered a true keypad (and typically would not be used for entering data).

Details of System Methodology

Figure 5:
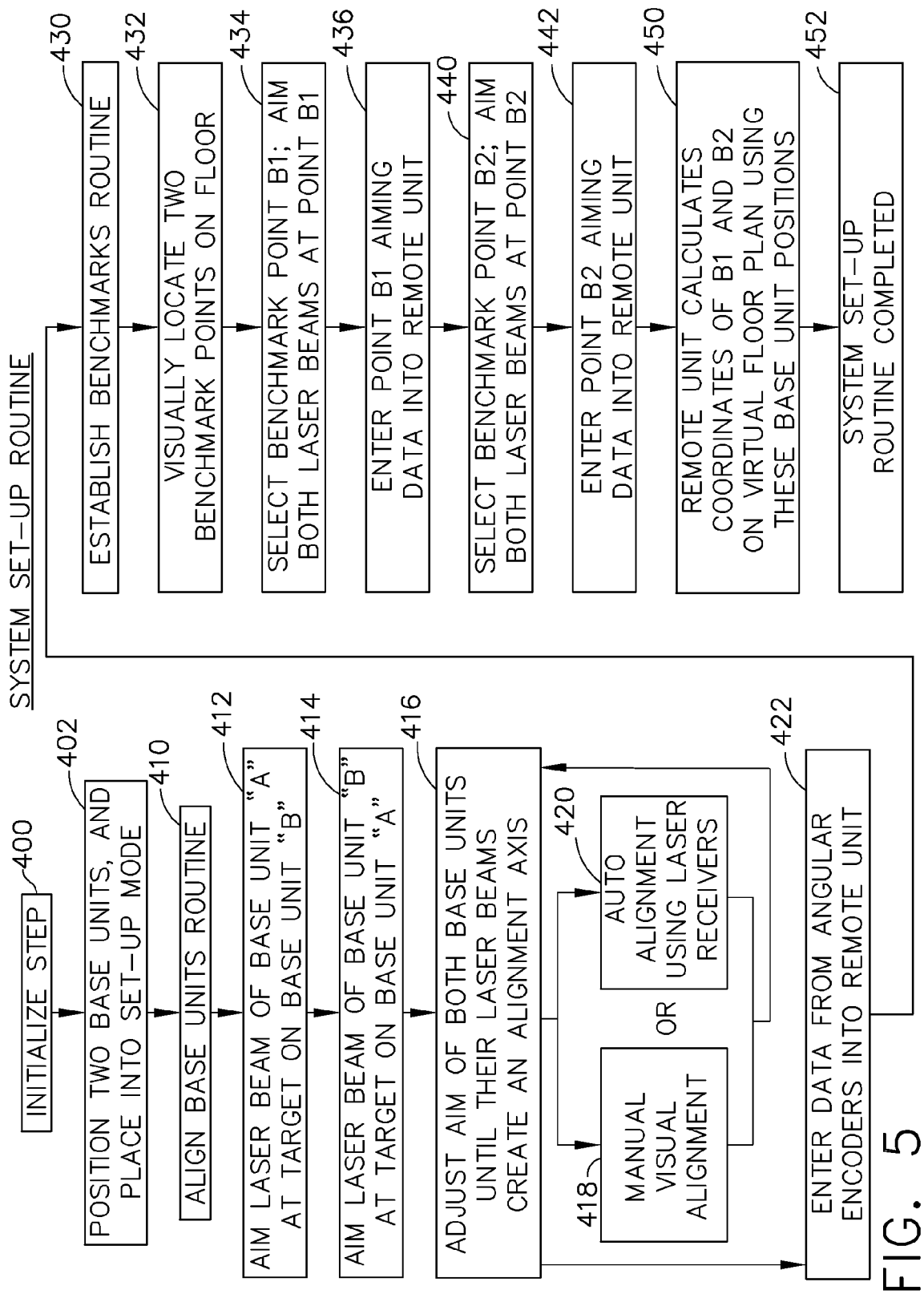
FIG. 5 is a flow chart of the steps performed by a system set-up routine, for the system depicted in FIG. 1.

Referring now to FIG. 5, a flow chart is provided for a routine that performs a system set-up function. Beginning with an initialization step 400, the user positions two base units, and then places both base units into their set-up mode of operation, at a step 402 on FIG. 5. Beginning at a step 410, the two base units are aligned using a predetermined routine. An example of how this alignment occurs is provided below, and also is illustrated beginning at FIG. 14.

At a step 412, the alignment routine begins by aiming the laser beam of base unit "A" at a target that is located on base unit "B." A similar situation occurs at the opposite laser transmitter; at a step 414 the laser beam of base unit "B" is aimed at a target on the base unit "A." (See a more detailed description below, in connection with FIGS. 14-19.)

At a step 416, the angular aim of both base units is adjusted until their laser beams create an alignment axis. If a manual or visual alignment is going to be used, then the logic flow travels to a step 418. Alternatively, an automatic alignment occurs if there are laser receivers mounted to the base units; in that situation the logic flow is directed to a step 420.

Once an alignment axis is created, a step 422 allows the operator to enter data from the angular encoders to the remote unit. (Note that the system software can be programmed to do this automatically.) The user would typically be handling the remote unit itself (i.e., remote unit 420), and by entering a command on its keypad or touch screen, the remote unit 40 will request the alignment information from both base units, and then store that angular encoder information into the memory circuit 316 of remote unit 300. Once this has occurred, the two laser transmitters of base units "A" and "B" are situated in a fixed relationship with respect to one another, and are ready for a floor layout session. The logic flow now arrives at a step 430, which begins a routine that establishes the benchmarks.

To establish benchmarks, a step 432 requires the user to visually locate two benchmark points on the floor surface at the jobsite. At a step 434, the user selects a first benchmark point, designated "B1." The user now aims both laser beams for base unit A and base unit B at this point B1. This will be very easy to do, because the laser beams are actually vertical laser planes, and if the light emanating from the laser transmitters comprises visible light, then there will be a thin line of visible light crossing the floor surface from each of the base units A and B. After both laser beams are aimed directly at the first benchmark point B1, then there will be an intersection of the two laser beams exactly at benchmark point B1. Once that occurs, the user can enter the aiming data for point B1 into the remote unit at a step 436. This establishes the angular relationship between the two base units A and B and the first benchmark point B1.

The user now selects a second benchmark point "B2," at a step 440. Both laser beams from both base units are now aimed at point B2, in a similar fashion to that described above for benchmark point B1, at step 434. After both laser beams are correctly pointed, there will be a visible line intersection exactly at benchmark point B2, and the user will easily see this if the laser beams are emanating visible light. Once that has occurred, the user can enter the point B2 aiming data into the remote unit, at a step 442.

Once the remote unit has both sets of aiming data for both benchmark points B1 and B2, then a step 450 allows the remote unit to calculate the distance between base units A and B on the virtual floor plan that is contained in the memory circuit 316 of the remote unit 300, using these base unit positions. These calculations can use a set of example equations that are provided hereinbelow:

The following are general case calculations for setting up the system. It is expected that the two transmitters will be placed in some convenient locations for the job site. The axis between the two transmitters will be established by aligning the fan beams relative to each other. It will be desired to calculate the distance between the two transmitters. See, FIG. 22 for a diagram that illustrates the relationship of physical points and angles involved in the set-up routine.

Definitions:
T1 Transmitter 1
T2 Transmitter 2
B1 Benchmark 1 (Known point—previously established)
B2 Benchmark 2 (Known point—previously established)
A1 Axis between the two transmitters
Knowns:
D Distance between Benchmark 1 and Benchmark 2
A1 The axis between the two transmitters.
α Angle transmitter 1 measures from the axis A1 to Benchmark 2
γ Angle transmitter 2 measures from the axis A1 to Benchmark 1
β Angle Transmitter 1 measures between Benchmark 1 and Benchmark 2
δ Angle Transmitter 2 measures between Benchmark 1 and Benchmark 2

It is desired to find the distance 'd' between the transmitters T1 and T2:

$$\frac{d}{\sin(\pi - \alpha - \beta - \gamma)} = \frac{a}{\sin(\gamma)} \qquad \text{Eq. 1}$$

$$\tan(\gamma) = \frac{a \cdot \sin(\alpha + \beta)}{r}$$

$$r = \frac{a \cdot \sin(\alpha + \beta)}{\tan(\gamma)} \qquad \text{Eq. 3}$$

$$\frac{d}{\sin(\pi - \alpha - \gamma - \delta)} = \frac{b}{\sin(\alpha)} \qquad \text{Eq. 2}$$

$$\tan(\alpha) = \frac{b \cdot \sin(\gamma + \delta)}{s}$$

$$s = \frac{b \cdot \sin(\gamma + \delta)}{\tan(\alpha)} \qquad \text{Eq. 4}$$

$$\sin(\rho) = \frac{b \cdot \sin(\gamma + \delta) - a \cdot \sin(\alpha + \beta)}{D} \qquad \text{Eq. 5}$$

$$r + s - d = D \cdot \cos(\rho) \qquad \text{Eq. 6}$$

From Eq. 1:

$$a = \frac{d \cdot \sin(\gamma)}{\sin(\pi - \alpha - \beta - \delta)}$$

Substitute Eq. 1 into Eq. 3:

$$r = \frac{d \cdot \sin(\gamma) \cdot \sin(\alpha + \beta)}{\sin(\pi - \alpha - \beta - \gamma) \cdot \tan(\gamma)} \qquad \text{Eq. 7}$$

From Eq. 2:

$$b = \frac{d \cdot \sin(\alpha)}{\sin(\pi - \alpha - \gamma - \delta)}$$

Substitute Eq. 2 into Eq. 4:

$$s = \frac{d \cdot \sin(\alpha) \cdot \sin(\gamma + \delta)}{\sin(\pi - \alpha - \gamma - \delta) \cdot \tan(\alpha)} \qquad \text{Eq. 8}$$

Substitute Eq. 1 and Eq. 2 into Eq. 5:

$$\rho = \sin^{-1}\left[\frac{d \cdot \sin(\alpha) \cdot \sin(\gamma + \delta)}{D \cdot \sin(\pi - \alpha - \gamma - \delta)} - \frac{d \cdot \sin(\gamma) \cdot \sin(\alpha + \beta)}{D \cdot \sin(\pi - \alpha - \beta - \gamma)}\right] \quad \text{Eq. 9}$$

Substitute Eq. 7 and Eq. 8 into Eq. 6:

$$d = \frac{D \cdot \cos(\rho)}{\dfrac{\sin(\gamma) \cdot \sin(\alpha + \beta)}{\sin(\pi - \alpha - \beta - \gamma) \cdot \tan(\gamma)} + \dfrac{\sin(\alpha) \cdot \sin(\gamma + \delta)}{\sin(\pi - \alpha - \gamma - \delta) \cdot \tan(\alpha)} - 1} \quad \text{Eq. 10a}$$

Eq. 10a can also be written:

$$d = \frac{D \cdot \cos(\rho) \cdot \sin(\pi - \alpha - \beta - \gamma) \cdot \sin(\pi - \alpha - \gamma - \delta) \cdot \tan(\gamma) \cdot \tan(\alpha)}{\sin(\gamma) \cdot \sin(\alpha + \beta) \cdot \sin(\pi - \alpha - \gamma - \delta) \cdot \tan(\alpha) + \sin(\alpha) \cdot \sin(\gamma + \delta) \cdot \sin(\pi - \alpha - \beta - \gamma) \cdot \tan(\gamma) - \sin(\pi - \alpha - \beta - \gamma) \cdot \sin(\pi - \alpha - \gamma - \delta) \cdot \tan(\gamma) \cdot \tan(\alpha)} \quad \text{Eq. 10b}$$

At this point is can be seen that two independent equations exist here: Eq. 9 and Eq. 10. These can be solved simultaneously through various numerical method techniques.

Once the calculations have been completed and both benchmarks have been entered into remote unit 300, the logic flow arrives at a step 452, in which the system set-up routine is now completed. The positions of both base units A and B have been "registered" or "mapped" into the virtual floor plan, which is stored either in the bulk memory circuit 316 of the remote unit 300 (which could be a removable flash memory chip), or is stored in the architect computer 50, which is in communication with the remote unit 300 via its communication port Y (at 320). The system is now ready to locate other points on the floor plan.

It should be noted that, if the two base units 20 and 30 had been previously positioned at the same locations where they currently rest, then in theory, the set-up procedure of the flow chart of FIG. 5 would not be necessary now. However, the user may desire to verify those base unit positions, to be certain that one of the base units had not been moved without knowledge of the user. Their positions can be easily verified by commanding the two base units to "aim" at the benchmark points, one benchmark at a time. If the base units had not been moved, then the laser light lines projected by laser transmitters 22 and 32 will form intersecting lines exactly at the correct physical locations on the jobsite floor surface, and this quickly verifies the set-up parameters.

Figure 6:
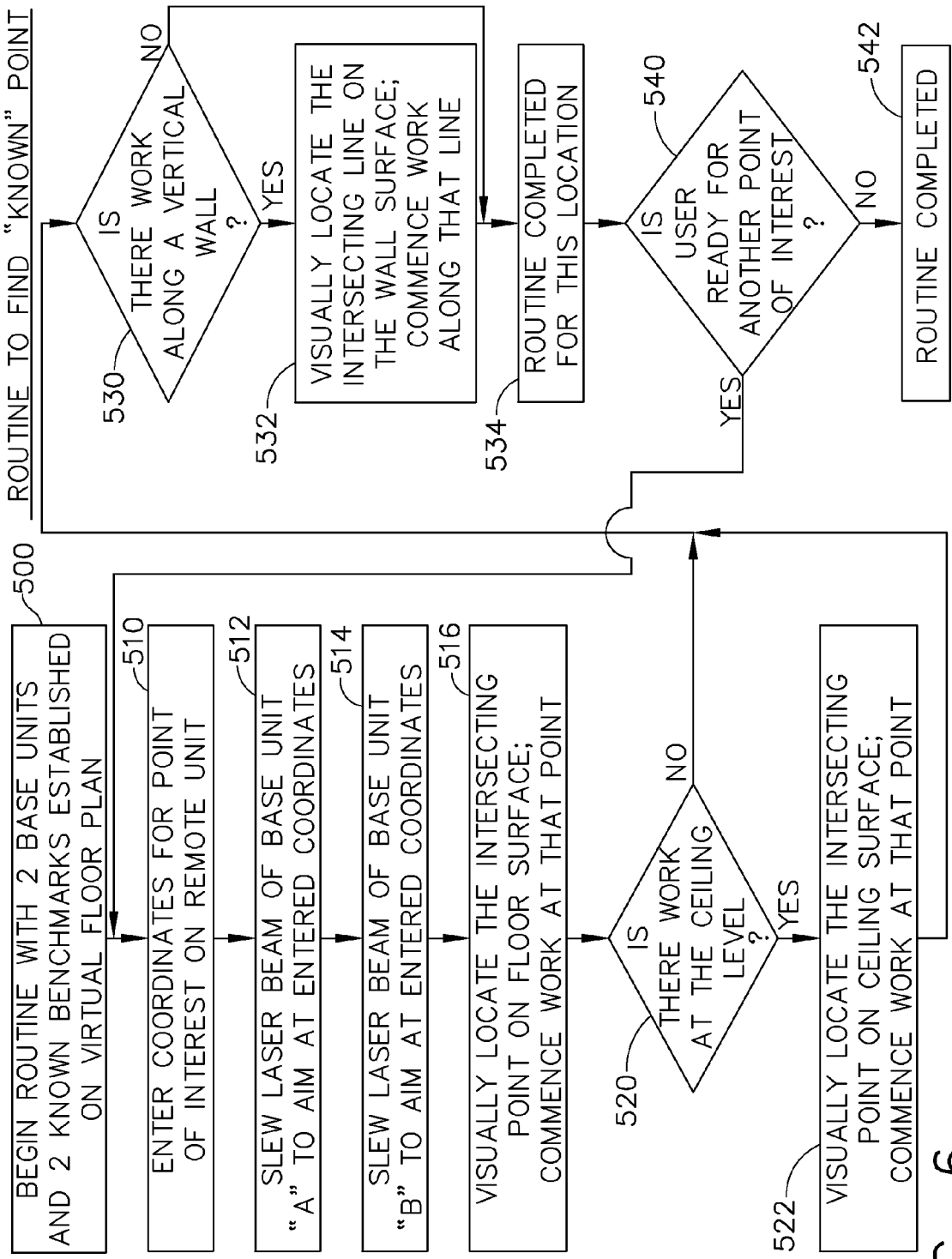
FIG. 6 is a flow chart of the steps performed by a routine to find a "known" point on a floor layout plan, using the system of FIG. 1.

Referring now to FIG. 6, a flow chart is provided for a routine to find a "known" point on the virtual floor plan. The routine begins at a step 500, in which two base units and two known benchmarks have been established on the virtual floor plan of the remote unit 300. The logic flow now is directed to a step 510, in which the user enters coordinates for a point of interest. This entry is done via either an input sensing device 352 (e.g., a keypad), or via a touch screen display (such as display 342) of the remote unit 300. These coordinates can be entered using the virtual floor plan that was on the architect's computer 50, and those coordinates will be automatically translated to a set of aiming data for the base units that contain the laser transmitters.

In essence, the coordinates for this known point of interest have already been "predetermined" as far as the virtual floor plan is concerned; the known point of interest has already been "registered" or "mapped" in the memory of the computer that holds the virtual floor plan. In previous (conventional) layout systems, the difficult part has been to now identify, on the actual physical jobsite floor surface, exactly where that known point of interest is located, so that work may be performed at the correct position.

The first laser beam of base unit "A" is slewed to aim the laser beam at the entered coordinates, at a step 512. In a similar manner, a step 514 causes the laser beam to be slewed for the base unit "B" to aim at the same set of entered coordinates. After this has occurred, the two laser planes from base units A and B will intersect on the floor surface at the designated coordinates. The user, at a step 516, can now visually locate the intersecting point on the floor surface, and can commence work at that point.

The logic flow now arrives at a decision step 520, where it determines if there will be work at the ceiling level. If not, the logic flow is directed to a step 530. If the answer is YES, then the user will visually locate the intersecting point of the two laser planes on the ceiling surface at a step 522. The user will now be able to commence work at that point. This would be useful for installing sprinklers, smoke detectors, or lighting fixtures, for example, as per the architect's plan.

The logic flow now arrives at a decision step 530, where it determines whether or not there will be work along a vertical wall. If not, then the logic flow is directed to a step 534. If the answer is YES, then the user will visually locate the intersecting line on the wall surface at a step 532. This is the implied plumb line that exists between the floor and ceiling intersecting points of the two laser planes. Now that a wall surface has the vertical plumb line visible along the wall's surface, the user can commence work along that line. This can be useful for placing electrical outlets, or for framing, or even for positioning the wall in the first place.

The logic flow now arrives at a step 534, and the routine is now completed for this location. A decision step 540 now determines whether or not the user is ready for another point of interest. If not, the logic flow is directed to a step 542, where this routine is completed. If the user is ready for another point of interest, then the logic flow is directed back to step 510, which allows the user to enter coordinates for a new point of interest on the remote unit 300.

An example set of position calculations is provided below. This calculation set describes a method to solve for the aiming angles when laying out the location of a known point of interest once the system is set up; it solves for the angles each transmitter must drive to in order to present a point of interest that is desired to be found. See, FIG. 23 for a diagram that illustrates the relationship of physical points and angles involved in the routine for locating a known point of interest.

Definitions:
T1 Transmitter 1
T2 Transmitter 2
B1 Benchmark 1 (Known point—previously established)
B2 Benchmark 2 (Known point—previously established)
A1 Axis between the two transmitters
Knowns:
d Distance between transmitters
A:$(X_A, Y_A)$ Coordinates of the Point of Interest to be Found
Process:
1) Enter the coordinates of the Point of interest into the system remote.
2) Transmitters 1 and 2 drive to the corresponding angles θ and φ needed to present point A:$(X_A, Y_A)$.
3) Visually locate where the planes intersect.

From the diagram:
a=$X_A$ and b=$Y_A$
Solving for θ and φ:

$$\theta = \tan^{-1}\left(\frac{b}{a}\right) \quad \phi = \tan^{-1}\left(\frac{b}{d-a}\right)$$

Figure 7:
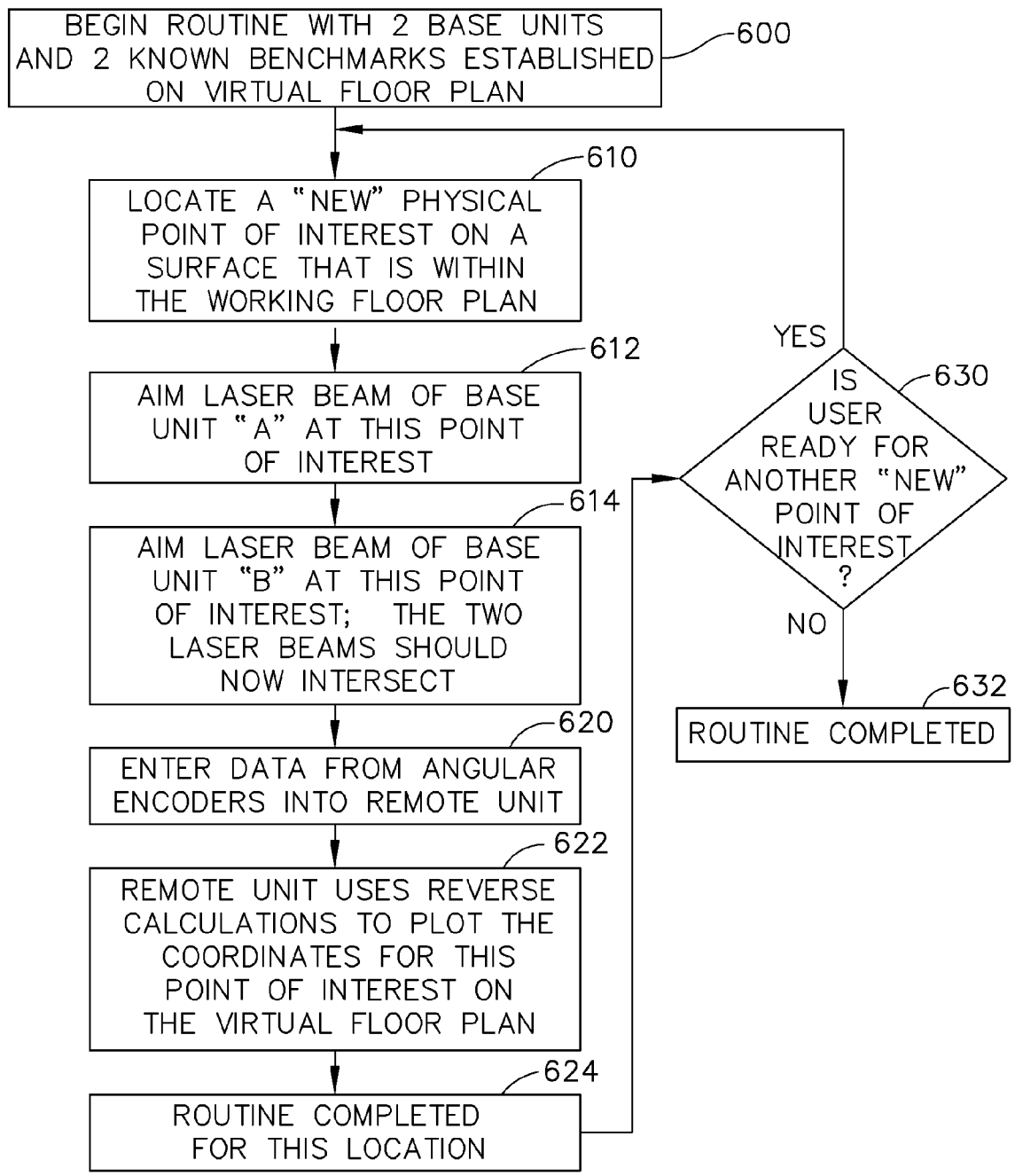
FIG. 7 is a flow chart of the steps performed by a routine to enter an "unknown" point on a jobsite, using the system of FIG. 1.

Referring now to FIG. 7, a routine to enter an "unknown" point is provided as a flow chart. The routine begins at a step 600, in which two base units and two known benchmarks have already been established on the virtual floor plan at this step. A step 610 now locates a "new" physical point of interest on a surface that is within the working floor plan. This new point of interest is not already plotted on the virtual floor plan—if it was, it would not be "unknown." Instead, this new point is something that the user has decided should be now plotted on the virtual floor plan, and it is a physical point that the user can actually see, and that he/she wants to now have memorialized within the floor plan computer files.

After the new point of interest has been physically located at step 610, a step 612 requires the user to aim the laser beam of base unit "A" at this point of interest. This means that the user must command (or manually slew) the laser beam directly at the point of interest, so that the plane of laser light creates a line along the floor surface (assuming this point is on the floor surface) until that line visually crosses the point of interest.

After base unit "A" has been aimed at step 612, a step 614 now requires the user to aim the laser beam of base unit "B" at the same new point of interest. Again, the laser plane from base unit "B" will create a line of laser light along the floor surface (again assuming this is a point on the floor surface), and this creates a visible line that emanates away from base unit "B" and, after being properly aimed, the laser light will visually cross the new point of interest. At the end of this aiming phase in step 614, both laser planes should now intersect (as visible light lines on the floor surface) exactly at the point of interest.

The angular encoders will now have azimuth information that can be stored, and a step 620 enters data from the angular encoders of both base units into the remote unit. (This would typically occur via a user command entered on the remote unit.) Once the remote unit has this data, a step 622 causes the remote unit to execute a reverse calculation to plot the coordinates for this point of interest on the virtual floor plan. Once that has occurred, the unknown point of interest is now "registered" on the virtual floor plan, and that point of interest essentially becomes a "known" point of interest and thereby can be "found" later, even if the base units 20 and 30 are moved to other locations. A step 624 now is reached, at which the routine has been completed for this particular location (i.e., at this point of interest).

Alternatively, if the base units do not have azimuth encoders, then they will be equipped with a visual angle scale that the user can see on an upper surface of the base units. After the user has (manually) aimed the laser transmitter for each base unit (at steps 612 and 614), then he/she may read the azimuth angular displacement for both laser transmitters, and that information can then be manually entered into the remote unit at step 620 (using its input sensing device 352). Once the remote unit has this data, steps 622 and 624 are performed, as described above.

A decision step 630 now determines whether or not the user is ready for another "new" point of interest. If not, then the entire routine of FIG. 7 has been completed at a step 632. On the other hand, if the user has another point of interest to be plotted at this time, then the logic flow is directed back to step 610, in which the user locates that other physical point of interest on a surface that is within the working floor plan.

By using the routine depicted in the steps of the flow chart on FIG. 7, a user can easily choose any point of interest on the jobsite that is within a non-interrupted view of both laser transmitters in both base units. Once the user has located that physical point, it is a simple matter to aim both laser transmitters directly at that point to create two intersecting lines of laser light from the laser planes emitted by the two laser transmitters. This is very easy to do, because the user can see everything that is going on, assuming the laser transmitters are emitting visible light. Even if the light is infrared, for example, the user could be utilizing special night-vision goggles to locate these points, if desired. This non-visible light scenario might be quite useful for applications that are to occur in the dark, and might even have military applications (for plotting positions of mines in a minefield, for example). In non-dangerous situations, a position-detecting laser receiver could be used instead of night-vision goggles to locate these points, if desired.

This routine of FIG. 7 can be performed much more quickly than a typical surveying function that is being performed countless times on jobsites using earlier technology. No type of surveyor's rod is necessary, and such a rod would not need to be positioned and plumbed for each new point of interest, such as is required in many of the systems using available conventional technology.

If the user selects a point that is not within direct visible range of one of the laser transmitters, it is a simple matter to move that particular laser transmitter to a different location within the virtual floor plan and re-establish its set-up function using the routine illustrated as a flow chart in FIG. 5. Once the laser transmitter has been placed at a new location, its position can easily be established with benchmarks that are always available on a new jobsite, and once everything has been registered with the remote unit, the user can directly begin to enter unknown points, using the flow chart of FIG. 7.

An example set of reverse calculations is provided below. This calculation set describes a method to solve for the coordinates for the location of an unknown point of interest once the system is set up. See, FIG. 24 for a diagram that illustrates the relationship of physical points and angles involved in the routine for entering an unknown point of interest.

Definitions:
T1 Transmitter 1
T2 Transmitter 2
B1 Benchmark 1 (Known point—previously established)
B2 Benchmark 2 (Known point—previously established)
A1 Axis between the two transmitters
Knowns:
d Distance between transmitters
θ Angle measured by transmitter 1 from the axis between transmitters and the point of interest
φ Angle measured by transmitter 2 from the axis between transmitters and the point of interest
Process:
1) Command each transmitter to place each respective fan beam over the point of interest.
2) Transmitters 1 and 2 measure the angles θ and φ.
3) Since d is known from the system setup, the coordinates of point a can be calculated.

From the diagram:

$$y_0 = \frac{d}{\frac{1}{\tan(\theta)} + \frac{1}{\tan(\phi)}}$$

This can be written:

$$y_0 = \frac{d \cdot \tan(\phi) \cdot \tan(\theta)}{\tan(\theta) + \tan(\phi)}$$

And:

$$x_0 = \frac{y_0}{\tan(\theta)}$$

Further Operating Details

Figure 8:
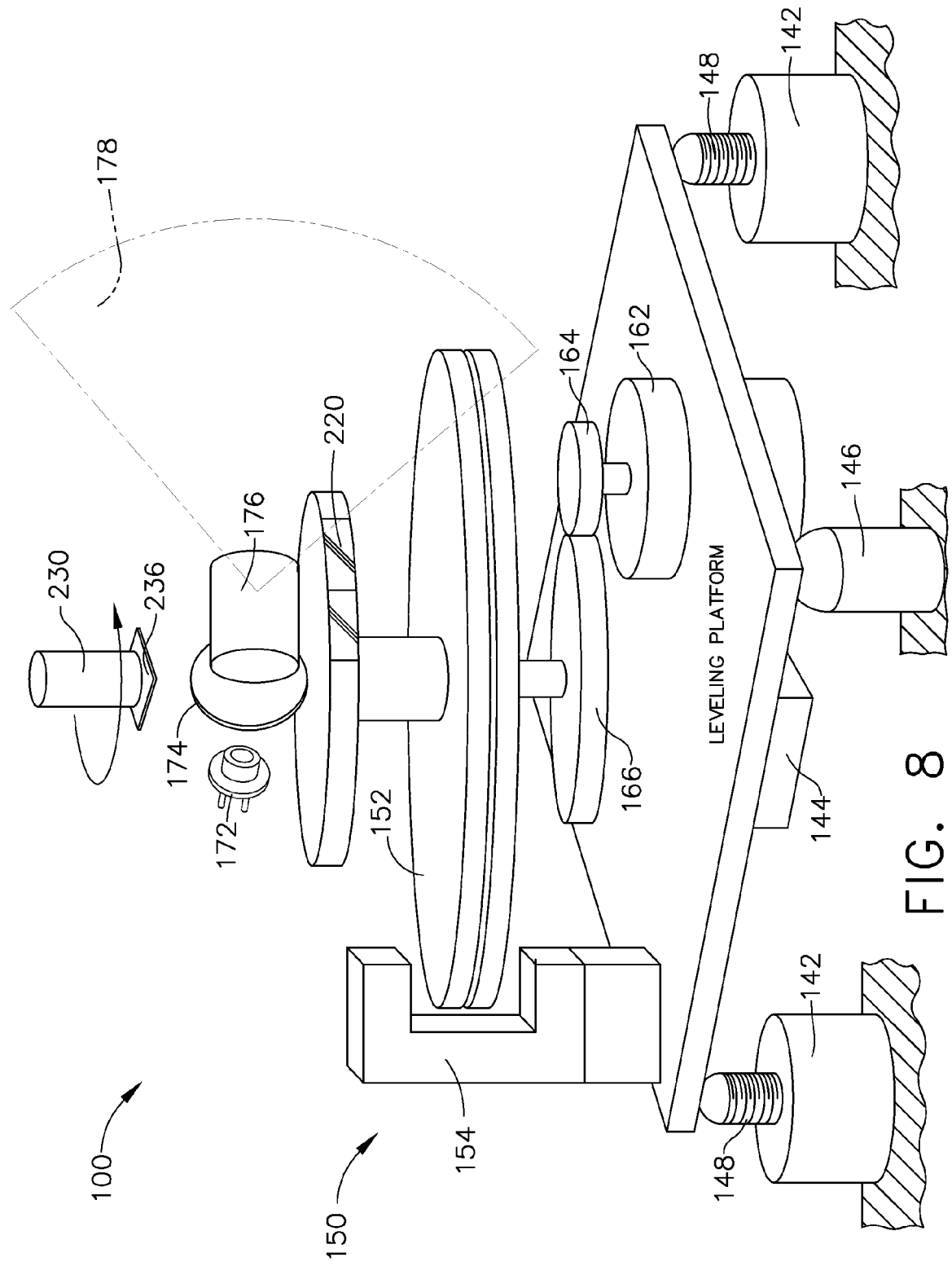
FIG. 8 is a diagrammatic view of an "automatic" base unit, as used in the system of FIG. 1.

Referring now to FIG. 8, a diagrammatic view is provided for the main "mechanical" components found in a base unit, including a laser transmitter and a laser receiver. The base unit is generally designated by the reference numeral 100, and includes a leveling platform at the bottom of the structure, upon which is mounted a rotational unit for adjusting the azimuth angle of the laser transmitter. The leveling platform includes two leveling motors 142, a level sensor 144 (e.g., some type of electronic gravity sensor), and a pivot 146. Above the leveling motors 142, are leadscrews 148, and the horizontal leveling platform is mounted on the top of the leadscrews 148.

It will be understood that a manual leveling platform could be provided with base unit 100, rather than the "automatic" leveling platform described in the previous paragraph. Such a manual leveling platform could use a pendulum or a visible bubble, for example, and there would be no automatic gravity sensing device or leveling motor drive.

On the upper surface of the leveling platform is the azimuth motor 162, which has output shaft and a pinion gear 164, which meshes with a spur gear 166. The spur gear has an output shaft that is vertical, which runs through an encoder disc subassembly 152 and up to a second wheel or disc that includes a pair of butt cell photosensors 220. The encoder disc subassembly 152 typically has some type of visible markings that can be detected by an encoder readhead, which is located along the outer perimeter of the encoder disc. On FIG. 8, the encoder readhead is designated by reference numeral 154, and the overall angle encoder system 150 includes both the encoder disc subassembly 152 and the encoder readhead 154. Typical optical encoders have a fixed portion and a rotatable portion, as depicted on FIG. 8 by the two parallel disc structures in subassembly 152.

A laser diode 172 is mounted (in this diagrammatic view) in the horizontal direction, and it emits a laser light beam through a collimating lens 174, and that laser light travels through a cylinder lens 176 to create an output fan beam 178. The fan beam 178 is diagrammatically presented on FIG. 8 as a diverging plane of laser light.

In this arrangement, the azimuth motor 162 turns the aiming direction of the fan beam laser plane of light 178, and this simultaneously moves the butt cell photosensors 220 and a portion of the encoder disc subassembly 152. In a typical arrangement, the split between the butt cell photosensors will be along the same vertical line as the edge view of the fan beam laser plane of light 178. However, it should be noted that the butt cell photosensors 220 could be somewhat offset from the centerline of the plane of laser light 178, and the calculations for determining positions of various points in the floor layout system could be adjusted by those offset calculations, especially for determining/establishing an alignment axis. This optional arrangement, sometimes referred to as "characterizing" the photosensors, can make it somewhat easier to construct the base unit, if desired.

A second photosensor is provided on FIG. 8. This is a "rod" sensor, and is depicted at reference numeral 230. In this rod sensor, however, there is only a single photocell at 236. Although a typical position-sensing rod sensor would have two photocells (as depicted in FIG. 3), in the configuration of FIG. 8, the information being sought only requires a single photocell. In the base unit 100, the information being sought is whether or not laser light is impacting the rod sensor cylindrical surface, and if so, a single photocell at 236 will detect that event. On the other hand, if greater sensitivity is desired, or if the manufacturer wishes to use a standard rod sensor that already has two photocells mounted to the cylindrical rod (one on each end), then a standard rod sensor could be used, as depicted on FIG. 3.

As indicated on FIG. 8, the azimuth motor drive 162 can rotate the entire upper portion of the base unit in the horizontal plane; i.e., the rotational axis is essentially vertical, once the leveling platform has adjusted itself to making the system substantially horizontal with respect to gravity.

An alternative arrangement could be used to build a lesser expensive base unit 100. The photosensor 220 could be replaced by a small reflector that is precisely positioned to be in vertical alignment with the centerline of the plane of laser light 178. In this alternative embodiment, the opposite laser transmitter would have to be manually aimed at the reflector, when determining an alignment axis. This certainly would be more difficult to set up than the automated procedure that is described below, but it is possible, particularly for short-range situations in which the distance between the base units is relatively small. The laser receivers 24 and 34 could be entirely eliminated in this alternative embodiment.

Another way to reduce system cost is to eliminate the automatic azimuth aiming platform altogether, and instead rely on manual aiming of the laser transmitters for both base units. This second alternative embodiment would save the cost of the azimuth drive (including motor 162) and the encoder system 150. Of course, the "aiming" azimuth angles then would have to be read manually from an arcuate scale on the base unit, and these angles would have to be entered manually into the remote unit by the user every time the laser transmitter is aimed at a new benchmark point, a known point of interest, or an unknown point of interest. The possibility of errors in data entry would increase, even if the azimuth angles are correctly read in the first place.

Referring now to FIGS. 9-13, a set of illustrations is provided to more readily demonstrate the ease of use of the system being disclosed herein. In FIG. 9, a first step for aligning the axes of the two laser transmitters is depicted. The laser transmitters are part of the base units 20 and 30, which are mounted on tripods in FIG. 9. A user, generally designated by the reference numeral 45, is depicted as holding a handheld remote unit 40, within the confines of a space (or room) 700. The room 700 has a ceiling surface 710 and floor surface 712.

The laser transmitter at base unit 20 emits a laser fan beam, which has an upper angular limit line at 722 and a lower angular limit line at 724. The other laser transmitter at base unit 30 also emits a fan beam of laser light, and has an upper angular limit line at 732 and a lower angular limit line at 734.

The object in this step of FIG. 9 is to align an axis 740 between the two laser transmitters. The methodology for a detailed alignment procedure is described below, in reference to FIGS. 14-19. At this point in the description, it will be assumed that the alignment axis 740 is being determined by this procedure.

FIG. 10 illustrates the next step, which aligns the two laser transmitters to a first benchmark point (referred to on FIG. 10 as "Benchmark 1"). In FIG. 10, the interior space (or room) is referred to as reference numeral 701. The two laser transmitters have been aimed at the point of interest that is Benchmark 1, and is designated by the reference numeral 752. The two base units 20 and 30 have either had their lasers manually aimed by the user, or automatically adjusted by the user using the remote unit 40, if azimuth positioning motors and encoders are available on base units 20 and 30. After the two laser planes have been aimed so that they will intersect the first benchmark at 752, the laser planes will have an appearance as illustrated on FIG. 10. The laser plane from the fan beam laser transmitter of base unit 20 will again have angular limit lines 722 and 724, but will also produce a visible line along the ceiling at 726, and a similar visible line along the floor surface at 728. In a similar manner, the laser transmitter producing the fan beam from base unit 30 will emit angular limit lines 732 and 734, and also produces an upper visible line along the ceiling at 736 and a lower visible line along the floor surface at 738.

It will be understood that, as used herein, the terms "visible light" or "visible laser light" refer to laser light beams that are either directly visible by the human eye (i.e., having a wavelength in the range of approximately 430 nm to 690 nm), or refer to laser beams that are somewhat outside of the above "normal" range of visible acuity for human eyes, and the user is being aided by some type of special lenses. For example, the laser transmitters described herein could produce infrared (IR) laser light beams if desired, and the user could be wearing night-vision goggles; in that situation, the laser light beams would appear to be "visible" to that user, which is more or less necessary to properly use the alignment and location features of the system described herein.

The two lower laser plane edges 728 and 738 will intersect exactly at the benchmark point 752, after the two laser transmitters have been correctly adjusted for their angular position along the azimuth direction, and the user will be able to visibly see that intersection point. Moreover, the two laser planes will intersect along a vertical line 750, which will be a plumb line if the two base units have been correctly leveled. This laser line of intersection 750 will actually be visible if a solid object, or some type of smoky substance, is positioned along the line itself. At the top of the laser light line 750 will be another visible intersection of "horizontal" lines along the ceiling, which will be described below, in greater detail.

The third step is to align the laser transmitters for the two base units to the second benchmark point, which is referred to on FIG. 11 as "Benchmark 2." The interior space (or room) is designated at the reference numeral 702 in FIG. 11. The user now is required to move the angular positions of both laser transmitters for the base units 20 and 30 so that they are aimed at the second benchmark, which is designated at reference numeral 762. Both laser transmitters continue to emit a plane of laser light, and the fan beam thereby produced has divergence angles that are represented by the lines 722, 724, 732, and 734. Furthermore, there will be upper and lower visible lines along the ceiling surface and floor surface, which again are designated by the line segments 726, 728, 736, and 738.

After the two laser transmitters have been properly aimed at the second benchmark 762, the lower visible lines of the two laser planes will intersect exactly at benchmark 762, and the user will be able to visibly see that intersection point.

It will be understood that, as used herein, the phrase "intersect exactly" at a specific point on a surface means that the user has adjusted the laser transmitters so that their emanating laser fan beams produce light lines that appear to be precisely crossing that specific point. Of course, there will likely be some small tolerance of error, and it is up to the user to make the proper adjustments in aiming the base unit laser transmitters so that the light lines are as close to "exactly" crossing right at the proper location. Since the laser light lines have a discernable width, the user cannot literally align the laser beams within some imperceptible tiny distance, and thus, there will likely be a very small tolerance of error in such "exact" positions of the laser transmitter azimuth angles. However, this is a very small error indeed, and moreover, the user will quickly become very good at making these azimuth position changes of the laser transmitters such that any such errors will essentially be negligible.

As in the case of FIG. 10, there will also be an intersecting vertical line between the two laser planes, and this intersecting line is represented at the reference numeral 760 on FIG. 11. This intersecting line 760 is a plumb line, so long as the two laser transmitters have been properly leveled.

After both benchmark points have had their coordinates entered into the remote unit 40 (as per FIG. 10 and FIG. 11), the set-up of the system has been completed. Now the user will be able to enter other coordinates of interest into the remote unit 40, and cause the laser transmitters to automatically aim at those coordinates (assuming the laser transmitters are motorized and have angular encoders). FIG. 12 illustrates such a situation, in which the user has entered the coordinates of a floor point designated by the reference numeral 772 on FIG. 12. The space (or room) is designated at the reference numeral 703 on FIG. 12. The laser transmitters have been aimed so that their fan beams each produce a plane of laser light that is vertical, and both of these planes of laser light intersect exactly at the point 772 along the floor surface 712. There will also exist a vertical line of intersection between the two laser planes at the reference numeral 770. This will be a plumb line, as described before, so long as the laser base units 20 and 30 have been correctly leveled. More importantly, the two laser transmitters need to output laser planes that are substantially vertical with respect to gravity; if that correctly takes place, then the implied line 770 will also be substantially vertical with respect to gravity.

Since the plumb line 770 exists as a vertical line directly above the floor point 772, there will also be visible to the user a ceiling transfer point that is designated by the reference numeral 774. The user will see a pair of intersecting lines at point 774, which are produced by the two upper edges of the laser planes from the laser transmitters of base units 20 and 30. These are the upper edge lines of the fan laser beams along the line segments 726 and 736, which follow along the surface of the ceiling 710. This provides the user with a virtually instantaneous transfer point along the ceiling surface, every time the user first designates a floor point of interest. The ceiling transfer point 774 is automatically plumb above the floor point 772, since the implied line 770 is truly plumb. This system allows the building designer to lay out devices that are to be installed in the ceiling by using the coordinates on a two-dimensional floor plan, if desired.

The technology disclosed herein automatically can take floor points and transfer those coordinates to the ceiling; furthermore if the building plan was a three-dimensional plan, then a ceiling set of coordinates could first be entered instead of a floor set of coordinates. In that mode of operation, the two laser transmitters of base units 20 and 30 will still be able to slew automatically so that their laser fan beams will intersect the ceiling set of coordinates instead of the floor set of coordinates. The final appearance will be the same, just like what is illustrated in FIG. 12. The only difference will be that the ceiling point was determined first, instead of the floor point. There will still exist a plumb line 770 after the ceiling point has been laid out.

Referring now to FIG. 13, the ability of the system disclosed herein to create a vertical plumb line of laser light will be used advantageously. A space (or room) 704 is depicted on FIG. 13, and the two laser transmitters of base units 20 and 30 have been aimed at a floor point 782 that is located just along the edge of one of the walls, which is designated by the reference numeral 714. The laser fan beams will create a visible plumb line of laser light 780 that will be visible along the surface of the wall 714. There also will exist a ceiling intersecting point at 784 that is the top point of the line segment 780, which makes up this intersecting line between the two planes of laser light. For the implied laser plumb line 780 to be visible along the wall surface, the wall must be positioned at or fairly close to the intersecting point 782; this can be termed a "proximal" relationship—the wall must have its surface 714 proximal to the point 782, or the intersecting line of laser light 780 will "miss" the wall surface, and not be visible on that wall surface. Of course, the wall itself must be fairly plumb, or the plumb line 780 will not properly appear along the wall's surface.

As discussed in the previous paragraph, if a two-dimensional floor plan is available, then the user can start with the floor intersecting point 782 as the point of interest. On the other hand, if a three-dimensional set of floor plans is available, and if the ceiling intersecting point 784 has coordinates that are available to the user, then that point could be used to cause the laser transmitters to be aimed as depicted in FIG. 13.

After the plumb line 780 appears along the wall surface 714, the user can use that plumb line to help align and set walls, such as studded wall. In addition, once the walls have been installed, the vertical plumb line 780 can be used to help locate the positions for installation of wall outlets or HVAC ducts or vents, and other similar devices that are placed in walls of buildings.

Figure 14:
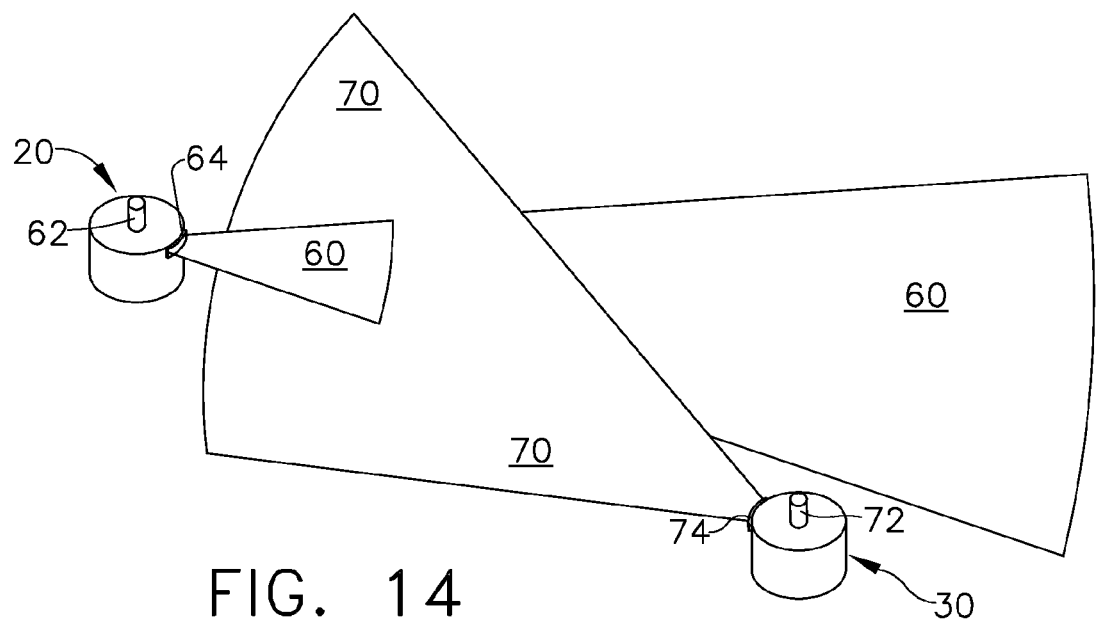
FIGS. 14-19 are diagrammatic views showing how two base units of the system of FIG. 1 can automatically establish an alignment axis therebetween.

Referring now to FIGS. 14-19, an example of a methodology for establishing an alignment axis between two base units is provided. Referring now to FIG. 14, the two base units 20 and 30 are emitting vertical planes of laser light in a fan beam shape, in which the plane of laser light for base unit 20 is designated by the reference numeral 60, and the plane of laser light from base unit 30 is designated by the reference numeral 70. As can be seen in FIG. 14, laser light planes 60 and 70 intersect one another, but they are not aligned, nor do they intersect the opposite base unit.

In FIG. 14, base unit 20 has a positioning photosensor at 64, which typically can be a "butt cell" set of photocells that are precisely aligned to the center of the emitted laser fan beam. Base unit 20 has a second photosensor at 62 that comprises a photocell and a cylinder lens. The cylinder lens extends vertically above the top of the base unit structure (this is similar to element 230 on FIG. 8), and the photocell is attached at one end of the cylinder lens (which is similar to the photocell 236 on FIG. 8). This photocell and cylinder lens combination 62 is roughly aligned to the rotation center of base unit 20. (It does not need to be precisely aligned. Photosensor 62 provides "gross" alignment sensing capability for detecting the laser beams of the other laser transmitter, from base unit 30.)

In a similar fashion, base unit 30 also includes a positioning photosensor 74 which typically can be a "butt cell" array of photocells, which are precisely aligned to the center of the emitted laser fan beam 70. (Note: this "precise" alignment could include characterizing the array of photocells to correct for any offset, in case the position of the laser beam output and the photosensor's null point are not perfectly aligned.) Also, base unit 30 includes a cylinder lens and photocell combination at 72, which is roughly (not precisely) aligned to the rotation center of that base unit. Photosensor 72 provides "gross" alignment sensing capability for detecting the laser beams of the other laser transmitter, from base unit 20.

Figure 15:
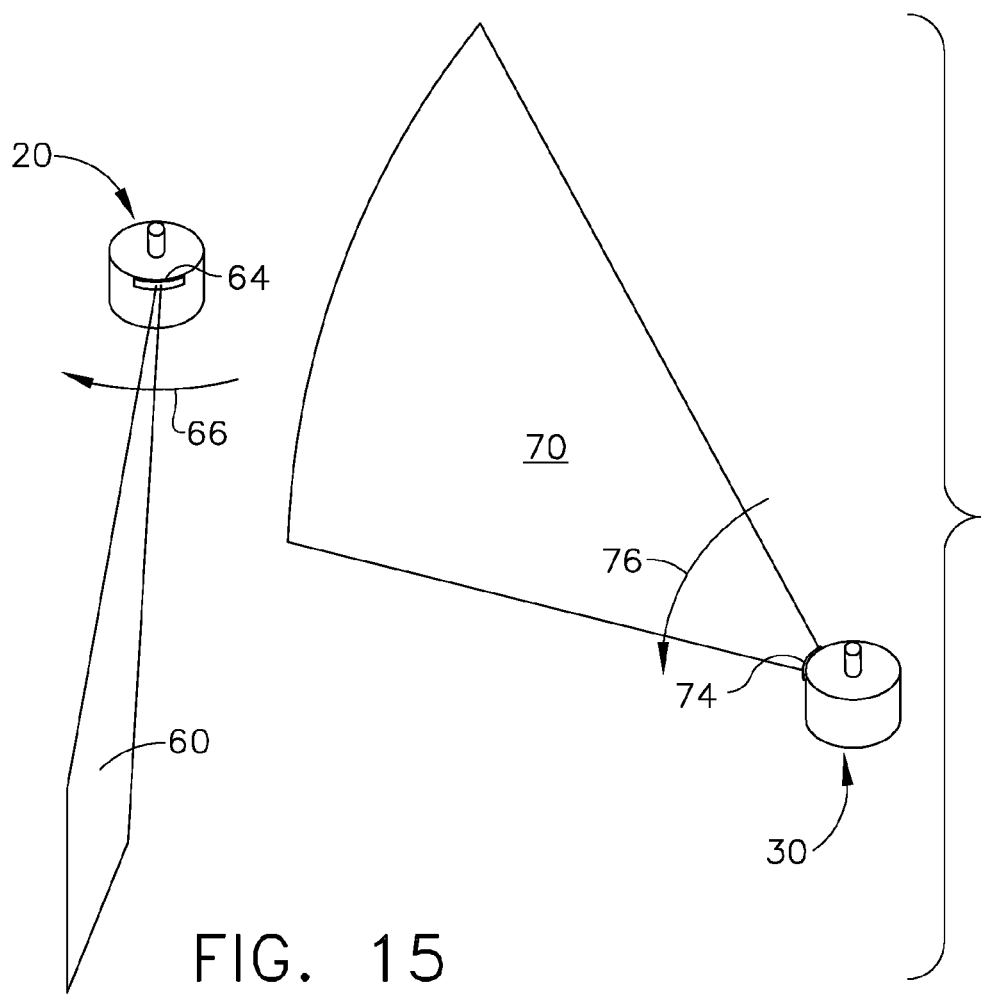

Referring now to FIG. 15, the user has entered a command so that each base unit will begin to rotate. The purpose of this rotation is to have the cylinder lens/photocell combination (either 62 or 72) detect the laser beam from the other base unit. In FIG. 15, it can be seen that both laser fan beams have changed position, but neither fan beam 60 or 70 are intersecting the other base unit. Laser fan beam 60 is rotating in the direction of an angular arc line 66, while base unit 30 has its laser transmitter beam 70 rotating in the direction of an angular line 76.

Figure 16:
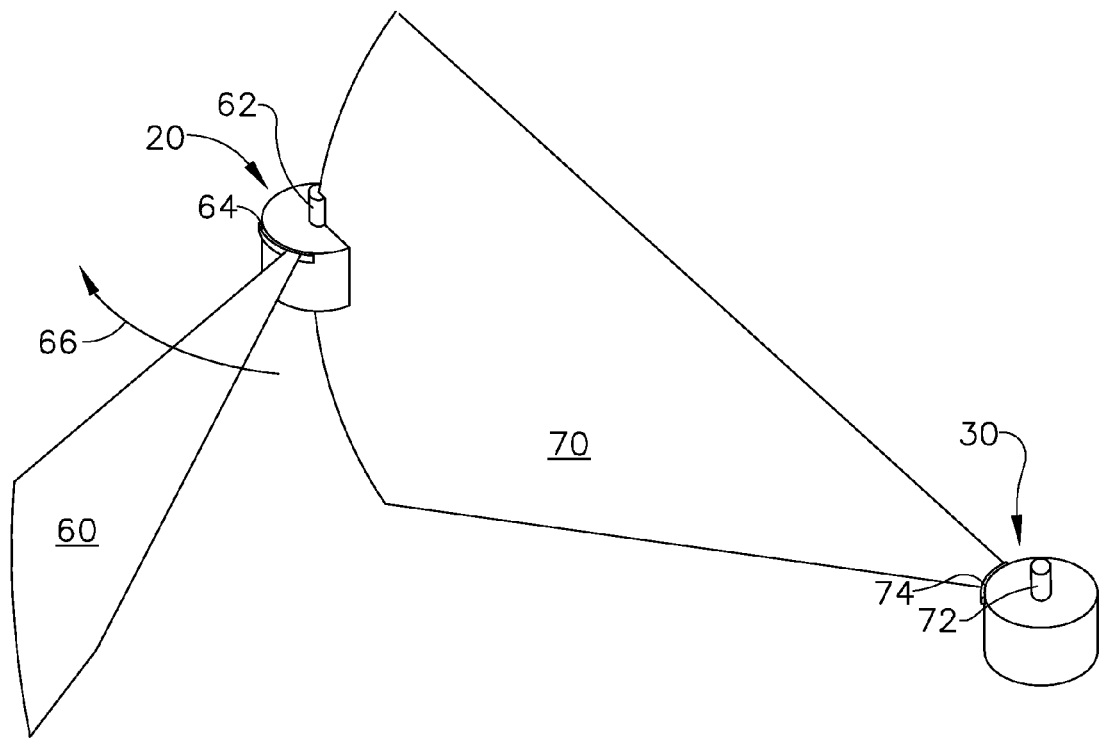
Figure 17:
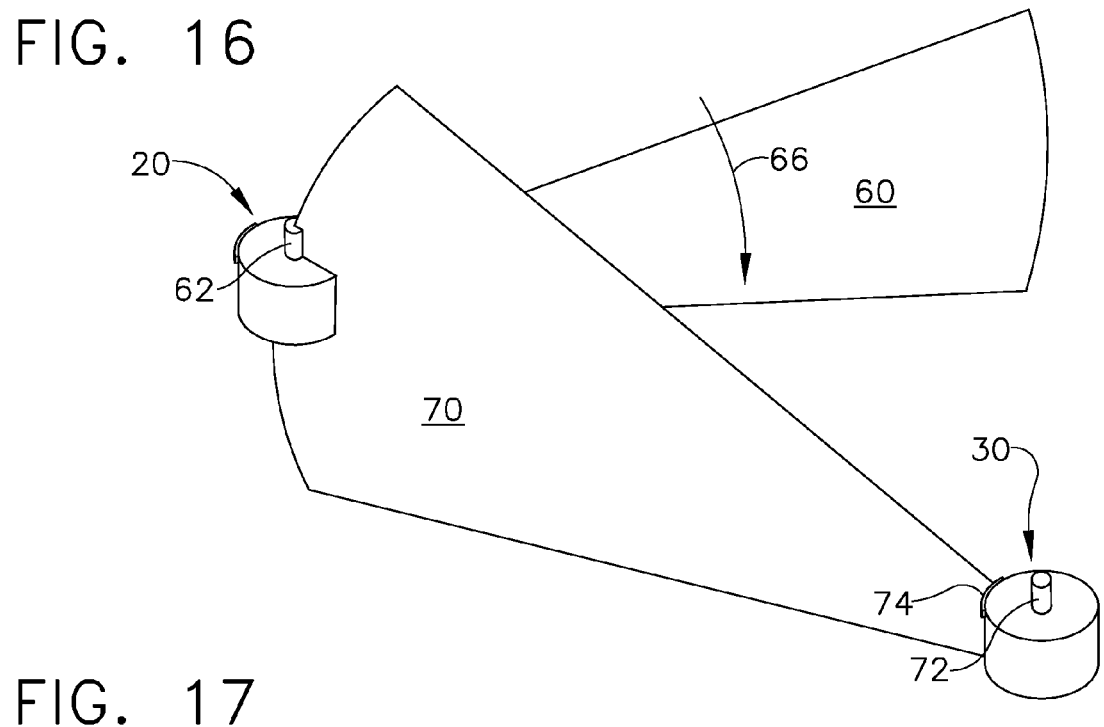

Referring now to FIG. 16, the laser fan beam 70 has intersected the vertical photosensor 62 of base unit 20. When this occurs, base unit 30 can stop rotating its fan beam 70, because it is now roughly in the correct position. However, the fan beam 60 from base unit 20 still needs to continue rotating in the direction 66. In FIG. 17, the fan beam 60 is still rotating from base unit 20, but has not yet intersected base unit 30. The fan beam 70 from base unit 30 has stopped, and is still intersecting the vertical photosensor 62.

Figure 18:
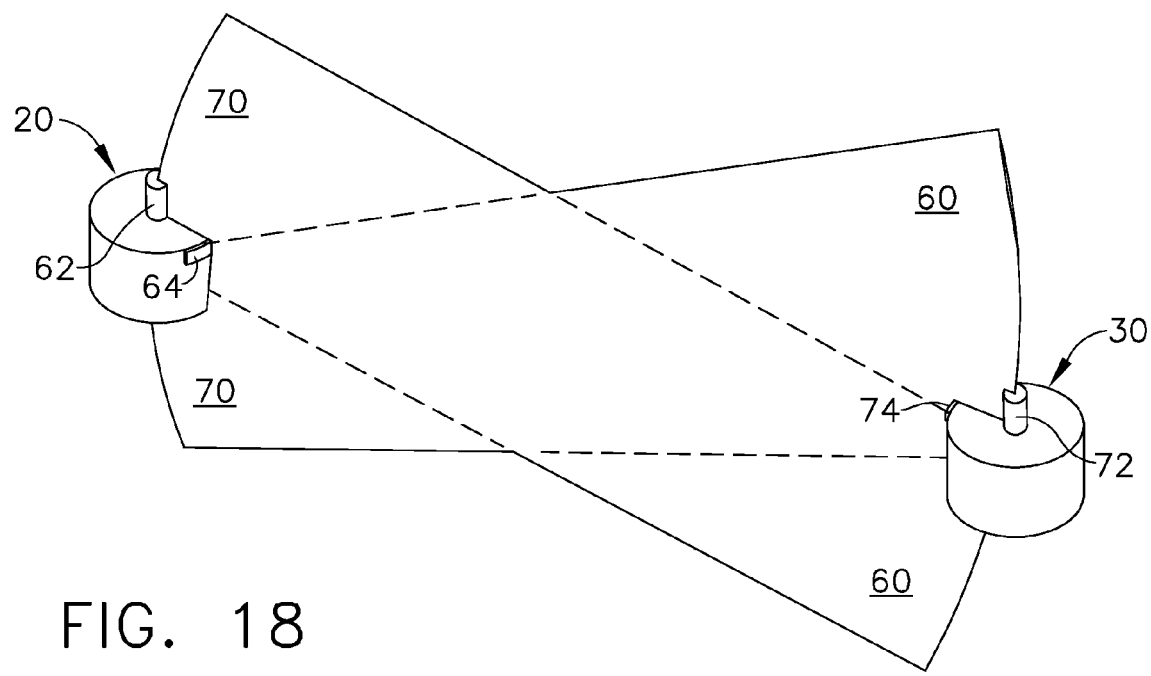

Referring now to FIG. 18, the laser fan beam 60 from base unit 20 has intersected the photosensor 72 of base unit 30, and the laser transmitter at base unit 20 now will stop rotating. At this time, both fan beams 60 and 70 are roughly aligned with the opposite base units 30 and 20 respectively.

Figure 19:
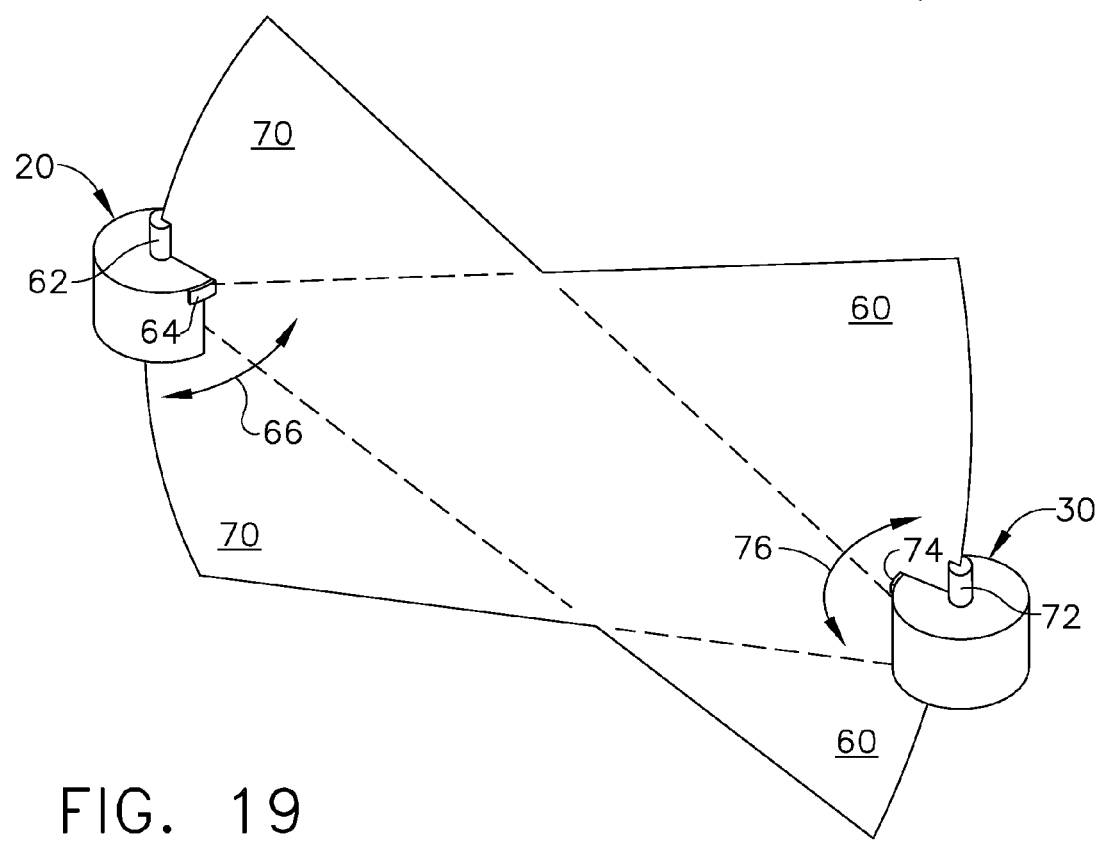

Referring now to FIG. 19, the positioning photocells 64 and 74 now come into play. Assuming these two photocells each comprise a pair of butt cell photosensors, they will have a deadband width between the two photosensitivity areas of the butt cell arrangement, and this deadband width is the desired position that will be sought by the two laser fan beams 60 and 70. Using the positioning photocells 64 and 74, the laser receivers on the two base units 20 and 30 will be able to determine the exact position of the laser strike of the fan beams 60 and 70 within a very small tolerance. The output signals from the laser receivers can be used to command the azimuth positioning motors of both laser transmitters for the base units 20 and 30 to move in small amounts until the vertical edge of the laser planes 60 and 70 are striking the butt cell deadband positions.

The butt cell deadband width can be made quite small, perhaps as small as 0.005 inches, if desired. In FIG. 19, the two laser transmitters are rotated iteratively until each of their fan beams are striking within the deadband width of the butt cells on the opposite base unit. This will now provide a very precise alignment axis between the two base units 20 and 30.

Figure 20:
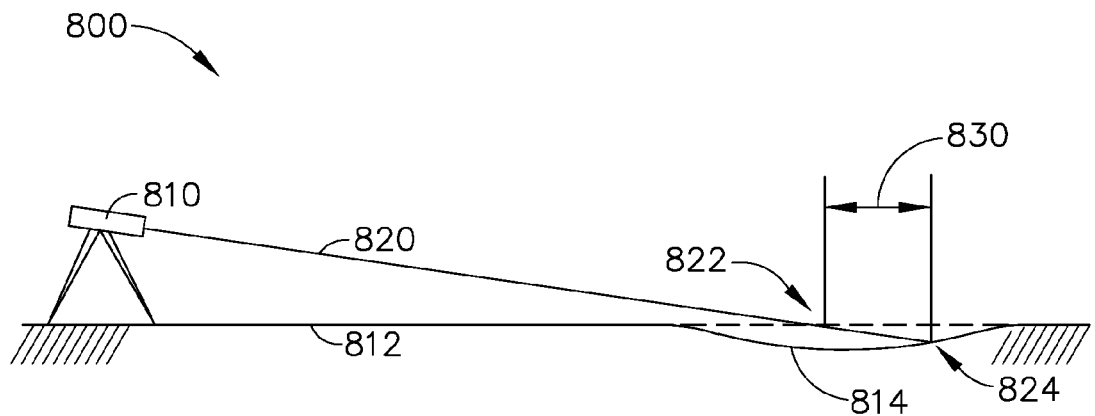
FIG. 20 is an elevational view of a conventional laser position pointing system that is known in the prior art, depicting its attempt to project a position of a point of interest on an uneven jobsite floor.
Figure 21:
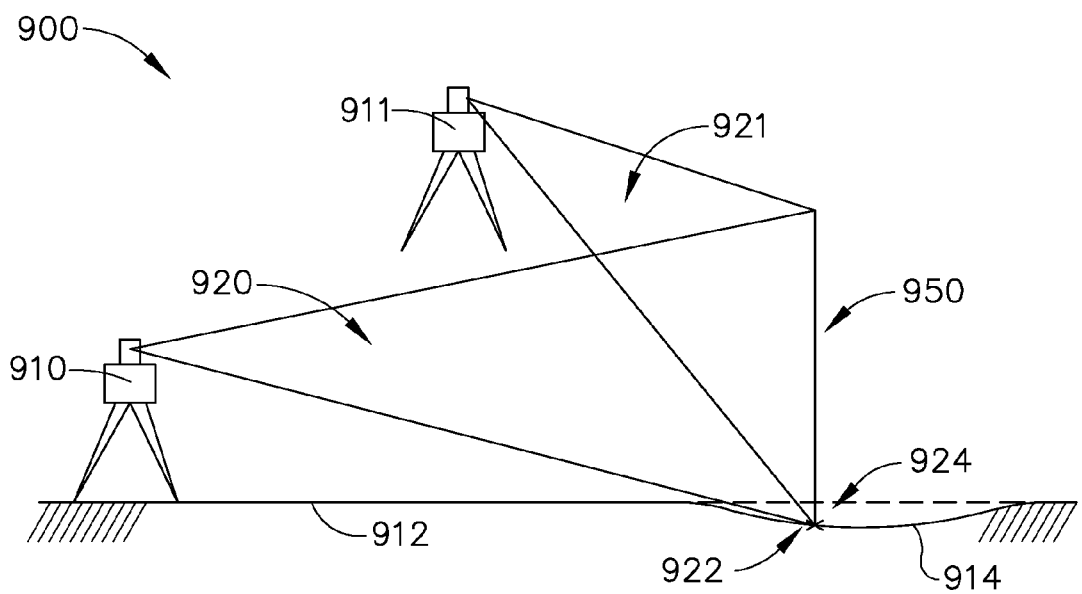
FIG. 21 is an elevational view of the system of FIG. 1, showing two base units with laser transmitters that correctly project a position of a point of interest on an uneven jobsite floor.

Another benefit of the technology disclosed herein is illustrated on FIGS. 20 and 21. FIG. 20 illustrates a conventional (prior art) laser pointing system that is currently used for floor layout procedures. This prior art system is generally designated by the reference numeral 800, and it includes a laser transmitter 810 that is mounted on a tripod, and this assembly is placed on a floor surface 812. This pointing laser system is designed to literally point its laser beam 820 directly at a particular spot on the floor surface 812, and that spot visually designates the point of interest for the user. This system will work, so long as the floor surface is actually flat and horizontal within the tolerance required for the laser pointer system to successfully designate the point of interest.

However, if there is any kind of unevenness in the floor, such as a depression that is designated by the reference numeral 814, then the accuracy of laser pointing system 800 is completely thrown off. It will be understood that the depression 814 could just as easily be a protrusion in the floor surface, and that would also negatively impact the accuracy of the system 800.

The reference numeral 822 designates the true position for the point of interest on the floor surface where laser beam 820 is attempting to designate that position. However, because of the depression in the floor at 814, the projected point on this uneven surface is at a different physical location in the horizontal direction, which is designated by the reference numeral 824. This causes a position error that is designated by the reference numeral 830. Depending upon the horizontal distance between the true position 822 and the position of the laser transmitter 810, the position error 830 can be significant, and will render the system useless for its intended accuracy.

Referring now to FIG. 21, the technology disclosed herein can be used with two laser transmitters, as described above, and this type of system is generally designated by the reference numeral 900. A first laser transmitter is at 910, and a second laser transmitter is at 911. Laser transmitters 910 and 911 are both mounted on tripods, and both emit a laser fan beam (in this example), in which the fan beam for laser transmitter 910 is designated by the reference numeral 920, and the fan beam for laser transmitter 911 is designated by the reference numeral 921.

Both laser transmitters are positioned on a floor surface, which is generally designated by the reference numeral 912. A point of interest is entered into the system that controls the azimuth of both laser transmitters 910 and 911, and therefore, they will be aimed at the correct location on the floor surface. On FIG. 21, the true position of the point of interest is designated by the reference numeral 922. It so happens that the point of interest 922 lies in a depression in the floor, which is designated by the reference numeral 914. However, the vertical planes of the two laser fan beams 920 and 921 intersect in a vertical plumb line at 950, and this plumb line will run from its uppermost limit at the top edge of the laser fan beams 920 and 921 down to its lowermost limit (along line 950), which intersects the floor surface in the depression 914, at a point 924.

Because of the way system 900 operates to create the plumb line 950, the indicated position of the point of interest at 924 will fall exactly at the true position of the point of interest at 922. Therefore, no error will occur between the true position 922 and the point that is projected onto the floor surface 924, even when that projected point falls within a depression, such as the depression 914. This will also be true if, instead of a depression, there is a protrusion in the floor surface. This feature is a very significant advantage provided by the technology disclosed herein.

Enhanced Capability Base Unit

Figure 25:
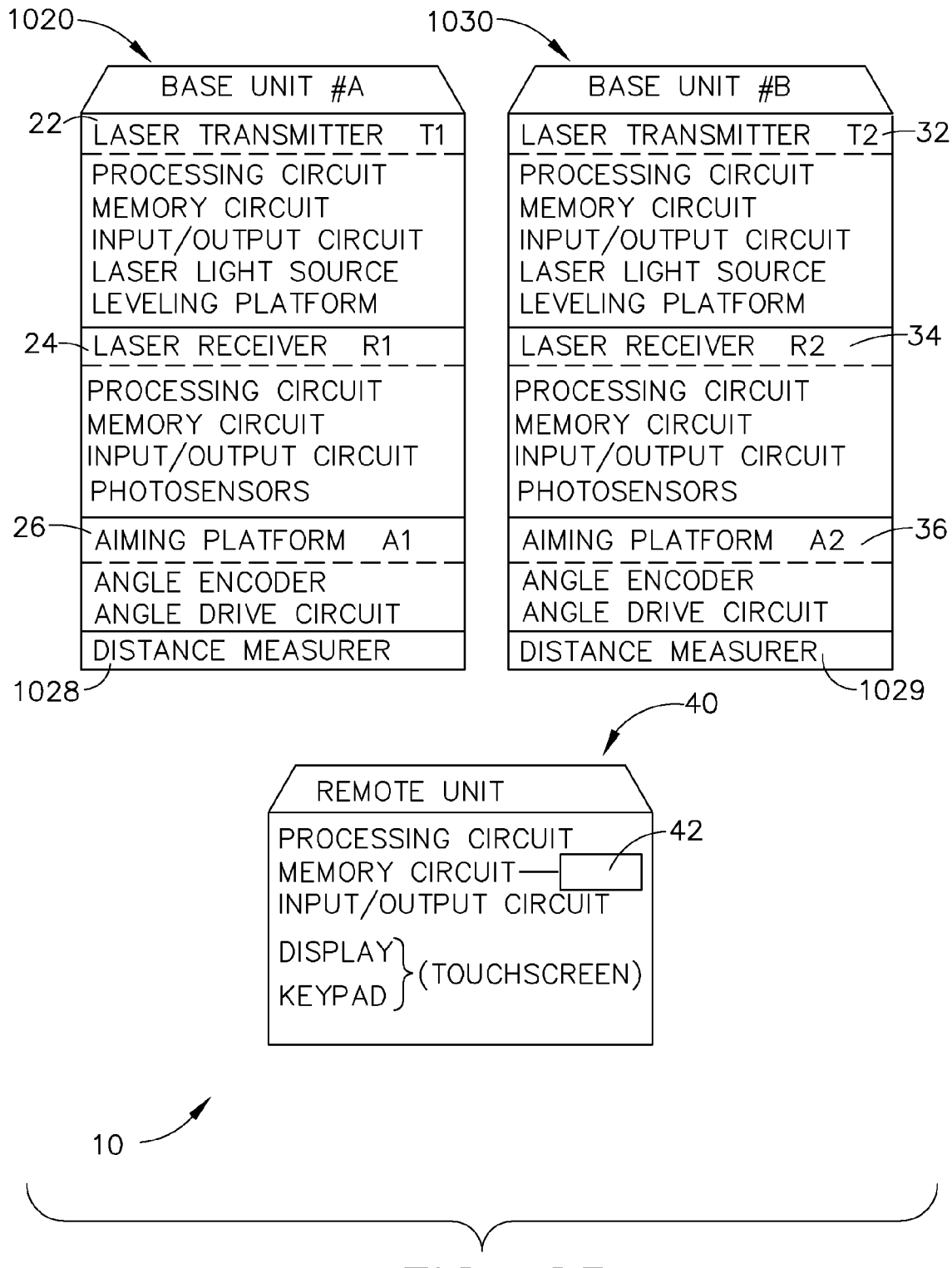
FIG. 25 is a block diagram of the major components of a base unit with enhanced capabilities that is used in a layout and point transfer system, as constructed according to the principles of the technology disclosed herein.

Referring now to FIG. 25, an alternative embodiment for an exemplary enhanced capability base unit is disclosed in a block diagram format. The base unit #A is generally designated by the reference numeral 1020, and includes a laser transmitter 22, a laser receiver 24, and an aiming platform 26, similar to what was disclosed in FIG. 1 for the base unit 20. In addition, base unit 1020 includes a distance measurer device 1028.

In a similar fashion the base unit #B, generally designated by the reference numeral 1030, includes a laser transmitter 32, laser receiver 34, and an aiming platform 36, much like the base unit 30 on FIG. 1. In addition, base unit 1030 includes a distance measurer 1029.

Figure 27:
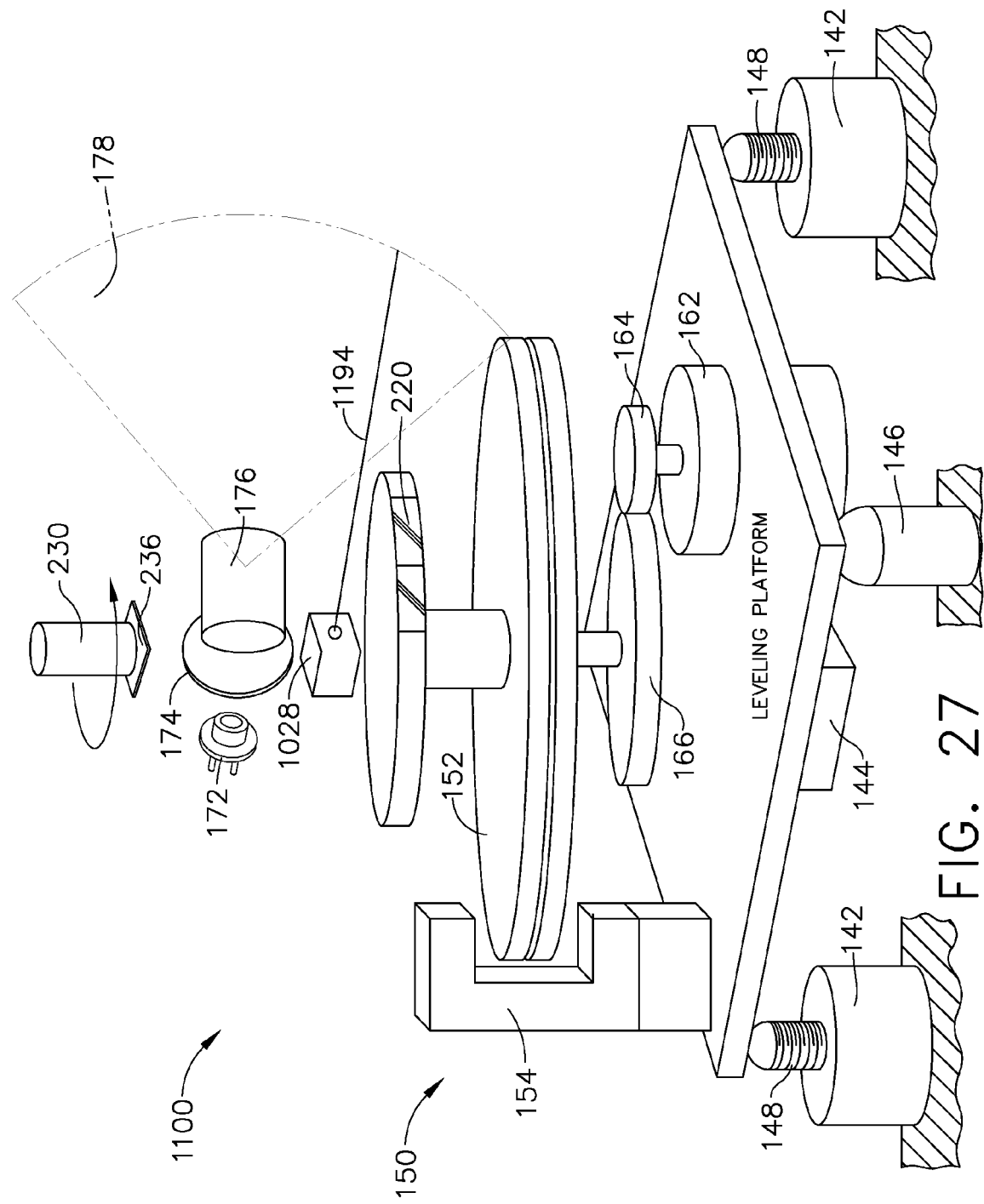
FIG. 27 is a diagrammatic view of an enhanced capabilities "automatic" base unit, as used in the system of FIG. 25.

FIG. 27 illustrates an exemplary alternative embodiment base unit with enhanced capabilities, generally designated by the reference numeral 1100. It is similar in structure and function to the base unit 100 that was illustrated on FIG. 8. However the alternative embodiment base unit 1100 includes a laser distance measurer 1028, which is the same device that was shown diagrammatically on FIG. 25. The laser distance measurer 1028 is mounted on the rotating platform 152, and its output laser beam 1194 is aimed to be coplanar with the fan beam 178. It will be understood that various types of distance measuring instruments could be used for the device 1028, and it does not necessarily need to be a "laser" distance measuring device. In this description herein, the distance measuring device (DMD) will often be referred to as a "laser"-type device, because such devices are well known in the surveying and construction industry. Moreover, a laser distance measuring device would typically work quite well for use in the technology disclosed herein; such devices are often referred to as "laser distance meters."

In general, a laser distance meter is a device which includes a modulated light laser transmitter, a modulated light laser receiver, and a processing circuit that determines a flight time of a modulated light laser beam that is emitted by the directional laser transmitter until its reflected (still modulated) light is received by the laser receiver. The processing circuit then converts the flight time into a distance to the aimed at target. An example of an exemplary laser distance meter is a Trimble Model No. HD100.

In the illustrated embodiment of FIG. 27, there is a laser diode 172 that produces a light beam, and after being aimed through a collimating lens 174 and a cylinder lens 176, a fan beam is emitted. Such a fan beam is a purely static light plane, and is well suited for use in the technology disclosed herein. It should be noted, however, that other types of laser beams can be used in the technology disclosed herein, and with good results. For example, a rotating laser beam could be used (in which a laser light line is emitted) which rotates along a vertical plane and creates the illusion of a static vertical fan beam, although the laser light beam is actually constantly moving as it sweeps through the vertical plane. It will be understood that a dithering laser beam is a form of a rotating laser beam, and such a dithering laser beam could be used to create the illusion of a static vertical fan beam; a dithering laser beam would not rotate along an entire circle of 360 degrees, but instead would rotate back and forth along a narrower arc, while sweeping through its angular movements to create a vertical plane of laser light.

Dithering assumes that the source is a laser spot, or a short line segment, as opposed to a line. A rotating laser also uses a laser spot source. A rotating laser spot, being incident on a surface at some distance, traces out a line around the entire perimeter (which also describes a "plane" of laser light). For the same rotor speed, as distance increases the spot's linear speed necessarily increases, which reduces the perceived brightness of the line the laser beam is tracing out. One solution for this loss of perceived brightness is to "dither" the beam.

Dithering the laser beam is accomplished by determining limits of the subtended arc desired and then oscillating the beam within these extents, back and forth, so as to trace out a line that is significantly shorter than the full perimeter provided by a (360 degree) rotating laser. The effect is to sweep the beam in the area of interest (i.e., where the work is to be performed) in a shorter path length and slower linear speed, thus increasing the perceived brightness of the line locally traced out. Note that the traced length, being shorter than the full 360 degree perimeter, allows for a slower linear speed of the beam at potentially the same frequency (refresh rate).

It will be understood that, as used herein, the terms "laser light plane" and "laser fan beam" (or simply "fan beam") will refer to one of at least the following three situations: (1) a purely static plane of laser light that literally fans out optically in real time from some type of spreading lens (such as the cylinder lens 176); (2) a rotating beam of laser light that, in a given instant creates a single line of photons that is aimed at only one angular position at that instant, but over an entire operating cycle of rotational movement, describes an entire circular arc that effectively creates a laser "plane" of photons, and over a fairly brief period of time has the appearance of creating a static fan beam over the entire 360 degrees of a circle; or (3) a dithering beam of laser light that, in a given instant also creates a single line of photons that is aimed at only one angular position at that instant, but over an entire operating cycle of back and forth movement, describes an arc of less than 360 degrees that also effectively creates specific sector of a laser "plane" of photons, and over a fairly brief period of time has the appearance of creating a static fan beam over the entire prescribed sector (i.e., over less than 360 degrees of a circle). In terms of real time operation, any one of these methodologies for generating such a laser fan beam will, for practical uses on a jobsite, create an apparent static plane of laser light. Such an apparent static plane of laser light is not dependent upon having a narrow laser beam positioned at a precise linear direction at a specific moment in time, for the purpose of working with other "moving" laser beams (or other electronically-generated signals) to establish some type of positional alignments, such as those used in certain prior art positional-sensing or positional-indicating systems.

Figure 26:
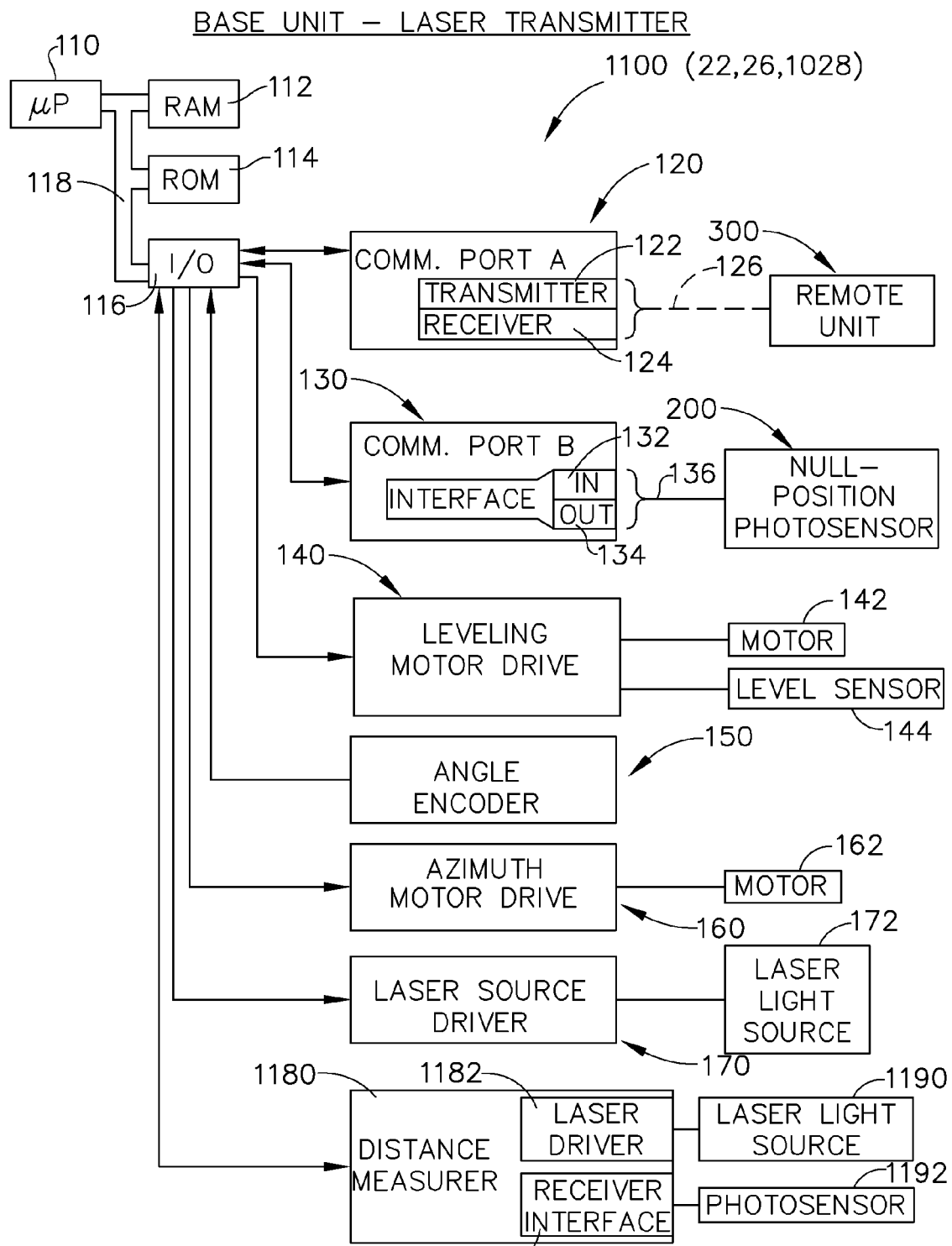
FIG. 26 is a block diagram of the major components of a laser receiver with enhanced capabilities that is part of the base unit that is depicted in FIG. 25.

Referring now to FIG. 26, a block diagram of the alternative (enhanced capability) base unit 1100 of FIG. 27 is depicted. Most of the components on FIG. 26 were also included in the base unit 100 that was depicted on FIG. 2. A distance measurer device (DMD), generally designated by the reference numeral 1180, is included in the base unit 1100. Distance measurer 1180 communicates with the microprocessor 110 through the input/output circuit 116. The distance measurer 1180 includes a laser driver circuit 1182 and a laser beam receiver interface circuit 1184. The laser driver 1182 provides current for a laser light source 1190, which emits the light beam 1194 (as shown on FIG. 27). A photosensor 1192 receives the reflected laser light (from light beam 1194), and the current output by the photosensor 1192 is directed to the laser receiver interface circuit 1184. After appropriate amplification and possible demodulation, that signal is sent through the I/O circuit 116 to the microprocessor 110. In this manner, the DMD 1180 can determine an accurate distance between the base unit 1100 and a target that light beam 1194 is reflected from, back to the photosensor 1192.

It should be noted that FIG. 25 does not include an architect computer, although one could (optionally) be used in such a system. However, using the enhanced capability base units of FIG. 25 and FIG. 27, the user does not require an architect computer. In fact, the user will be creating his or her own new virtual floor plan of an existing "built-out" room when working with this equipment, using a remote unit as a monitor and generating the virtual floor plan from information derived by the base units, and the new virtual floor plan will be resident on the remote unit, not on an architect's computer. On the other hand, once a new virtual floor plan is created by the user, that virtual floor plan optionally could be downloaded onto a separate architect computer, if desired.

Referring now to FIGS. 28-32, an example of a methodology for establishing an alignment axis between two base units is provided, viewed from the perspective of a human user working within a room or space on a jobsite. On FIG. 28, there is a human user 45 holding a wireless remote unit, generally designated by the reference numeral 40. This wireless remote unit has a radio antenna 44, which could also be of some other type of communications hardware, if desired. The wireless remote also has a display 342, which preferably is a touch screen display so that the user can enter commands directly on the display. If a non-touch screen display is used, then some type of keypad entry device would be desired.

Figure 28:
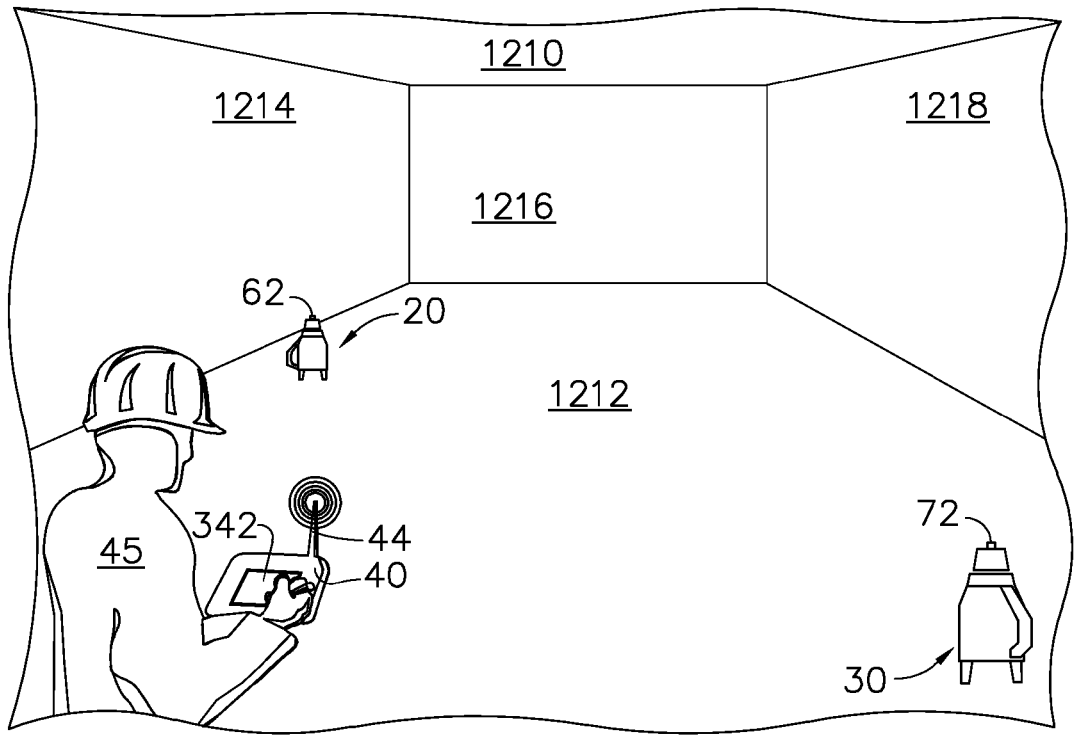
FIGS. 28-32 are diagrammatic views showing how two base units of the type described herein can automatically establish an alignment axis therebetween, from the perspective of a human user in an existing space.

On FIG. 28, the user 45 is standing in a room or a space under construction, in which the ceiling of the room is designated at the reference numeral 1210, the floor surface is at reference numeral 1212, a left-side wall (typically vertical) is at reference numeral 1214, a front wall is at reference numeral 1216 and a right-side wall is at reference numeral 1218. There are two base units 20 and 30 that are resting on the floor surface 1212.

The user may place the base units 20 and 30 at any desired positions on the floor surface 1212. In this example methodology starting on FIG. 28, no benchmark points have been established as of yet, and there is no virtual floor plan resident on the remote unit 40. The base units will typically have the circuitry as described on FIG. 1, along with associated sensors, including a photosensor 62 for the first base unit 20, and a photosensor 72 for the second base unit 30. The next few figures will describe a methodology for establishing an axis between the two laser transmitters of base units 20 and 30, much like what was described above in reference to FIGS. 14-19.

Figure 29:
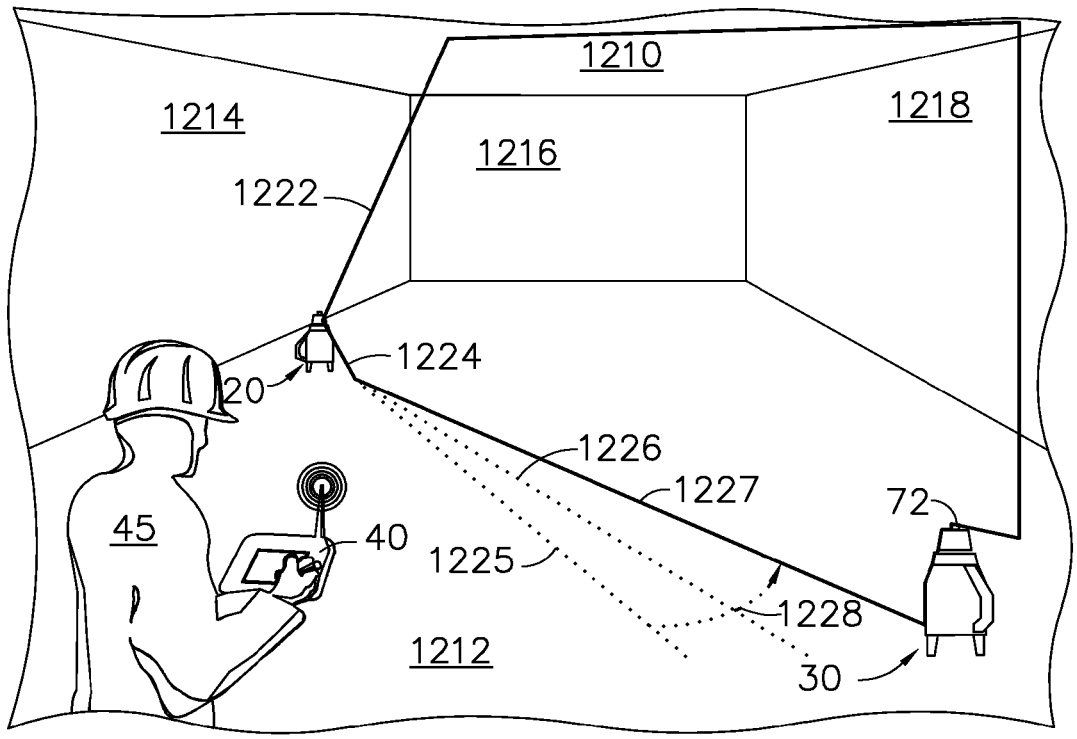
Figure 30:
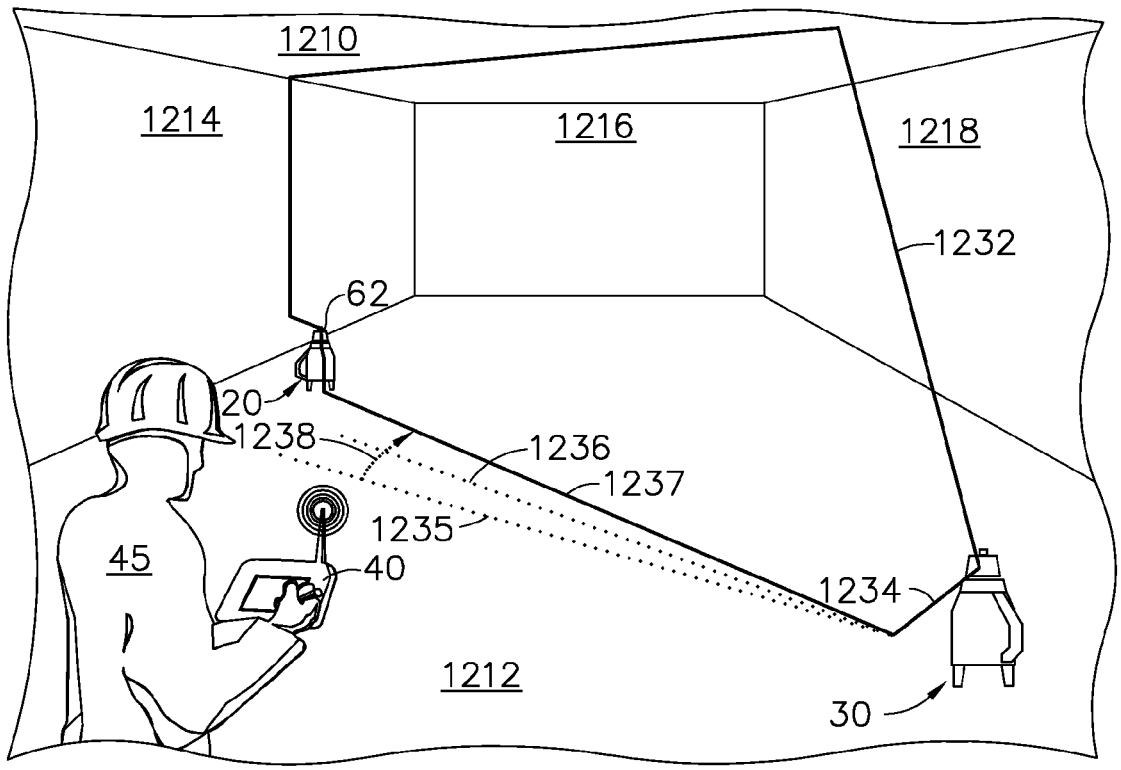

Referring now to FIG. 29, base unit 20 is emitting a vertical plane of laser light in a fan beam shape, in which the upper edge of the fan beam is designated at the line 1222, and the lower edge of the fan beam is designated at the line 1224. The lower edge of the fan beam is seen as a visible line that travels across the floor surface at 1212, which is directed at various angular positions as the laser transmitter rotates on base unit 20. On FIG. 29, the first position of the laser light line on the floor surface is illustrated at 1225, and then as the fan beam rotates in the direction of arrow 1228, a later line of laser light appearing on the floor surface is illustrated at 1226, and a yet later line of laser light is illustrated at the line 1227. When the fan beam from base unit 20 impacts the photocell 72 of the base unit 30, a command is sent to the base unit 20 to stop its rotation of the laser fan beam, so it stops its movement while impacting the photosensor 72.

As noted above, base unit 20 has a positioning photosensor at 64, which typically can be a "butt cell" set of photocells that are precisely aligned to the center of the emitted laser fan beam. Base unit 20 has a second photosensor at 62 that comprises a photocell and a cylinder lens. The cylinder lens extends vertically above the top of the base unit structure (this is similar to element 230 on FIG. 8), and the photocell is attached at one end of the cylinder lens (which is similar to the photocell 236 on FIG. 8). This photocell and cylinder lens combination 62 is roughly aligned to the rotation center of base unit 20. (It does not need to be precisely aligned. Photosensor 62 provides "gross" alignment sensing capability for detecting the laser beams of the other laser transmitter, from base unit 30.)

As discussed above, base unit 30 also includes a positioning photosensor 74 which typically can be a "butt cell" array of photocells, which are precisely aligned to the center of the emitted laser fan beam 70. Base unit 30 also includes a cylinder lens and photocell combination at 72, which is roughly (not precisely) aligned to the rotation center of that base unit.

Photosensor 72 provides "gross" alignment sensing capability for detecting the laser beams of the other laser transmitter, from base unit 20.

As depicted on FIG. 29, the user enters a command so that base unit 20 will rotate its laser fan beam transmitter. The purpose of this rotation is to have the omni-directional photocell 72 detect the laser beam at the other base unit 30. The laser fan beam from base unit 20 is rotating in the direction of an angular arc line 1228, as discussed above. Once the laser fan beam has intersected the vertical photosensor 72 of base unit 30, base unit 20 can stop rotating its fan beam, because it is now roughly in the correct position.

There also is a vertical plane of laser light in a fan beam shape being emitted by the other base unit 30, and it is desired for that fan beam to impact the photosensor 62 of base unit 20. This situation is depicted on FIG. 30. The top edge of the fan beam emitted by base unit 30 is located along the line 1232, and the bottom edge of this laser fan beam is located along the line 1234. The fan beam laser plane emitted by base unit 30 will create a line along the floor surface 1210, starting at a position 1235, and then as the line rotates in the direction of the arrow 1238, the visible laser light line changes position to the line 1236, and finally to the line 1237, where it impacts the photosensor 62 of base unit 20.

Figure 31:
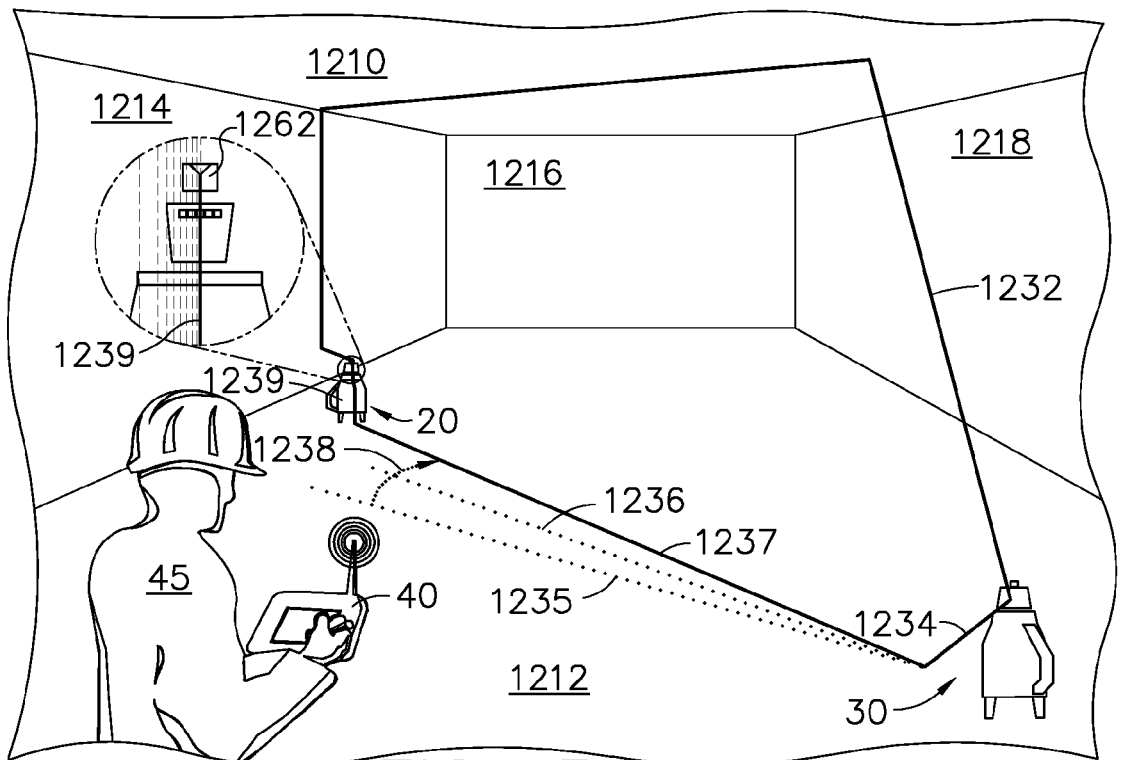

On FIG. 31, the laser fan beam 60 from base unit 20 has intersected the photosensor 72 of base unit 30, and the laser transmitter at base unit 20 now will be commanded to stop rotating. At this time, both fan beams (at lines 1227 and 1237) are roughly aligned with their opposite base units 30 and 20 respectively.

Referring now to FIG. 31, the null-position photocells 220 (see FIG. 8) now come into play. Assuming these null-position photocells 220 comprise a pair of butt cell photosensors, they will have a deadband width between the two photosensitivity areas of the butt cell arrangement, and this deadband width is the desired position that will be sought by the two laser fan beams of base units 20 and 30. Using the null-position photocells 220, the laser receivers 24 and 34 on the two base units 20 and 30 will be able to determine the exact position of the laser strike of the fan beams within a very small tolerance. The output signals from the laser receivers can be used to command the azimuth positioning motors of both laser transmitters for the base units 20 and 30 to move in small amounts until the vertical edge of the laser planes 60 and 70 are both striking the butt cell deadband positions.

The butt cell deadband width can be made quite small, perhaps as small as 0.005 inches, as noted above. In FIG. 31, the two laser transmitters are rotated iteratively (back and forth) until each of their fan beams are striking within the deadband width of the butt cells on the opposite base unit. This will now provide a very precise alignment axis between the two base units 20 and 30.

Figure 32:
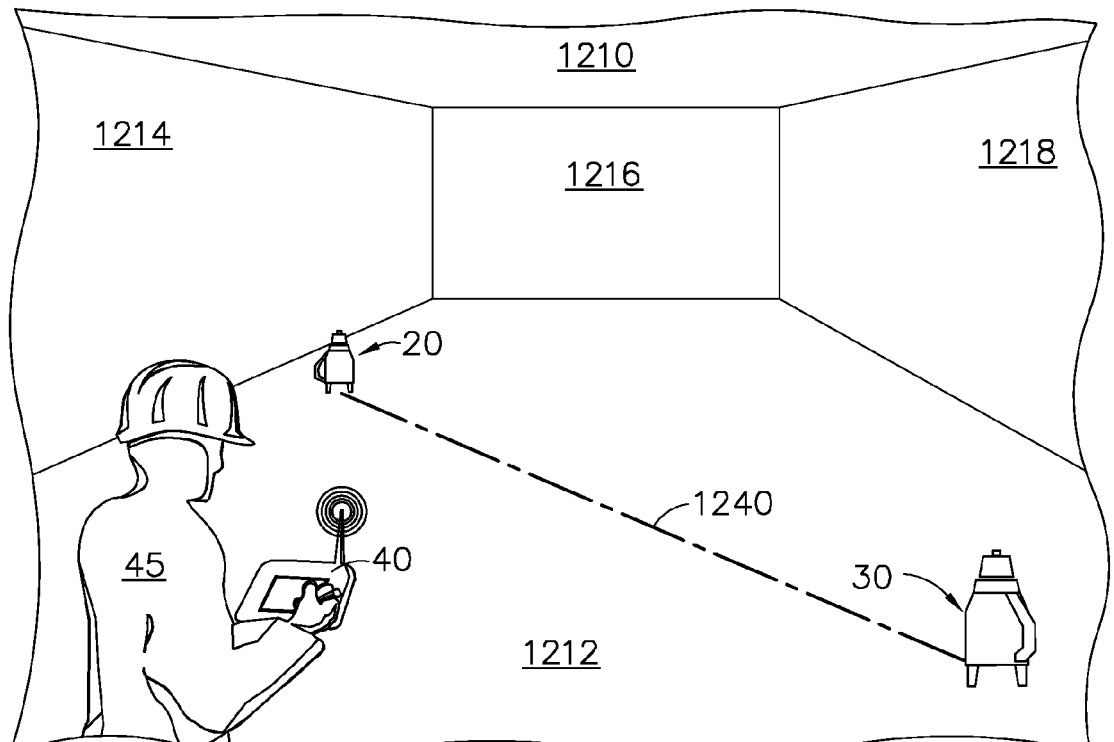

On FIG. 31, a vertical line 1239 can be seen striking the base unit 20. In the inset view of FIG. 31, it can be seen that the increments of movement of the rotation of the laser fan beam emitted by base unit 30 can be made smaller and smaller, particularly after the fan beam begins striking the omni-directional photosensor 1262. Once the fan beam impacts the photosensor 1262, the fine-positioning photosensors (e.g., null-positional butt cell photosensors) can take over the positioning commands for the base unit 30, with regard to which direction it should rotate its laser transmitter. As stated above, these commands can be made in smaller and smaller positioning increments, and if the target is overshot, then the rotation direction can be reversed from that of the arrow 1238, until the deadband of the butt cells has been targeted. Once that occurs, then both fan beams emitted by base units 20 and 30, should be in the same alignment plane, and an alignment axis 1240 has become established, as depicted in FIG. 32.

In greater detail, the positioning commands that are sent to and from the base units 20 and 30 will probably be transmitted through the remote unit 40. However, it is also possible for the base units to talk directly to one another, if that option is selected by the designer of the equipment. Yet another option is to allow the user to manually point the laser transmitters at the opposite base unit, and if done with sufficient accuracy, that manual operation situation would eliminate the need for an omni-directional photosensor on top of the base units. Of course, this last option would eliminate many of the nice features of using automatic control of the base units, which otherwise is provided by the technology disclosed herein.

In a preferred mode of controlling the base units, a typical operation would be causing the base unit 20 to rotate its fan beam until the omni-directional photosensor 72 on base unit 30 eventually receives that fan beam. When this occurs, base unit 30 will send a message to the remote unit 40 that it is now sensing the fan beam from base unit 20. The remote unit 40 quickly sends a message to base unit 20, so that the base unit 20 will stop rotating its fan beam. At that point, the fine adjustment of the null sensing array (e.g., the butt cells) will be used to sense the exact relative position of the fan beam as it impacts base unit 30, and base unit 30 will send corresponding information through the remote 40 (to then be transmitted to base unit 20), instructing base unit 20 which direction it should rotate its laser fan beam. Eventually the fan beam emitted by base unit 20 will reach the null position on base unit 30, and when that occurs, a command will be sent (typically starting at base unit 30) to base unit 20 instructing it to stop moving its rotatable laser transmitter, and its fan beam will then be aimed directly at the deadband of the null-position sensor of base unit 30.

It should be noted that a very precise omni-directional axis sensor might be developed that could eliminate the need for the butt cell array. However, this would require a quite precise omni-directional sensor, in which the characteristic response curve would need to exhibit a relatively sharp change in signal versus the angle of incidence of the laser light beam as it impacts the sensor itself. Some signal processing might also be usable to improve the overall characteristics of such an omni-directional sensor for this purpose. It will be understood that a certain amount of fine alignment is needed for the axis to be established between the two base units 20 and 30. Otherwise, the results on the jobsite will be diminished.

Figure 33:
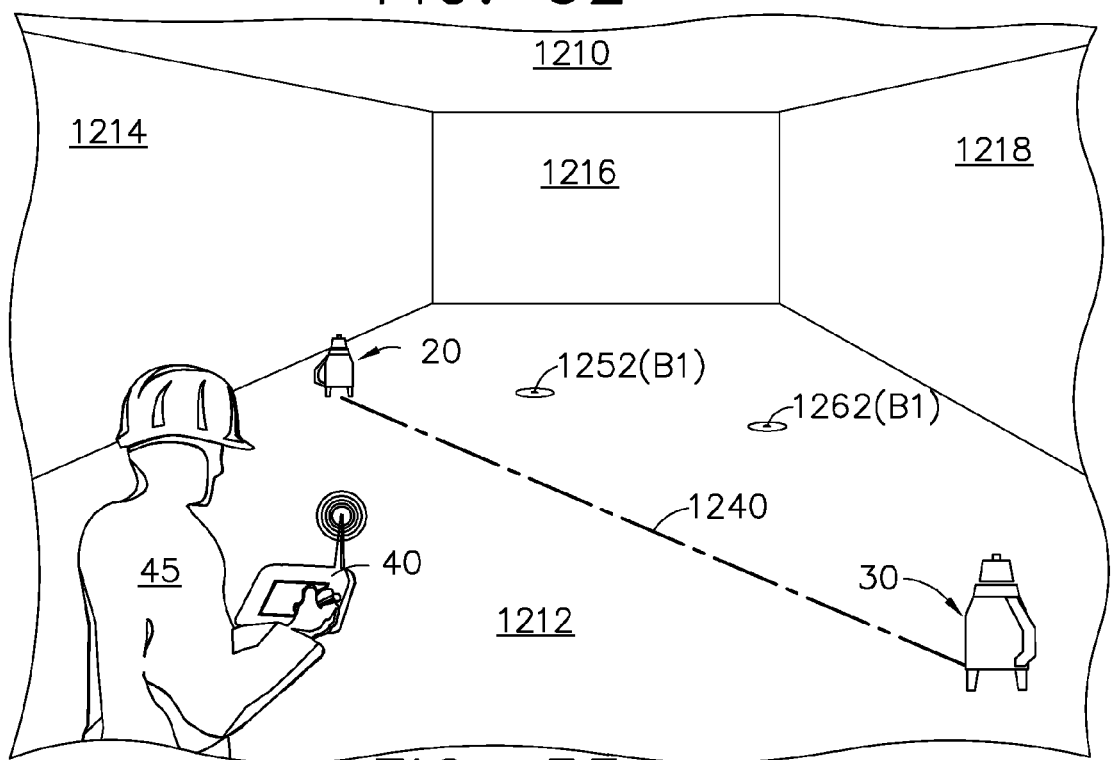
FIGS. 33-35 are diagrammatic views showing how two base units of the system in FIG. 28 can be used to align the transmitters of the base units to two different benchmark points.

Referring now to FIG. 33, the human user 45 is again using a remote unit 40 and two base units 20 and 30. In this figure, the alignment axis between the two base units has already been established. There are two surveyed points, also called "benchmarks," that are known to the blueprint, but which are not known yet to the remote unit virtual floor plan. These surveyed points are designated on FIG. 33 at 1252 and 1262, for benchmark 1 (B1) and benchmark 2 (B2).

Figure 34:
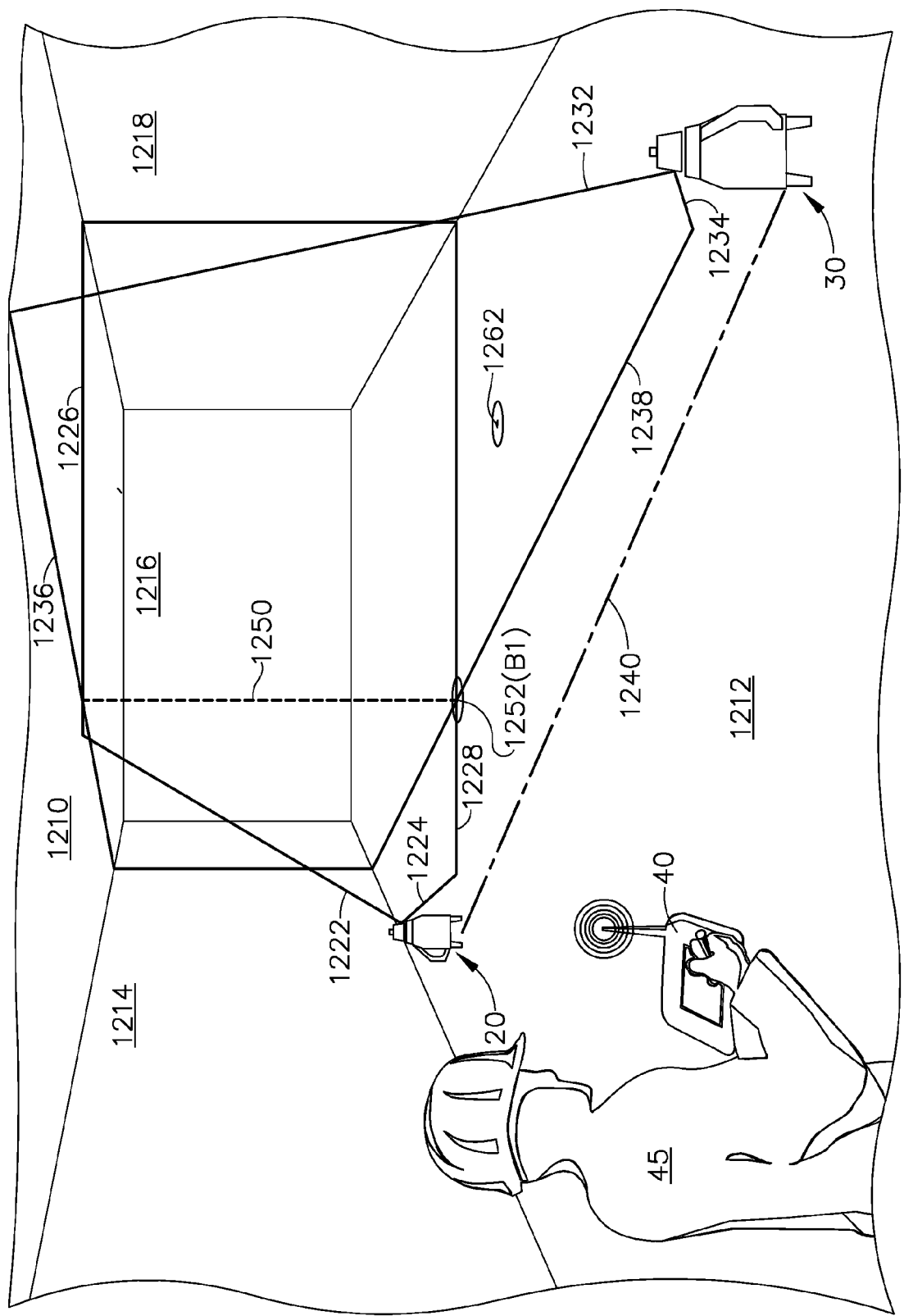

Referring now to FIG. 34, both base units are aimed at the first benchmark at point 1252. The fan beam emitted by base unit 20 has a upper edge at 1222, and lower edge at 1224. These two edges are intercepted by the floor and ceiling, at the lines 1226 and 1228, respectively. As can be seen on FIG. 34, the laser line 1228 intersects the benchmark 1 surveyed point at 1252.

The fan beam emitted by base unit 30 has an upper edge at 1232 and a lower edge at 1234. It produces light lines along the ceiling and floor at 1236 and 1238, respectively. As can be seen on FIG. 34, the light line 1224 intersects benchmark 1 (at 1252), and thereby creates an "X" shape of laser light lines intersecting at benchmark 1. In addition, there is an intersecting vertical line of laser light at 1250 created by the two laser planes from the two fan beams. If a piece of paper (or other solid object) is held in a position to be intercepted by line 1250, the X shape of the two fan beams would show on that piece of paper to indicate a point along that virtual line of laser light.

Figure 35:
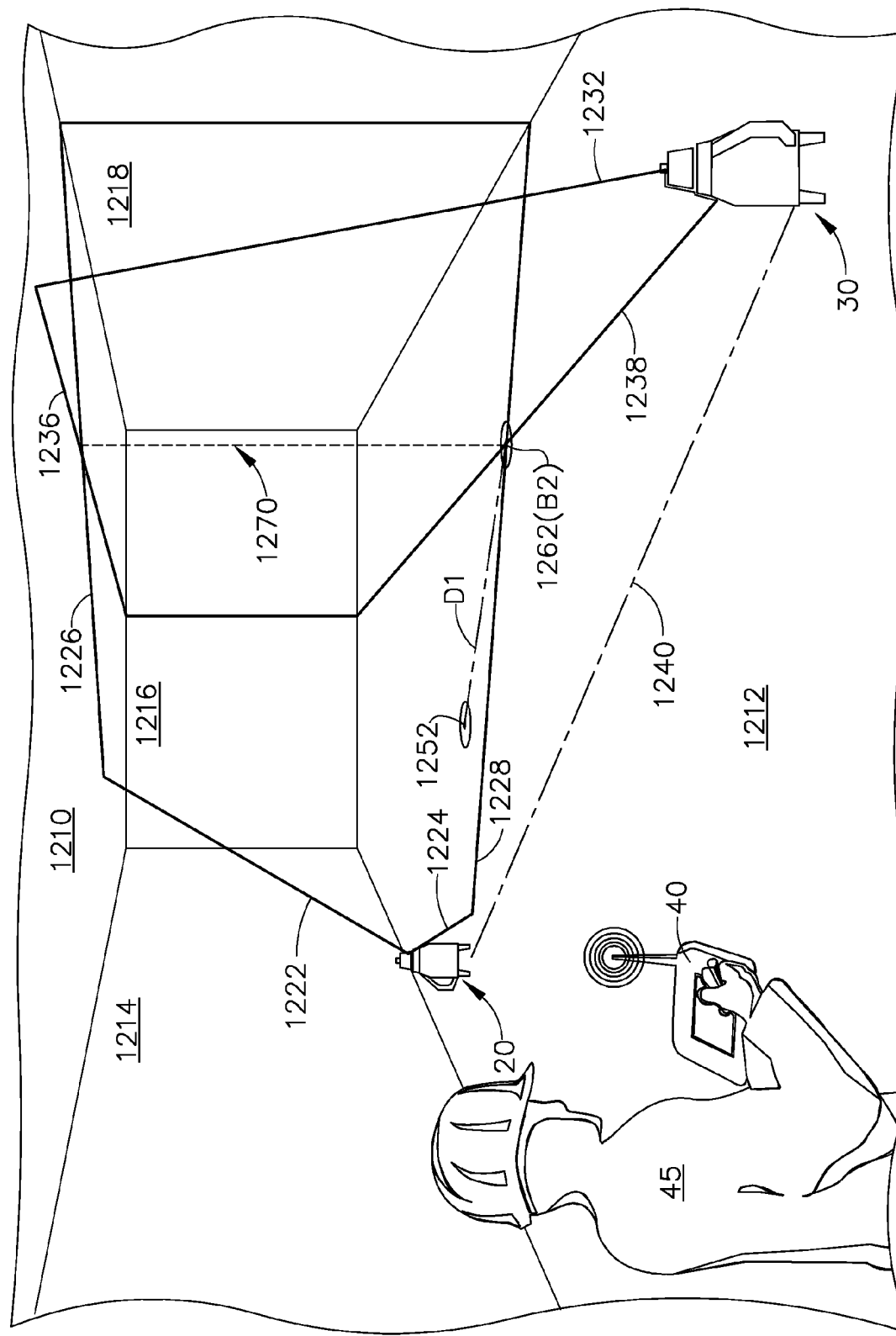

Referring now to FIG. 35, the two base units have been aimed at the second benchmark, at the point 1262. The fan beam emitted by base unit 20 again has an upper edge at 1222 and a lower edge at 1224, with a ceiling line at 1226 and a floor line at 1228, which intersects the benchmark 2 position at the point 1262. The fan beam emitted by the base unit 30 again has an upper edge at 1232 and a lower edge (that cannot be seen in this view), with an upper ceiling laser light line at 1236 and a lower floor laser light line at 1238 which both intersect the benchmark 2 position at the point 1262. Therefore, an "X" shaped pair of laser lines intersect at the benchmark 2 point. There will again be an intersecting vertical line of laser light at 1270 that is above the benchmark 2 position. A piece of paper or other solid object held at that position to intercept light line 1270 would reflect that X-shaped intersection.

After the procedure of FIG. 34 and FIG. 35 is performed, the azimuth angles at each base unit are recorded, which is easily done at the monitor (or remote unit) 40.

Once the angles are recorded into the remote unit 40, the two benchmark coordinates are also entered into the monitor. Knowing the coordinates, the remote unit can calculate the distance D1 (as seen on FIG. 35), which is the distance between the two benchmark positions. Once that information is known by the remote unit, then the virtual positions of the two base units can be calculated, and then all information can be scaled.

As an alternative that will be discussed in greater detail below, if only the distance D1 was known, but not the actual coordinate positions of the two benchmark points, all of the information relating to the positions of the base units, including the alignment axis, could be scaled simply by knowing the azimuth angles of the two benchmark points (along with the physical distance therebetween).

Routine to Create Benchmarks

Figure 36:
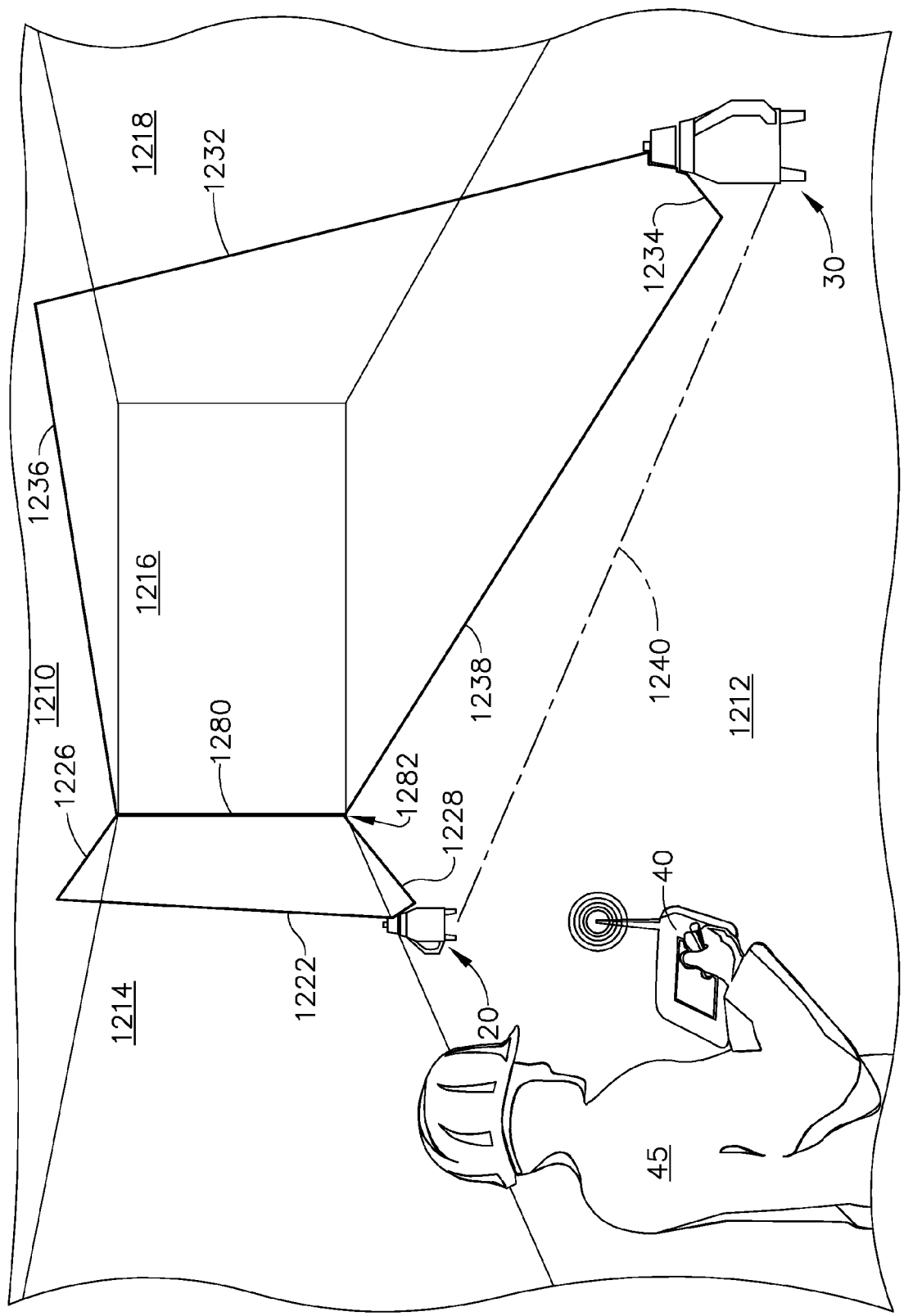
FIGS. 36-37 are diagrammatic views showing how two base units of the system of FIG. 28 can be used for setting up a jobsite in a space by using a pair of aligned base units, but with no known benchmarks previously established.
Figure 51:
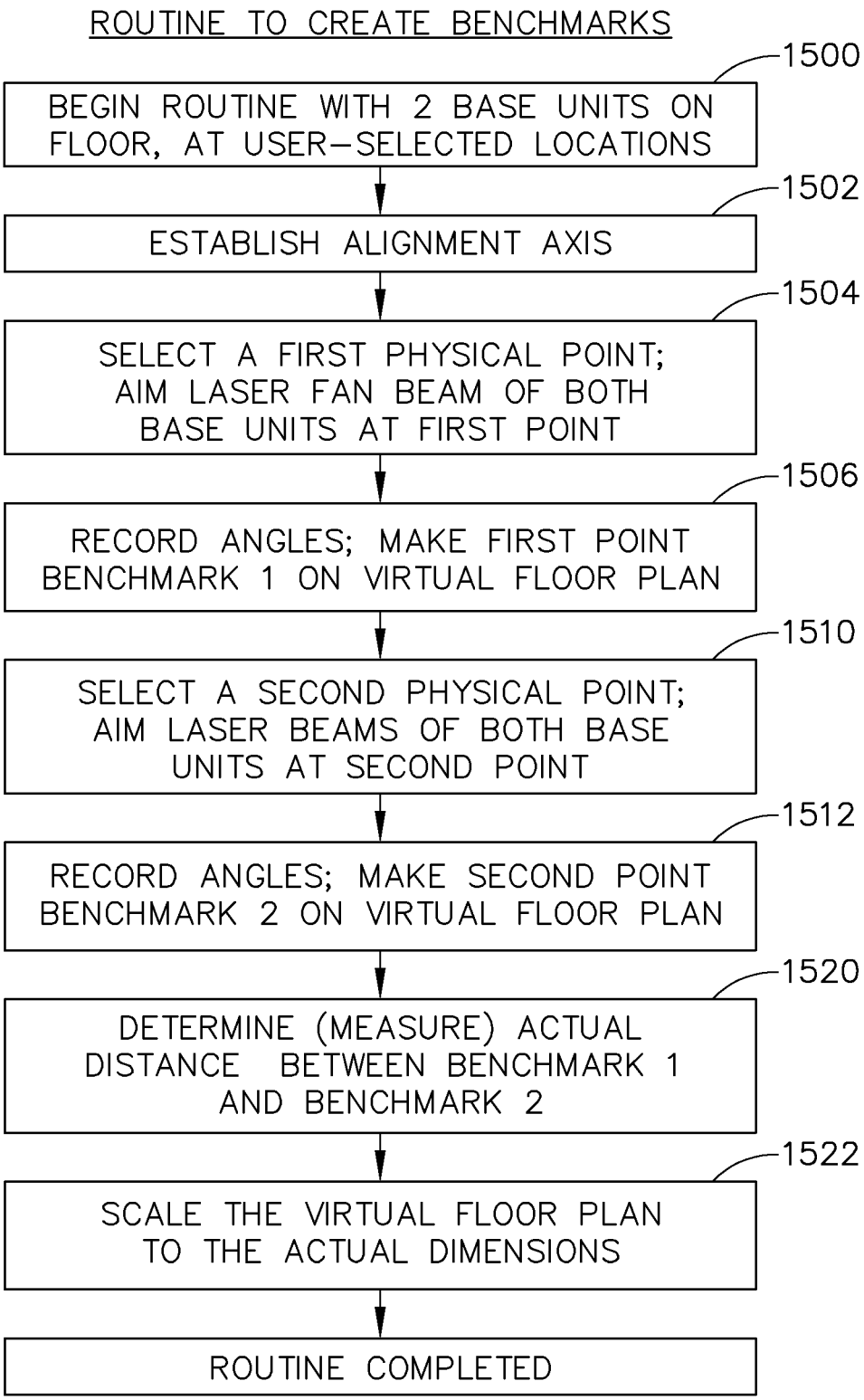
FIG. 51 is a flow chart of the steps performed by a routine to create benchmarks for an existing room, and then create a virtual floor layout plan, using the system of FIG. 1.

Referring now to FIG. 36, another method for setting up on a jobsite is illustrated, starting with the user 45 positioning two base units 20 and 30 on the floor surface 1212 of the room (see step 1500 on the flow chart of FIG. 51). In this new methodology, there are no established benchmarks as of yet, and there is no virtual floor plan in the remote unit 40. After positioning the base units at any desired locations on the floor 1212, the user will perform the steps necessary to establish the alignment axis between the two base units, as described above in connection with FIGS. 28-32 (see step 1502).

Since there are no previously established benchmarks on this jobsite, but there is an actual room with walls and corners, the user will now be able to create a virtual floor plan in the monitor or remote unit 40 by use of the existing physical features. For example, the existing corners of the room can be used for this purpose.

So the next step in this methodology will be to point both base units 20 and 30 at one of the corners (see step 1504). In FIG. 36, both base units are aimed at the corner 1282, and the fan beams emitted by both base units will shine directly on the corner itself, along a vertical line 1280. Moreover, the bottom edge line of the fan beam emitted by base unit 20 will be aimed directly at the corner along the floor surface; this fan beam will show a visible light line 1228 that intersects the corner point 1282. Similarly, the fan beam being emitted by base unit 30 will have a visible laser light line 1238 that runs along the floor surface 1212, also intersecting the same point 1282. If desired, the fan beam of one of the base units can be turned off while the other base unit is being aimed, to more precisely direct each of the individual fan beams of each of the base units.

Once both base units are correctly aimed at the corner point 1282, the azimuth angles will be recorded at the remote unit 40 (see step 1506). If desired, this corner can become the origin point (having coordinates 0,0) for the virtual floor plan that will now be established on the remote unit 40. It will be understood that other coordinates could be entered for this point, if desired. In effect, the corner point 1282 is becoming a first benchmark for this virtual floor plan. It is not so much a "surveyed point" like one would normally expect to see on a blueprint plan, but in reality it is a physical point that can be used for the purposes of establishing a virtual floor plan in the remote unit 40.

Figure 37:
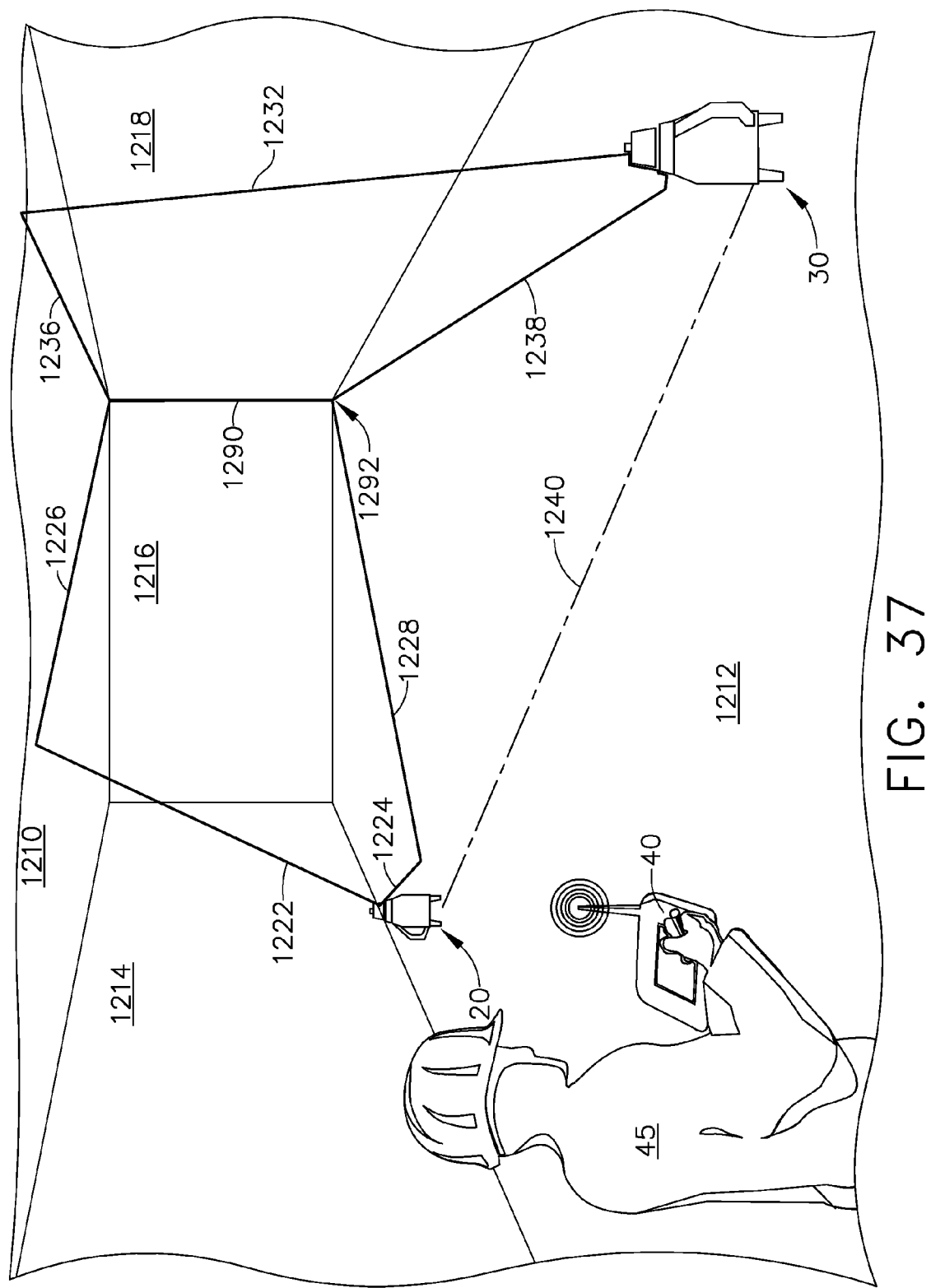

Referring now to FIG. 37, the two base units are now aimed at a different point (see step 1510), and in this situation it is another corner point, at 1292. This will be done by aiming the fan beams of both base units 20 and 30 directly at the corner point 1292 and this should be visible by a vertical light line 1230 that runs directly along the corner, above the corner point 1292. Both laser transmitters on the base units should be emitting a fan beam that establishes a visible light line along the floor; for base unit 20 this will be laser light line 1228 that will directly intersect the corner point 1292; for base unit 30 this will be the laser light line 1238 that also will directly intersect the corner point 1292.

Once both base units are directly aimed at corner point 1292, the azimuth angles are recorded at the remote unit 40 (see step 1512), and this can be used to establish the second benchmark point. If desired, this can become the origin of the virtual floor plan, unless the previous corner (the corner point 1282 from FIG. 36) was already established as the origin.

Now that there are two benchmark points established with respect to knowing the azimuth angles for both base units, another piece of information is desired, that being the actual distance between the two corner points 1282 and 1292 (see step 1520). Once the actual distance is known between the two new benchmarks (it might need to be accurately measured), the virtual floor plan on the remote can be scaled to the actual dimensions of the room (see step 1522), and the virtual floor plan can become usable for laying out points of interest anywhere in the room, and their actual distances and physical positions will be known with respect to the benchmarks. It will be understood that any one of the "legs" could be measured for an actual distance, to establish the true dimensions of the room with respect to the virtual floor plan. For example, the actual distance between the base unit 20 and the corner point 1292 could be measured and the actual distance between either base unit 20 and the other corner point 1282 could be measured; or the actual distance between the other base unit 30 and corner point 1292 could be measured. Once a set of these measurements is determined, the other dimensions in the room can be established, based on the azimuth angles information.

Routine to Scan a Room and Find its Perimeter

Figure 38:
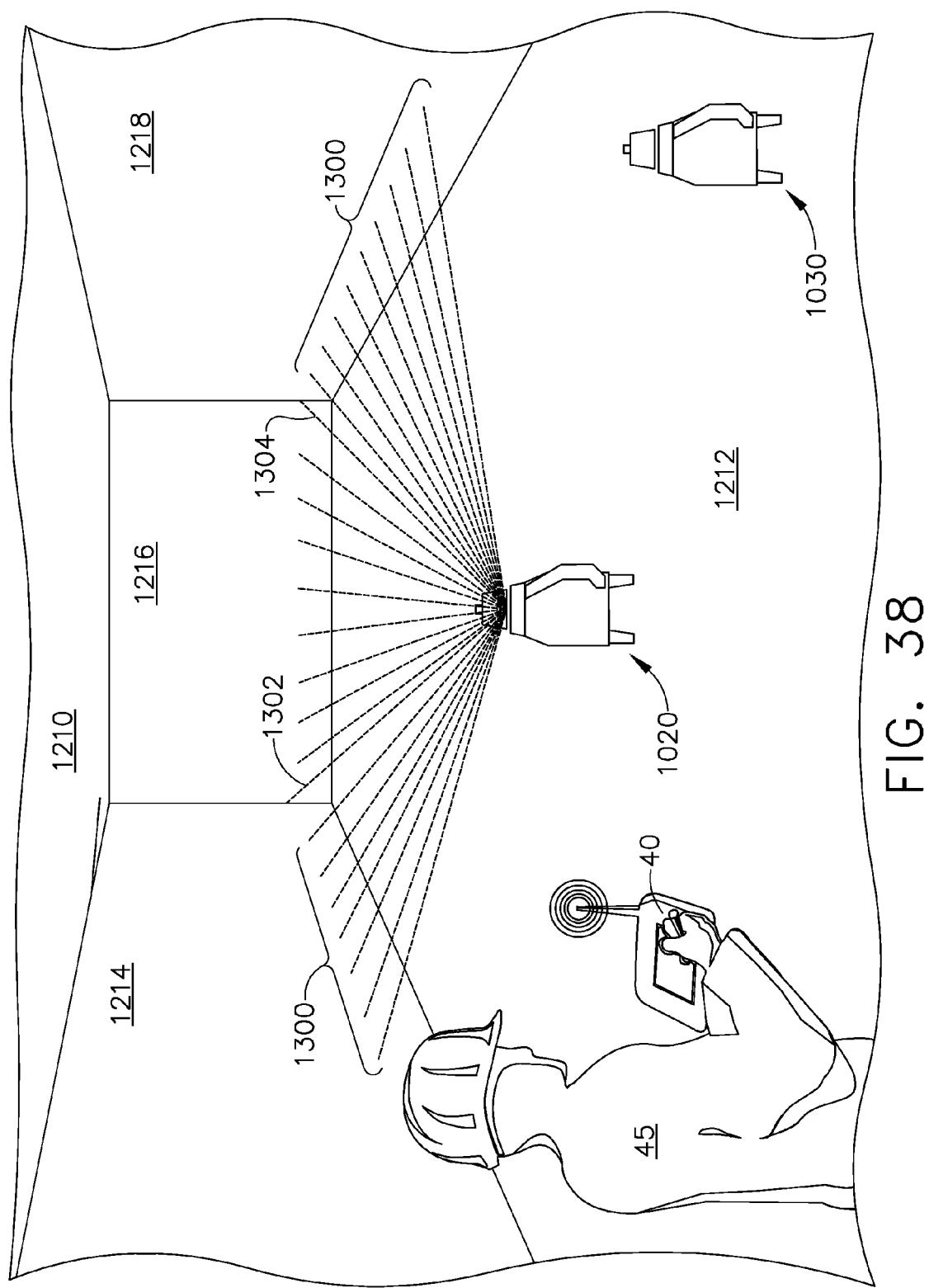
FIG. 38 is a diagrammatic view showing how an enhanced capabilities base unit of the type of FIG. 27 can be used to scan a room of an existing space and find the perimeter with a laser distance meter, and ultimately establish benchmark points for a virtual floor plan.
Figure 52:
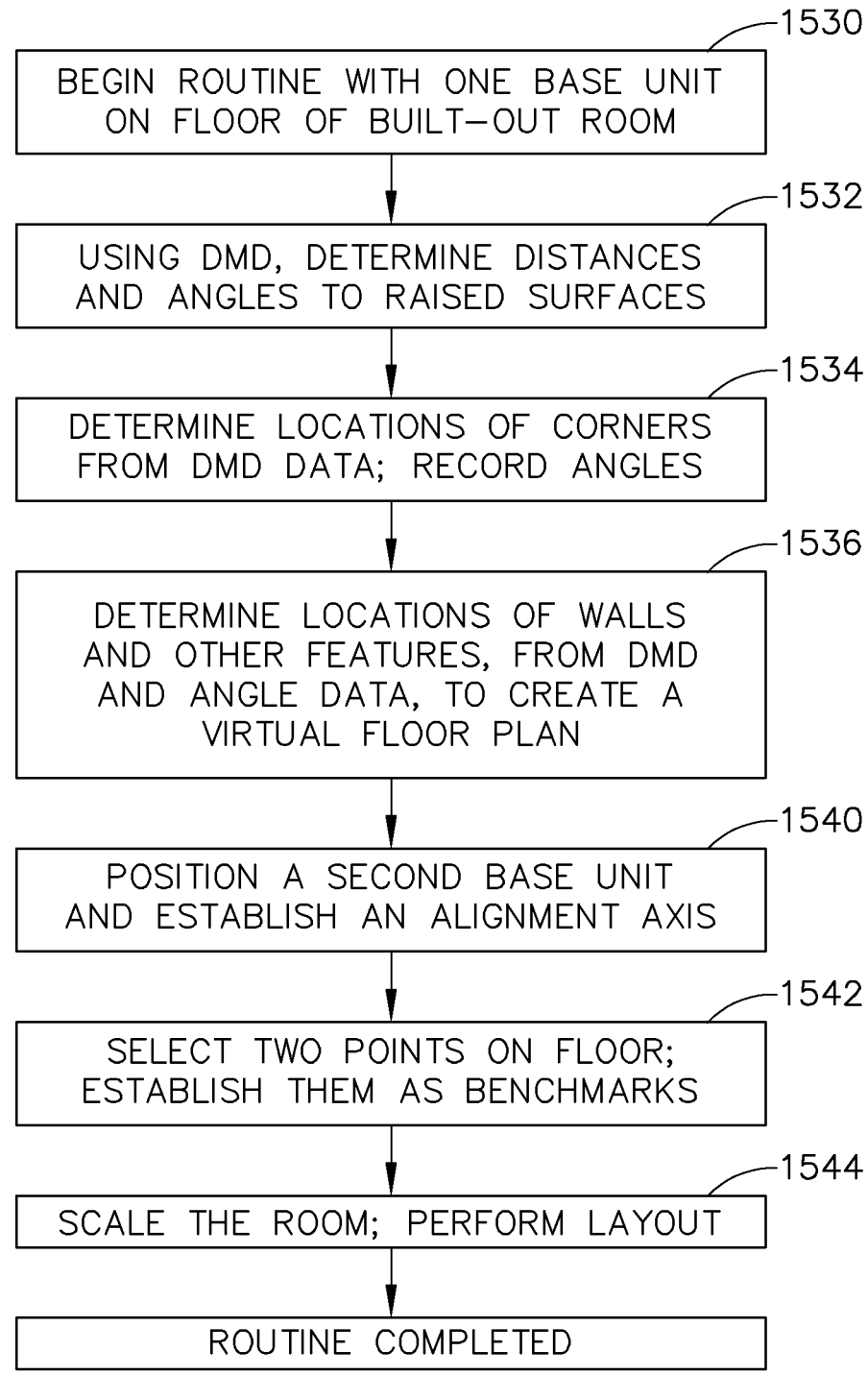
FIG. 52 is a flow chart of the steps performed by a routine to scan an existing room to find its perimeter, and then create a virtual floor layout plan, using the system of FIG. 25.

Referring now to FIG. 38, a new methodology is disclosed for creating a virtual floor plan in a built-out space that exists, but for which the jobsite user has no blueprint and no virtual floor plan at the outset. FIG. 38 is from the user's perspective, again, and shows the user within a room having a ceiling at 1210, a floor surface at 1212, a left wall 1214, a front wall 1216, and a right wall 1218. An enhanced capability base unit, generally designated by the reference numeral 1020, is placed on the floor surface 1212 (see step 1530 of the flow chart on FIG. 52), and it is put into an automatic mode where it begins scanning the raised (e.g., vertical) surfaces of the space, using its distance measuring device (DMD). This base unit 1020 includes the components that are depicted on FIG. 25, including a distance measurer 1228. In a preferred mode of this technology, a base unit of the type depicted by reference numeral 1100 as depicted in FIG. 27 is used for this base unit 1020 that is illustrated in FIG. 38. In other words, a laser distance measuring device 1028 (or perhaps a different type of DMD) would be used for the scanning procedure.

It will be understood that the terms "wall", "vertical surface", and "raised surface" all have a similar meaning in the context of structures that are to be scanned, or otherwise "measured" or "located" when using the equipment or methodologies of the technology disclosed herein. The term "space" often refers to a room, however, that room may not have a roof or ceiling—especially if the room is still under construction. Also, that room may not have four total walls; in other words, it might have only three walls and a large open area where a wall may some day be constructed, or perhaps that open area may remain open forever, and in that situation the room (or "space") will not be totally enclosed. The walls to be scanned, measured, or located may not truly be vertical across their entire surface, or they may not be "full" structures that extend all the way from a floor surface to a ceiling surface—yet they are nevertheless going to be referred herein to as "walls." All that is required to be a "wall" for use with the technology disclosed herein, is that the "wall" be a substantially flat structure, and that it extend away from the floor surface (typically in a vertical direction). For most applications, the "wall" will need to be a structure that can be readily discerned by the user; otherwise the "wall" will have the appearance of a mere "bump," and not be very useful for any purpose. Of course, even a "bump" could be somehow enhanced, such as with visual indicia, such as a reflector, or reflective tape, or an active electronic device that outputs a signal when it receives energy, such as laser light beams.

After the user 45 instructs the base unit 1020 to begin its automatic procedure, the distance measuring device (DMD) begins rotating through a horizontal plane, and records distances and azimuth angles at multiple locations in a rotational direction along this horizontal plane (see step 1532). On FIG. 38, these multiple scans are generally illustrated by the reference numeral 1300, which shows a separate laser light beam at multiple angular increments along the walls of the room, at the height of the laser distance measuring device, with the base unit 1020 resting on the floor surface 1212. During the scan, two of the laser light lines will impact the two corners of the room (in this view), and these two laser light lines are designated by the reference numerals 1302 and 1304. The distance measuring device will be able to determine where the corners are (i.e., at the laser light lines 1302 and 1304), because the measured distance to and from those corners will be greater than the previous and subsequent distances measured by the DMD device during the angular rotation of the laser distance measurer (see step 1534). All this information will be automatically communicated to the remote unit 40 and a virtual floor plan of the room will begin to be constructed on that remote unit, and this can be displayed, if desired.

At the end of the scanning procedure, in which the distance measuring device can be rotated through the entire 360 degrees of the horizontal plane within the area of the room, the corners will all be identified by both their distances and their azimuth angles, with respect to the location of the base unit 1020. The user 45 will, of course, have to be cognizant of his or her location in the room as this procedure is taking place, and will need to stay out of the way of the laser light beams being emitted by the distance measuring device during this procedure.

Once all of the azimuth angles and distances are accumulated into the remote unit 40, the entire room should be virtually constructed, including all the walls and all the corners. The exact location of the corners might need to be inferred from data points that are very near the corners, but not absolutely in the precise location of the corners, depending upon the resolution of all of these measurements. The physical corners themselves may not be perfectly straight or sharp, and this also can be a reason that the corner locations might need to be inferred from this data. All the azimuth angles and distances are to be loaded into the monitor 40, and its software program will be used to create the virtual floor plan (see step 1536).

The goal is to establish two benchmark positions based upon this information. In one sense, this procedure is much like the procedure discussed above in reference to FIGS. 36 and 37, except there will be no need for any "manual" aiming of the base units when using the more sophisticated base unit 1020 (which has its built-in distance measuring device). In this manner, the system described on FIG. 38 can be used to automatically establish two benchmarks without any manual aiming of the fan beam of the laser transmitter 22 on that base unit.

As an option, the base unit 1020 can be slewed to one of the corners, and its fan beam laser transmitter can be turned on at that time. This will allow the user to perform a visual inspection to verify the accuracy from aiming of the laser distance meter (the DMD), and this can be performed for all the corners, if desired. This optional turning on of the fan beam could occur during the automatic scanning procedure, as the distance measuring device is slewing through its 360 degree transit, or after the initial virtual floor plan has been established on the monitor (the remote unit 40). The base unit could be commanded to aim at any one of the corners, then commanded to turn on its fan beam, and so the user can perform the visual inspection to verify the accuracy of the aiming at that time.

A second base unit 1030 with similar enhanced capabilities as base unit 1020 is placed on the floor 1212 (see step 1540). Once it is placed in the room it could optionally perform its own automatic scanning procedure using the distance measuring device; or it could be used to create an alignment axis with the first base unit 1020, as per the methodologies discussed above. Once the alignment axis has been created, and along with the virtual floor plan that has been created by the first base unit 1020, then benchmarks can be easily created (see step 1542), and other points of interest can then be scanned and located. The entire room can be scaled and laid-out as desired (see step 1544).

Routine to Square Vertical Plane Up to a Wall

Figure 53:
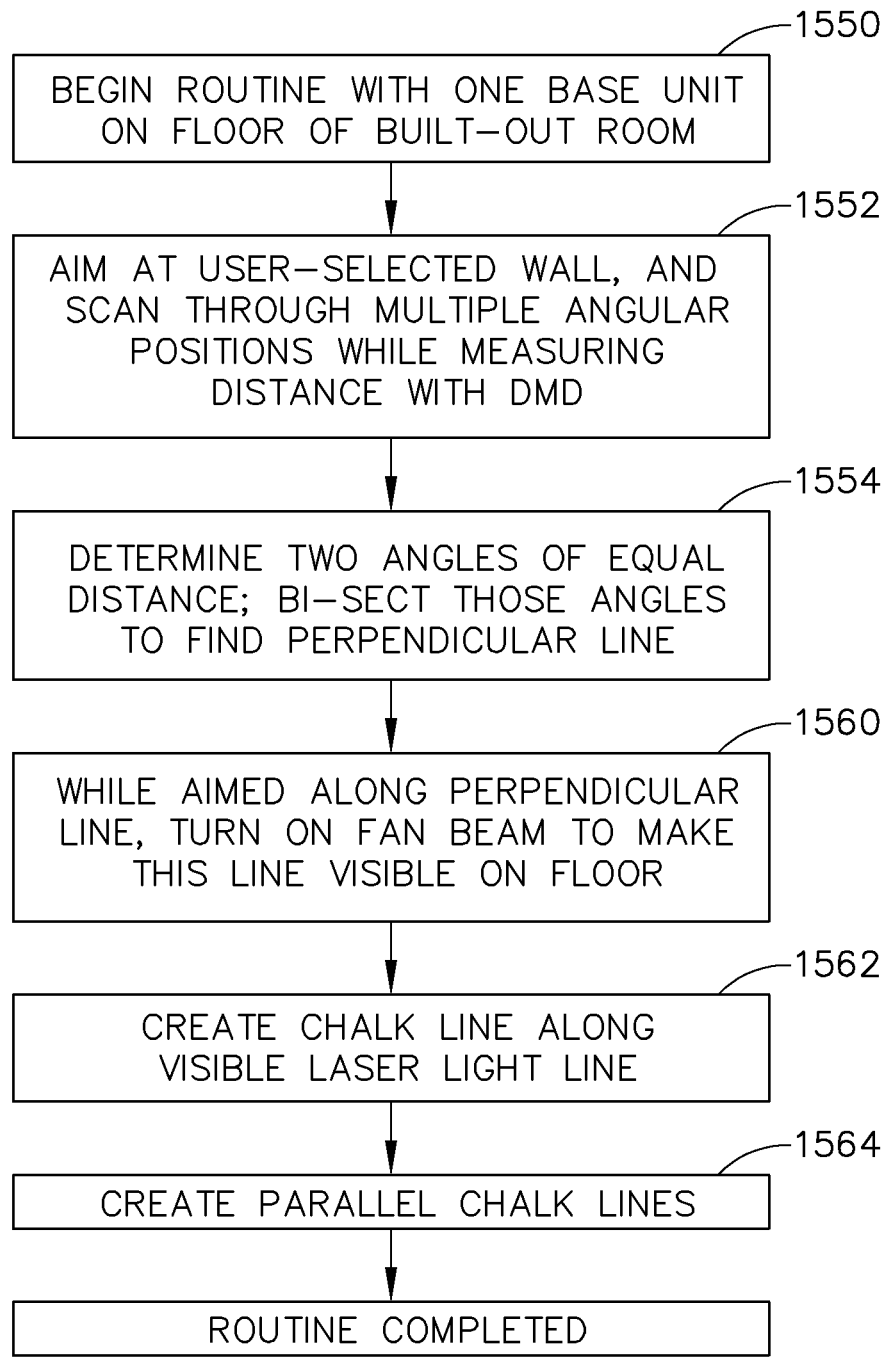
FIG. 53 is a flow chart of the steps performed by a routine to square a vertical plane up to a wall of an existing room, using the base unit of FIG. 26.

Referring now to FIG. 39, a user 45 is again standing in a built-out space, which has a ceiling surface 1210, a floor surface 1212, a left wall 1214, a front wall 1216, and a right wall 1218. The user will use one of the base units with enhanced capabilities, generally designated by the reference numeral 1020, which has a distance measuring device mounted near its top (see step 1550 on the flow chart of FIG. 53). This is the same type of base unit that is illustrated on FIGS. 25 and 27, and in a preferred mode of the technology disclosed herein, the distance measuring device will be a laser distance meter, such as the device 1028 illustrated on FIG. 27.

In this configuration, the laser distance measuring device will emit a light beam 1194 along the same plane as the fan beam 178 that is emitted from the same rotating platform 152.

Figures 39, 40:
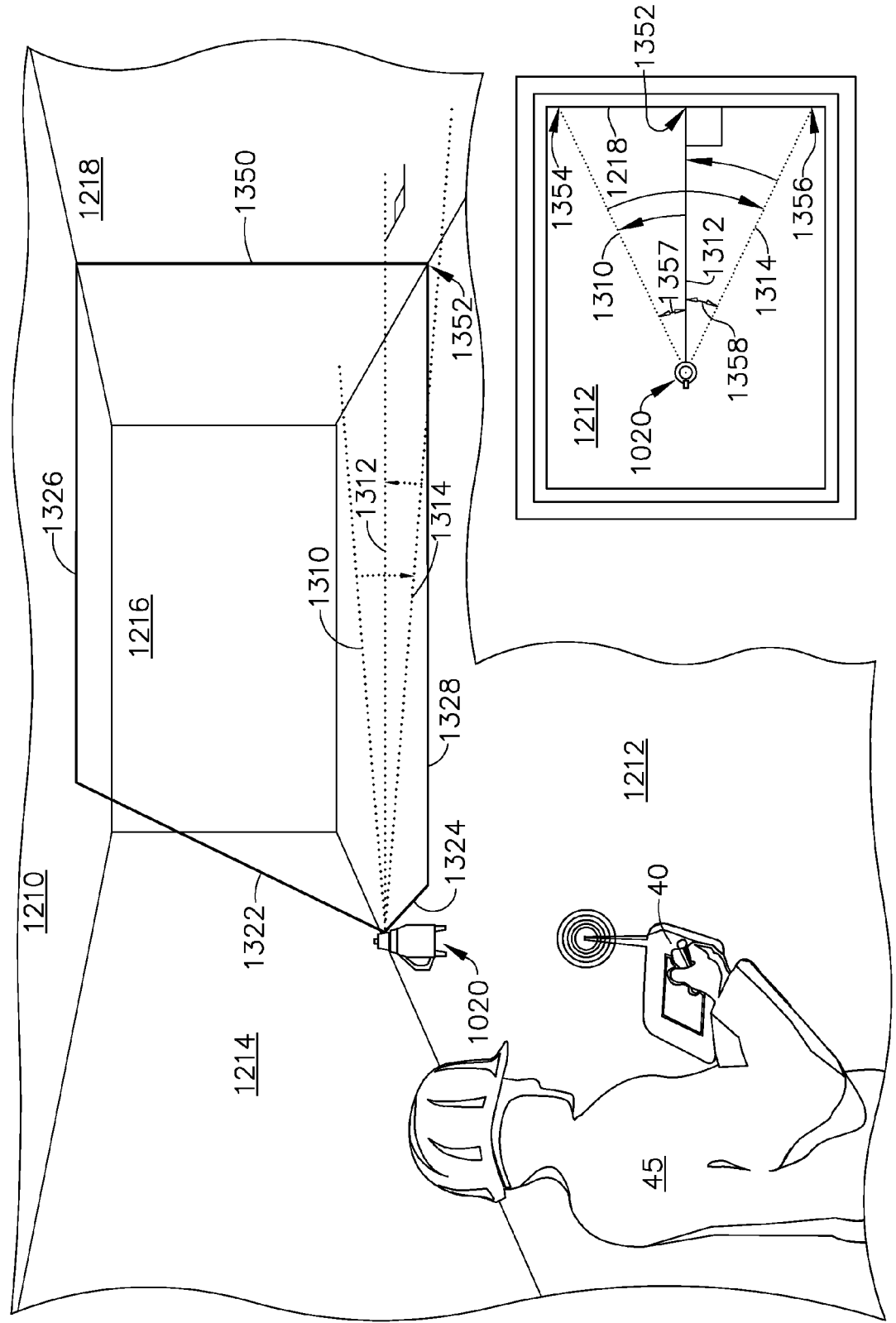
FIGS. 39-40 are diagrammatic views showing how an enhanced capabilities base unit of FIG. 27 can be used to square a vertical plane up to a wall using a laser distance meter.

Using the remote unit 40 as a command and monitoring device, the user will instruct the base unit 1020 to scan along the wall 1218 using the laser distance meter, which is illustrated on FIG. 39 by example laser light lines 1310, 1312, and 1314. The fan beam can also be turned on, which will emit an upper edge line at 1322, a lower edge line at 1324, which will produce lines along the ceiling at 1326 and along the floor at 1328. As its rotatable platform 152 turns, the base unit 1020 will emit laser light lines at multiple angular positions; the laser light line 1312 is perpendicular to the wall surface 1218. The laser light lines produced by the laser distance meter will be several inches above the floor surface, depending on the height of the base unit 1020.

Referring now to FIG. 40, it can be seen that the laser light line 1310 is at an angle 1357 with respect to the assumed perpendicular line 1312, and the laser line 1314 is also at an angle 1358 with respect to that assumed perpendicular line 1312.

When the base unit 1020 begins scanning the wall surface 1218, it is not known exactly which of the laser light lines will be the perpendicular line, so the rotating platform on the base unit will scan both left and right, which on FIG. 40 is counterclockwise, then clockwise (as looking from above), so that most of the wall surface 1218 will be scanned by the distance measuring device (see step 1552).

As the laser distance meter determines the actual physical distance between the base unit 1220 and the various points along the wall surface 1218, the corresponding azimuth angle will also be recorded at each scanning position, and all of this information can be stored on the remote unit 40, after it is transmitted from the base unit 1020. The azimuth angle that corresponds to the shortest distance found by the laser distance meter will be the line 1312, and that will become the perpendicular line of importance. The point along the wall surface 1218 where laser light line 1312 intersects the wall surface is designated at the reference numeral 1352.

Since the angular displacement seen from above (see FIG. 40) will tend to vary quite a bit near the perpendicular point 1352 while the actual difference in distance between the base unit 1020 and the wall surface 1218 varies only a small amount, the user 45 may have some trouble determining which exact angular position belongs to the perpendicular line 1312. This will be related to the sine function, while attempting to measure the change in slope of the sine curve as the angle equals or nears zero degrees. As is well known, the derivative of a sine curve is the cosine function, which has a value near zero when its angle approaches zero degrees. Therefore, the use of the present technology can be enhanced by using a preferred methodology, described in the paragraph immediately below.

Another way to determine the correct angular position of the perpendicular line can be automated, or the user can manually create an initial angle to get the procedure started. As indicated by the arcuate arrows on FIG. 40, the base unit 1020 can be slewed to the line 1310, and the distance can be taken at that point between the base unit and the wall surface 1218 (at the point 1354). The base unit can then be slewed in the clockwise direction (as seen from above in FIG. 40) to the position along the line 1314, and the distance can be measured between the base unit and the wall surface (i.e., at the point 1356). The azimuth angles will be recorded at both of these measurement locations. The angle between the perpendicular line 1312 and the line 1310 is designated angle 1357. The angle between the perpendicular line 1312 and the other line 1314 is designated angle 1358.

The preferred procedure is to manually control the value for the angle 1357 so that it causes the light line 1310 to be aimed quite a distance away from the point 1352, but so it still impacts the side wall 1218, and does not go past the corner (which would cause the distance measuring device to aim at the wall surface 1216). The distance of line 1310 is now measured by the DMD. Then, either under automatic or manual control, cause the base unit 1020 to slew in the clockwise direction so that it aims at the point where the angle 1358 is the same angular value as was the angle 1357. The distance of line 1314 will now be measured. If, by chance, the distance of the line segment 1314 is precisely equal to the distance of the line segment 1310, then the correct angular position of the perpendicular line 1312 will exactly bi-sect the combined values of the angles 1357 plus 1358. Almost assuredly this will never actually occur (at least, not to any appreciable accuracy).

Once the distance 1314 is known, as compared to the distance 1310, then the base unit 1020 can be commanded to slew either left or right until it finds a distance along the line 1314 that exactly matches the distance 1310 (at least to within the accuracy of the laser distance measuring device). Once that position is found, then the correct value of the angle 1358 will become known, and the additive values of the angles 1357 plus 1358 will allow the base unit 1020 to move to a position that exactly bi-sects the two lines 1310 and 1314 (see step 1554). That angular position will be the correct azimuth angle of the base unit, and once it has been slewed to that angular position, it will be aimed at a substantially perpendicular spot on the wall 1218, which is the point 1352. That will determine the correct perpendicular line 1312.

Once the exact spot of 1352 has been determined, the fan beam can be turned on, which will create a vertical line 1350 along the wall 1218 (see FIG. 39) and the bottom of that vertical line 1350 will intersect the floor 1212, and there will also be a horizontal visible laser light line 1328 that runs right to that intersection point (see step 1560). This will be a horizontal 90 degree corner between the wall 1218 and the floor 1212. That point can be used as a position for a chalk line along the perpendicular line 1312, between the point 1352 and the base unit position. The user can now easily create that chalk line (see step 1562), and this is very useful, particularly over long distances (several feet or several meters). Once that chalk line has been created, the same procedure with the same equipment can be used to draw several other parallel chalk lines along that same wall (see step 1564). Alternatively, other parallel chalk lines can be created by offsetting from this initial line, at several locations along line 1312, including locations quite some distance away from the wall 1218. If this is a large room, the length of the line 1312 could be over 100 feet, for example, and it would be a simple matter to exactly measure an end point away from the wall 1218 that is parallel to the chalk line 1312, to create one or more parallel chalk lines on that same floor surface 1212. The alternative approach is to use the base unit 1020 at a different location in the room along the wall 1218, and the same procedure described above can be used to create other perpendicular lines with respect to the wall surface 1218.

Another possible use of the base unit 1020 is to position it at a point on the floor surface 1212 and to aim the fan beam directly at a point anywhere on one of the wall surfaces. This point could be a non-surveyed point but it would be a point of interest to the user. For example, if the user had already located a position along the wall surface 1218 for mounting an electrical outlet near the floor (such as near where it says "90 degrees" along the wall surface 1218 on FIG. 39), that user might be interested in placing a wall switch a few feet above that same point. By aiming the fan beam directly at the outlet (near where it says 90 degrees on FIG. 39), a vertical line of laser light will then appear on the wall surface at 1350. The user could then measure up the wall a certain distance to locate the switch plate. This, of course is only one example, and the user would be able to locate anything along that vertical line 1350 all the way up to the ceiling; this acts as a plumb line with respect to the initial point of interest.

Routine to Create Benchmarks Along a Wall

Figure 41:
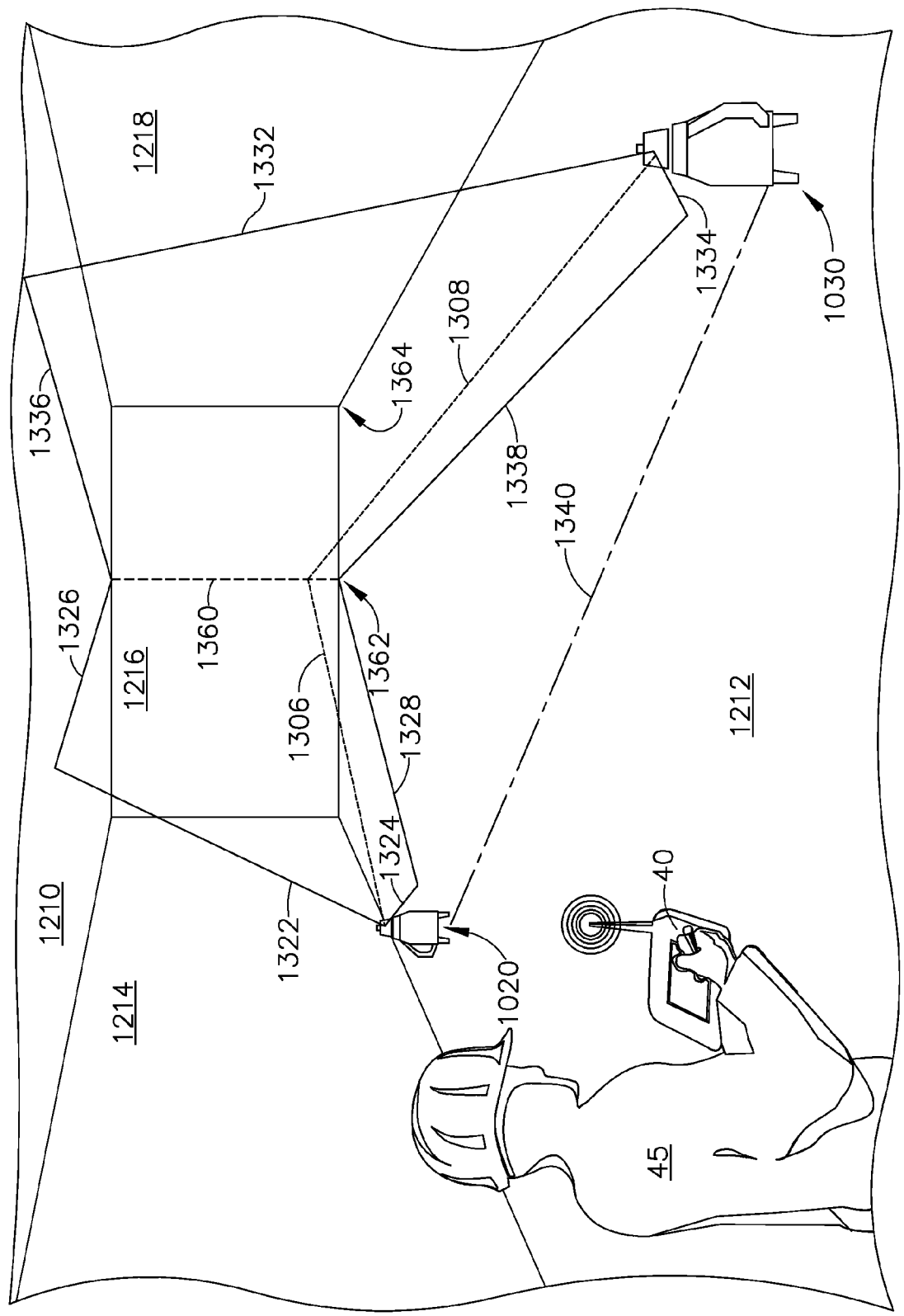
FIG. 41 is a diagrammatic view showing how two enhanced capabilities base units of FIG. 27 can be used to create a single vertical line on a wall, then taking a distance measurement from each base unit with a laser distance meter mounting thereto, and then establishing benchmark points to create a virtual floor plan.
Figure 54:
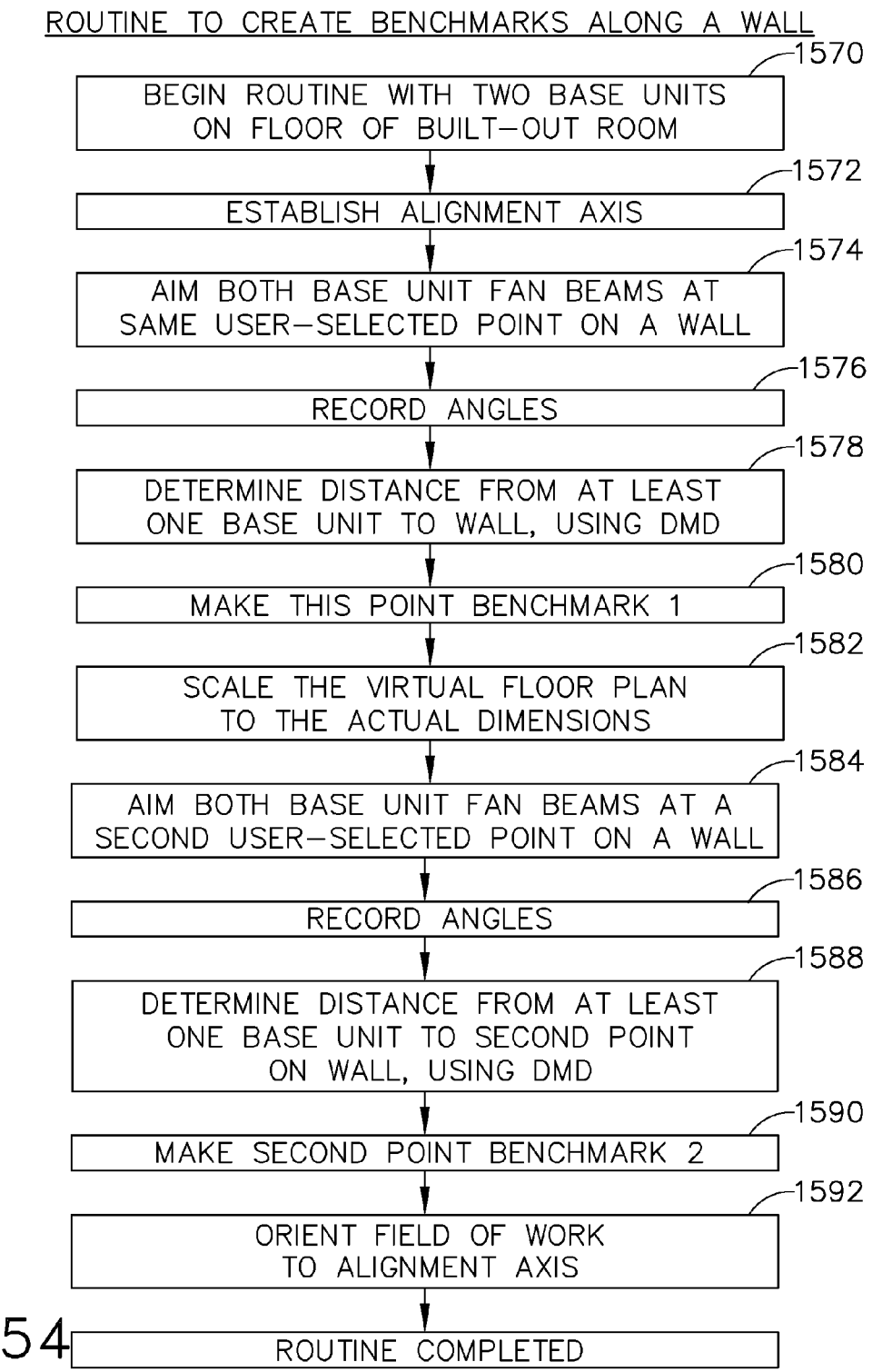
FIG. 54 is a flow chart of the steps performed by a routine to create benchmarks for an existing room, and then create a virtual floor layout plan, using the system of FIG. 25.

Referring now to FIG. 41, the enhanced capability base units 1020 and 1030 are positioned at locations on the floor surface 1212. A methodology will now be described (see step 1570 on the flow chart of FIG. 54) for setting up each transmitter of the base units to create a single line on a wall, and then taking a distance measurement from each transmitter with its laser distance measurer device. The initial conditions for this methodology are an existing space on a jobsite, but the user 45 has no blueprint, and also has no virtual floor plan on the remote unit 40. The two base units are used to create an alignment axis therebetween, which is the axis 1340, using one of the methodologies discussed above (see step 1572).

Once the alignment axis 1340 has been established, the two base units 1020 and 1030 are both controlled to aim at the same point (or line) on the wall surface 1216. This is done by turning on the fan beams for both laser transmitters of the base units 1020 and 1030, so that they both aim at the same point on the floor, at 1362 (see step 1574). There will be a fan beam upper edge 1322 and fan beam lower edge 1324 emitted from the base unit 1020, and these fan beams will run across the ceiling as a laser light line at 1326 and across the floor as a laser light line at 1328. This fan beam will then create a vertical line 1360 that is plumb, and vertically above the point on the floor 1362.

Laser transmitter 30 will also create a fan beam upper edge 1332 and fan beam lower edge 1334, which will create fan beam laser light lines along the ceiling at 1336 and along the floor at 1338. This fan beam will also create the same vertical line 1360 after correct aiming, which will intersect the point on the floor at 1362.

The point 1362 will be a point of interest for the user 45. Once both fan beams from the base units 1020 and 1030 are aimed at the correct point 1362, then the azimuth angles of both base units will be recorded on the remote unit (see step 1576). In addition, the distance measuring device will be used to determine the exact distance along a laser light line 1306 (assuming the DMD of base unit 1020 is a laser distance meter); the base unit 1030 will also be able to measure a precise distance using its DMD along a laser light line 1308 (assuming the DMD of base unit 1030 is a laser distance meter). Laser light line 1306 will be a few inches above the fan beam floor line 1328, and the laser light line 1308 will be a few inches above the fan beam floor line 1338. All these laser light lines will intersect along the vertical plumb line 1360. At least one of the distances of the lines 1306 and 1308 will be recorded on the remote unit 40 (see step 1578).

The point 1362 can now become a benchmark point on the virtual floor plan that will be created in the remote unit 40 (see step 1580). This point could be assigned the coordinates 0,0 and thereby become the origin point for this virtual floor plan. Alternatively it could be assigned a different coordinate value later.

The alignment axis information can now be used to scale the field of work. The distance between the two base units 1020 and 1030 is needed (which can be calculated as described above from establishing the alignment axis, or it can be directly measured by one of the laser distance meters), the distance between one of the base units and the point of interest is needed (i.e., the distance along the line 1306 or the line 1308), and the above azimuth angle information is needed. After these variables are known, the other variables in the geometry of the triangle that is created by the lines 1340, 1306, and 1308 can be solved, and all the angles and distances of this triangle become known. Therefore, if the distance 1306 is measured, then the distance 1308 can be calculated, and the field of work can be scaled (see step 1582); or, if the distance 1308 is measured, then the distance 1306 can be calculated, and again, the field of work can be scaled.

Once the distances and angular positions have been recorded for the point 1362, with respect to both base units 1020 and 1030, then both of those base units can have their fan beams aimed at another point in the room (see step 1584). For example, they could both be aimed at the corner to the right (at seen on FIG. 41), and the intersection of that corner with the floor is a point 1364. Both fan beams could be aimed so that their fan beam floor lines 1328 and 1338 intersect right at the corner point 1364. This will establish a new location at which the azimuth angles can be measured and recorded on the remote unit 40 (see step 1586). The distance measuring devices can then be actuated and at least one of the laser light line distances 1306 and 1308 (now aimed at the corner above the point 1364) can be determined, and at least one of those distances then is recorded on the remote unit 40 (see step 1588). These measurements can now be used to create a second virtual benchmark at the point 1364 (see step 1590). This point could be assigned as the origin of the floor plan, if desired.

Since the distances of the lines 1306 and 1308 are now known with respect to both benchmark points 1362 and 1364, the distances from those points to each base unit 1020 and 1030 can be calculated, and the distance along the alignment axis 1340 can also be determined (see step 1572). With the coordinates of both benchmarks 1362 and 1364 now known, with respect to the alignment axis 1340, the entire field of work can now be oriented to the alignment axis. This will make it easier for the user to lay out additional points of interest in that field of work. Any other point in that space can now be laid out, and put into the virtual floor plan of the remote unit 40, and after appropriate scaling, all such points will have actual distances assigned thereto.

In an alternative mode of using this technology, the two base units can be provided with distance measuring devices, but only one of the base units uses an azimuth angle encoder. The initial point of interest is again at 1362 on FIG. 41, and both fan beams from the base units 1020 and 1030 are aimed at point 1362. The azimuth angle of only one of the base units 1020 or 1030 will be recorded on the remote unit (as an alternative step 1576). The distance measuring device can be used to determine the exact distance along a laser light line 1306 (assuming the DMD of base unit 1020 is a laser distance meter); and base unit 1030 will also be able to measure a precise distance using its DMD along a laser light line 1308 (assuming the DMD of base unit 1030 is a laser distance meter). Laser light line 1306 will be a few inches above the fan beam floor line 1328, and the laser light line 1308 will be a few inches above the fan beam floor line 1338. All these laser light lines will intersect along the vertical plumb line 1360. Both of the distances of the lines 1306 and 1308 will be recorded on the remote unit 40 (see step 1578).

The point 1362 can now become a benchmark point on the virtual floor plan that will be created in the remote unit 40 (see step 1580), and the alignment axis information can now be used to scale the field of work. The distance between the two base units 1020 and 1030 is needed, the distance between both of the base units and the point of interest is needed (i.e., the distance along the line 1306 and the line 1308), and the above azimuth angle information is needed. After these variables are known, the other variables in the geometry of the triangle that is created by the lines 1340, 1306, and 1308 can be solved, and all the angles and distances of this triangle become known. Therefore, the field of work can be scaled (see step 1582).

As before, once the distances and angular positions have been recorded for the point 1362, with respect to both base units 1020 and 1030, then both of those base units can have their fan beams aimed at another point (e.g., point 1364) in the room (see step 1584). This will establish a new location at which one of the azimuth angles can be measured and recorded on the remote unit 40 (see step 1586). The distance measuring devices can then be actuated and both of the laser light line distances 1306 and 1308 can be determined and recorded on the remote unit 40 (see step 1588). These measurements can now be used to create a second virtual benchmark at the point 1364 (see step 1590).

As before, the distances of the lines 1306 and 1308 are now known with respect to both benchmark points 1362 and 1364, and the distance along the alignment axis 1340 can be determined (see step 1572). The coordinates of both benchmarks 1362 and 1364 are now known with respect to the alignment axis 1340, and the entire field of work can now be oriented to the alignment axis. Any other point in that space can now be laid out, and put into the virtual floor plan of the remote unit 40, and after appropriate scaling, all such points will have actual distances assigned thereto.

Active Target

Figure 42:
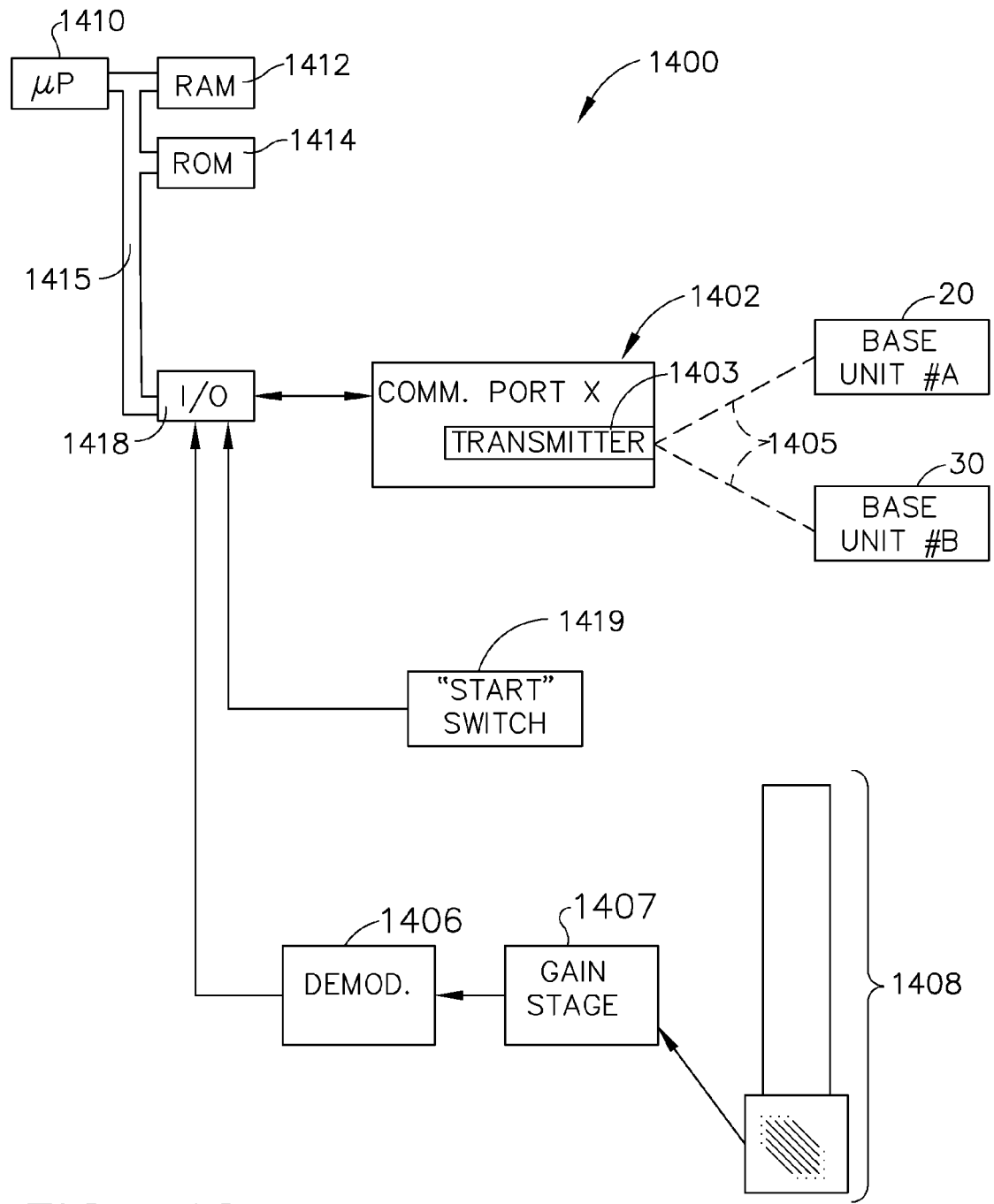
FIG. 42 is a block diagram of the major components of an active target that can be used with the base units of FIG. 2.

Another piece of hardware will now be described, in reference to FIG. 42. A new device referred to herein as an "active target", generally designated by the reference numeral 1400, will include some of the hardware components that are found in a remote unit 40. For example, there will be a microprocessor 1410, with associated random access memory 1412 and read only memory 1414. There will be some input/output interfacing circuitry at 1418, and an address/data bus at 1415, which carries information between the microprocessor and these other devices. The I/O circuitry 1418 will be in communication with a communications port 1402, which includes some type of transmitter 1403 that communicates with a first base unit 20 and second base unit 30, along communication links 1405. In general, the communication links 1405 will be wireless pathways, so that the active target 1400 does not need to be physically connected to any other devices.

There also is a type of "start" switch 1419 that is in communication with the I/O circuitry 1418. In a preferred mode of the technology disclosed herein, the start switch will merely be an on-off switch, and the active target will be a fully automatic device that will run through its executable programming automatically once it has been activated. In an alternative embodiment, the active target could be previously energized, but "resting" in a low power and low-activity state, until it is awakened when laser light strikes it; it could then run through its executable programming automatically.

The active target 1400 will also include an omni-directional sensor 1408 that can receive, and be sensitive to, laser light that impacts the sensor from any direction along a 360 degree horizontal plane. One example of such a sensor will be a rod sensor similar to the sensor 230 as depicted on FIG. 3. This would be a rod sensor with only a single photocell, such as described above. The output of this sensor would be directed to a gain stage 1407, and the output of that gain stage is directed to a demodulation circuit 1406. The output from the demodulation circuit is directed to the I/O circuitry 1418, so that the microprocessor can essentially be in communication with the omni-directional sensor 1408.

It is desired that the omni-directional sensor be designed with a certain required accuracy with regard to determining its centering position of reception of the laser light beam. The gain stage 1407 and the modulation circuit 1406 may need to be exceptionally high in sensitivity, because omni-directional sensors have a tendency to be quite lossy. An automatic gain control (AGC) circuit may be needed, for gain stage 1407.

Routine Using an Active Target

Figure 43:
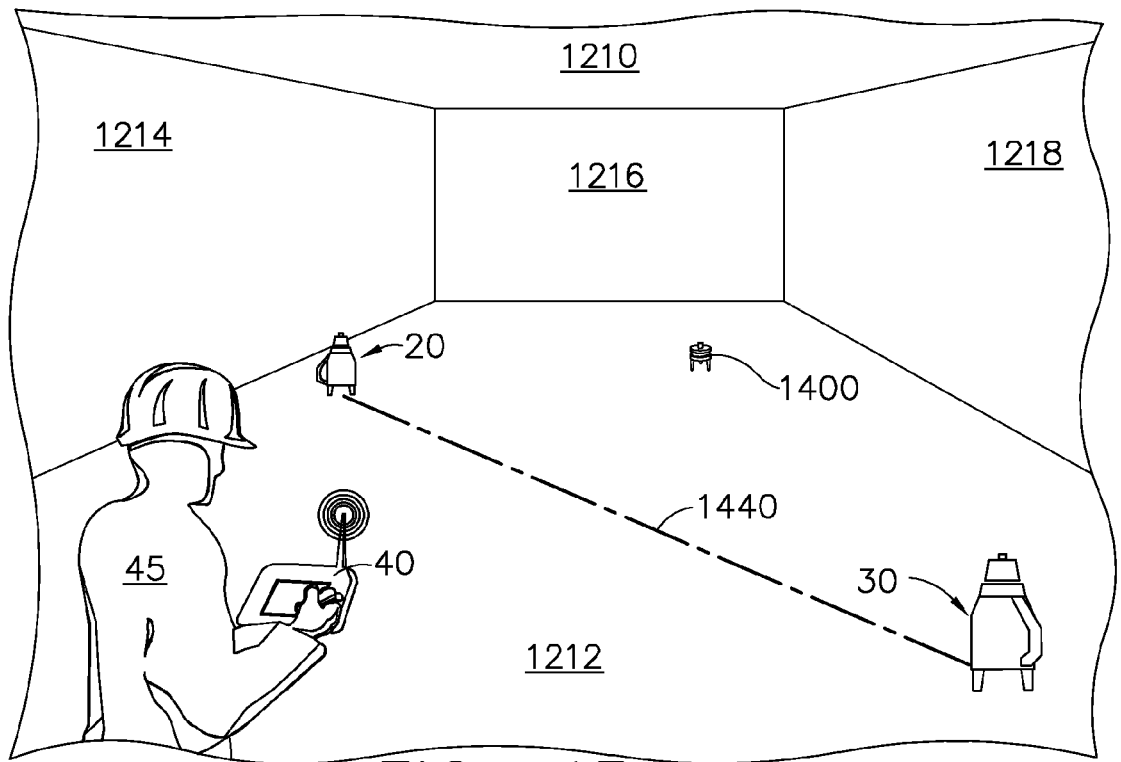
FIGS. 43-47 are diagrammatic views showing how two base units and an active target can be used to create benchmarks in an existing space, and thereafter to create a virtual floor plan.
Figure 55:
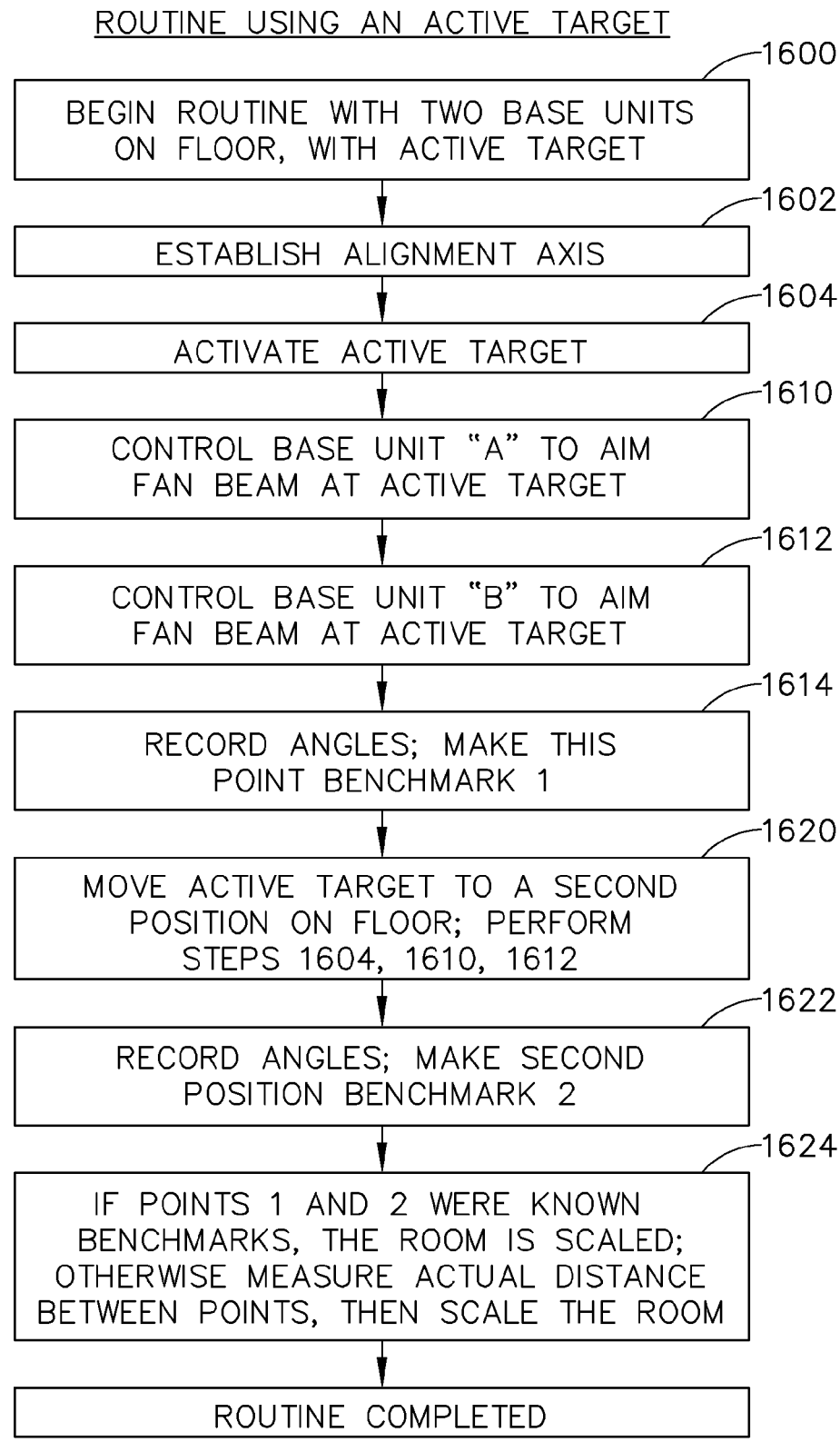
FIG. 55 is a flow chart of the steps performed by a routine to create benchmarks for an existing room, and then create a virtual floor layout plan, using an active target and portions of the system of FIG. 1.

Referring now to FIG. 43, a methodology for use of the active target 1400 will now be described. Starting with a user 45 having a remote unit 40 in a space, it will be assumed that there is no virtual floor plan in the remote unit 40 (see step 1600 on the flow chart of FIG. 55). There are two base units 20 and 30, and they have established an alignment axis 1440 therebetween, as according to one of the methodologies discussed above (see step 1602). There are no benchmarks as of yet, and the active target will be used for that purpose.

The active target 1400 can be placed at any point on the floor surface 1212; this can be any particular point of interest to the user, and this point can become a benchmark, if desired. In fact, that is one of the more useful purposes of using the active target.

Figure 44:
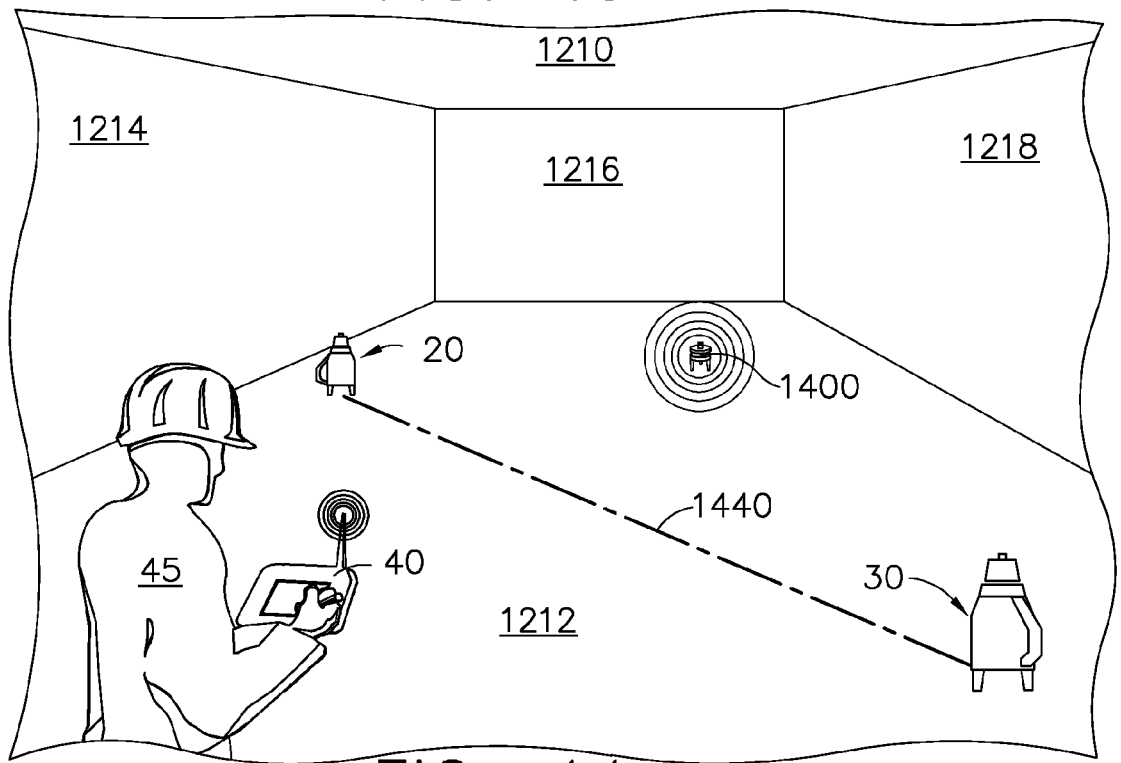

Referring now to FIG. 44, the active target is activated (see step 1604), and this occurs by the user approaching the active target device and pressing the "start" switch (which can be an on-off switch, as described above; or, in an alternative embodiment as before, the active target could be previously energized, but "resting" in a low power and low-activity state, until it is awakened when laser light strikes it). The active target 1400 will now send commands to the two base units 20 and 30, probably through the remote unit 40. This is a preferred mode, although the active target could also be programmed to communicate directly with the two base units, if desired. However, on many construction sites, the remote unit 40 will be an IP master, and it will have its own website address that can be found and communicated with by the active target. This has some advantages that should be considered in the system design.

It should be noted that, for this particular methodology, the base units 20 and 30 are not required to be enhanced performance units with a distance measuring device. Of course, such enhanced performance units can be used, but the distance measurement device capabilities are not required for this methodology.

Figure 45:
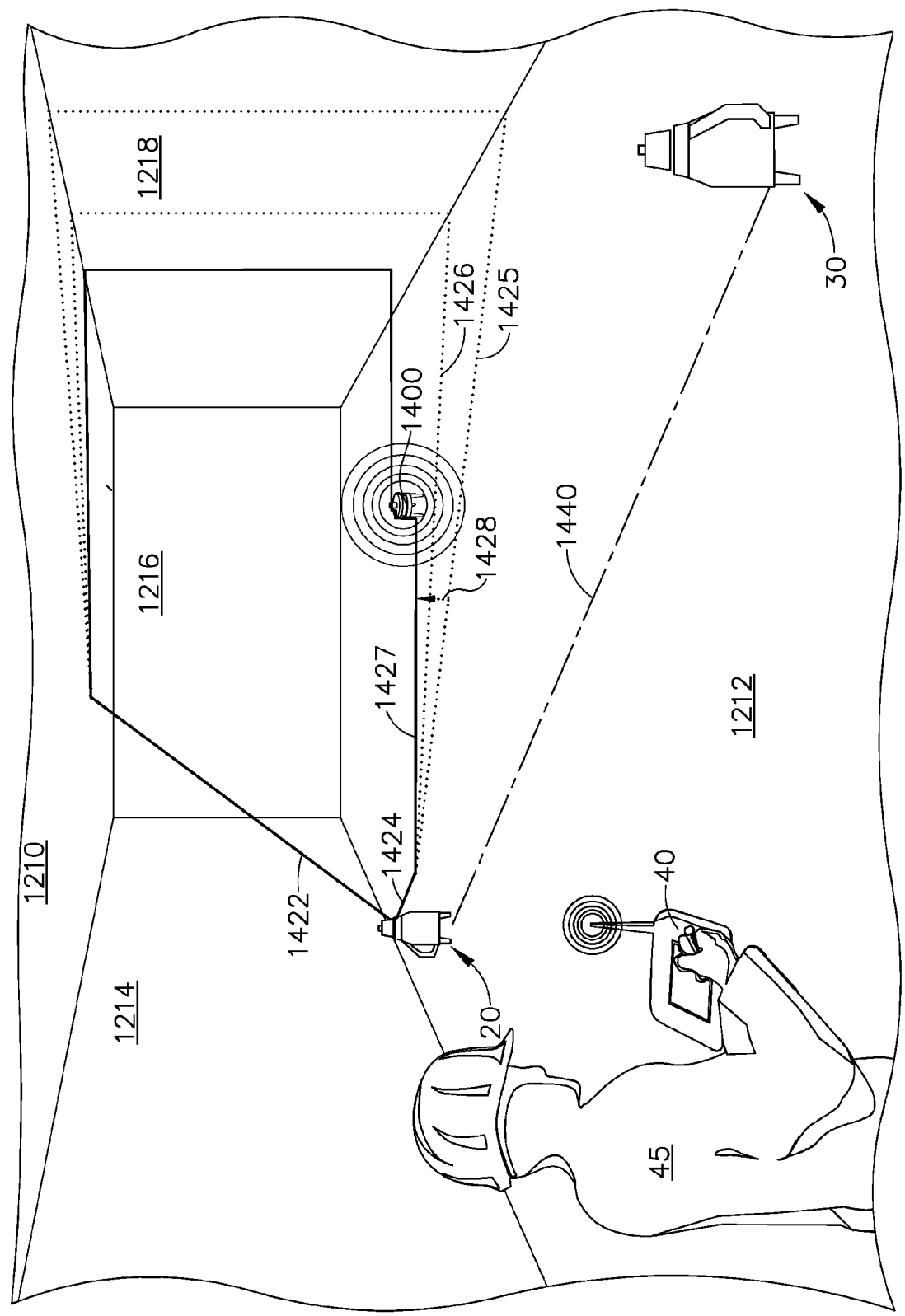

Referring now to FIG. 45, the active target is now controlling the movements of the rotating platform of the base unit 20. The laser fan beam has been turned on, and its upper edge line 1422 creates one or more laser light lines on the ceiling, and its lower fan beam edge 1424 creates laser light lines along the floor surface 1212. The active target commands the platform to slew in the counterclockwise direction (as seen from above) so that the first fan beam laser line on the floor is at 1425, a later position places the fan beam laser light at 1426, and a yet later position places the fan beam laser light line at 1427. These lines are moved in the angular direction 1428 (as seen on FIG. 45) due to the rotational slewing motion. When the fan beam is aimed along the laser light line 1427, it intersects the omni-directional photosensor of the active target 1400, and the active target will send a command instructing the base unit 20 to stop its motion (see step 1610). The fan beam will now remain at that position 1427. The active target can also send additional messages commanding the rotating platform of the base unit 20 to slew back and forth until the laser light line 1427 is impacting the center portion of the omni-directional photocell, for a precise alignment.

Figure 46:
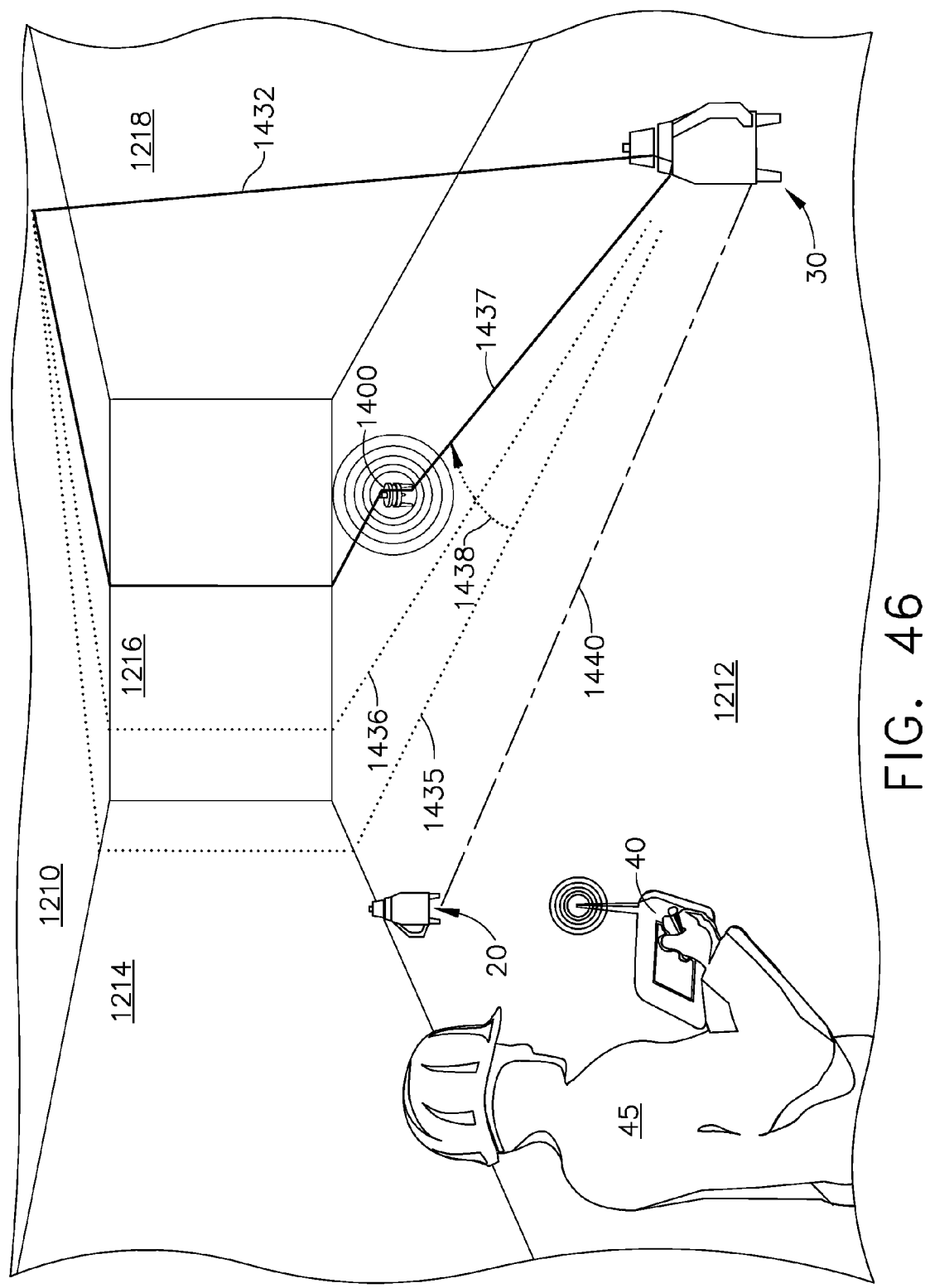

Referring now to FIG. 46, the active target 1400 now commands the other base unit 30 to undergo the same procedure. The fan beam is turned on and its upper limit edge 1432 will impact the ceiling, while its lower limit will create laser light lines along the floor. Such laser light lines will change position as the active target commands the base unit 30 to rotate its platform so that the fan beam moves along the floor, in the direction of the arrow 1438. So an initial position of the laser light line along the floor would be at 1435, and then as the angle advances a later laser light line would be at 1436, and a yet later laser light line would be at 1437. Once the fan beam reaches the position where it produces the laser light line at 1437, it impacts the omni-directional photosensor of the active target 1400, and the active target will now send a command telling the base unit 30 to cease rotating its fan beam (see step 1612).

Figure 47:
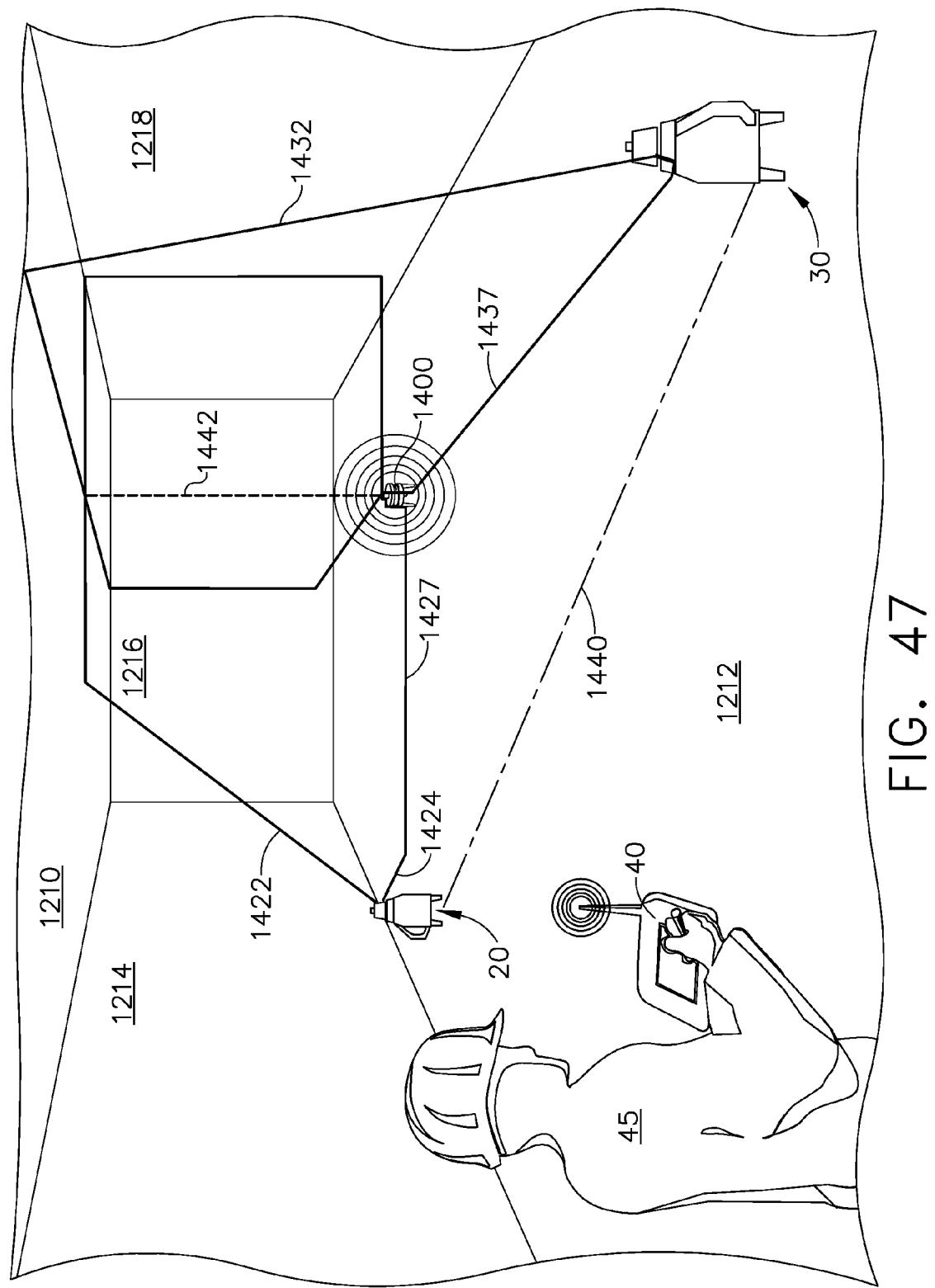

The active target 1400 can now send further instructions to command the base unit 30 to slew its fan beam back and forth until the laser light line 1437 becomes centered on the omni-directional photosensor for a precise alignment. Once the laser fan beams of both base units 20 and 30 are aligned with the omni-directional photosensor of the active target, a situation has been created that is illustrated in FIG. 47. The two fan beams are now crossing at the active target, and this creates a vertical plumb line 1442 directly above the active target location. This will appear on the floor surface as an "X" shaped set of laser light lines if the active target is removed. This will establish a benchmark point, if desired. If a physical benchmark point was already seen on the floor surface 1212, then the active target will now become that benchmark point on a virtual floor plan stored in the remote unit 40 (see step 1614). Since the alignment axis 1440 has been established between the two base units 20 and 30, this first benchmark point is now available information along the intersecting lines 1442. Once that information is known, the active target can be moved to another position to create a second benchmark point (see steps 1620 and 1622). If there is a physical benchmark point visible to the user, then the active target can be moved to that point, and by going through the same procedure as described above in reference to FIGS. 44-46, then that second benchmark point will automatically become known to the virtual floor plan stored in the remote unit 40. In addition, there will be a crossing of the laser light lines 1427 and 1437 at that second benchmark position, once the active target is removed. Once all of this information has been established, the entire room or space can be scaled, and any points of interest on the room can be surveyed and/or laid out (see step 1624).

It will be understood that a second active target could be used on the same floor surface, and in fact it could be placed at a second benchmark position while the first active target has been placed at the first benchmark position. In a preferred mode of operation, the second active target would not be activated until the first active target was done establishing its position with the two base units. It will also be noted that the fan beams of the base units will probably be modulated laser light, so that they can be easily differentiated from ambient light at the omni-directional photosensor of the active target. It might also be helpful for the two base units to each use a different modulating frequency for their respective fan beams. Finally, if both active targets are to be activated simultaneously, then there would need to be a different form of communication by each active target, either with different encoding, or different communications modulation frequencies, for example.

Routine Using Fixed-Length Rod

Figure 48:
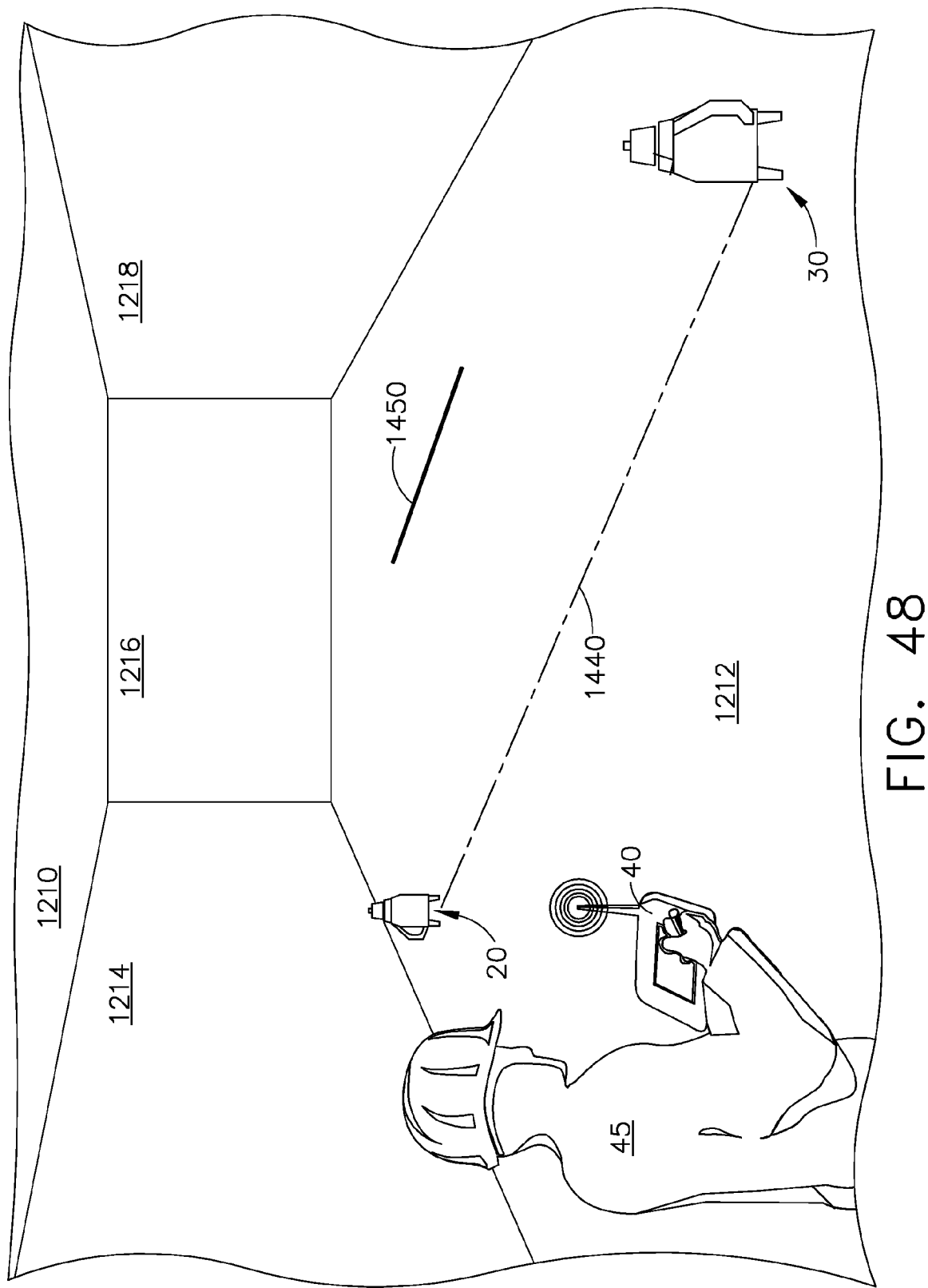
FIGS. 48-50 are diagrammatic views showing how two base units can be used with a rod of fixed length to establish benchmarks on the floor of an existing space, and then create a virtual floor plan from that information.
Figure 56:
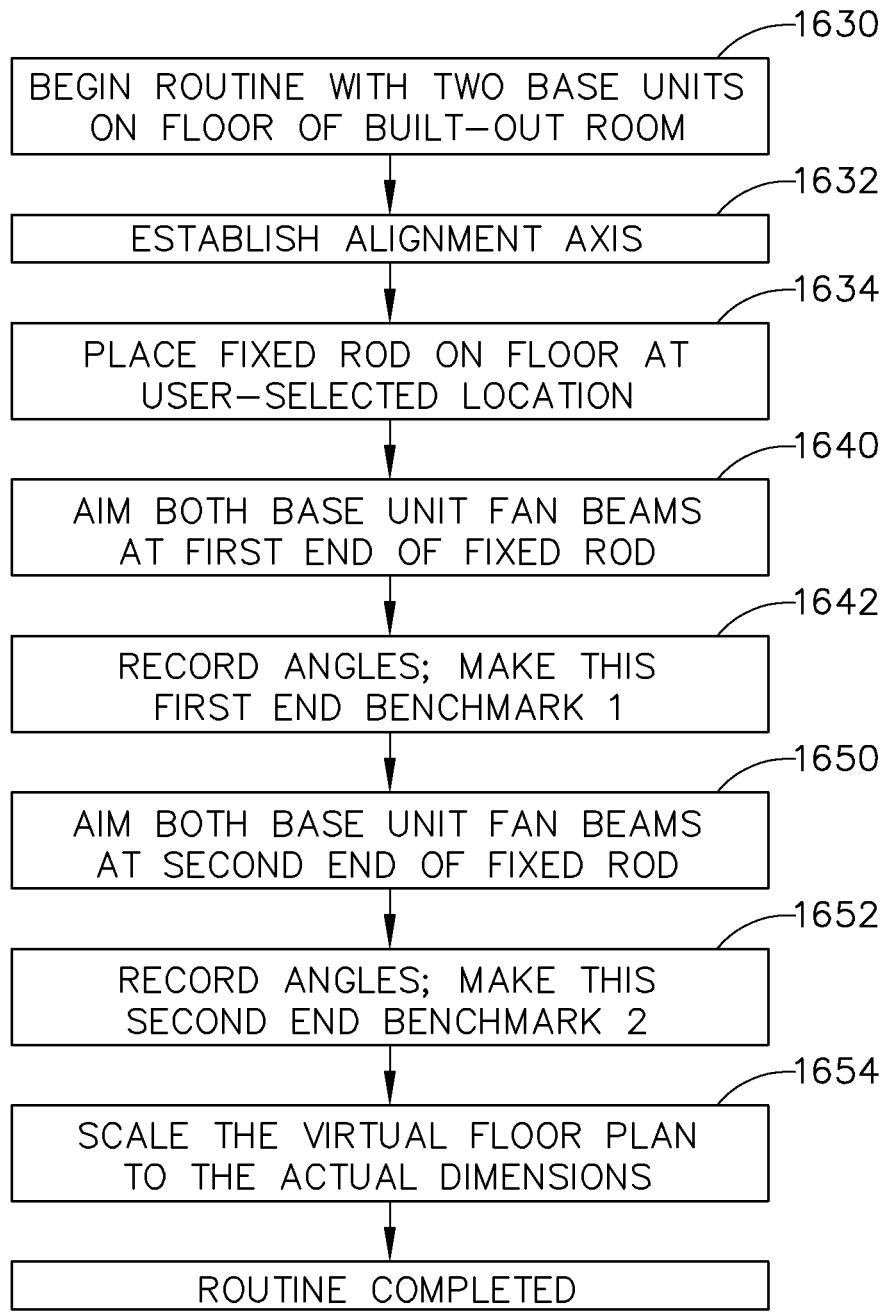
FIG. 56 is a flow chart of the steps performed by a routine to create benchmarks for an existing room, and then create a virtual floor layout plan, using a rod of known fixed length and portions of the system of FIG. 1.

Referring now to FIG. 48, a rod of fixed length is placed on the floor surface (see step 1634 on the flow chart of FIG. 56), as depicted in this view. The rod is designated by the reference numeral 1450, and is placed at a location some distance away from the two base units 20 and 30 (see step 1630). An alignment axis 1440 has already been established (see step 1632) before this procedure continues. As an initial condition, there is no virtual floor plan in the remote unit 40; or perhaps there is a virtual floor plan available, but it is not yet loaded with any benchmarks.

Figure 49:
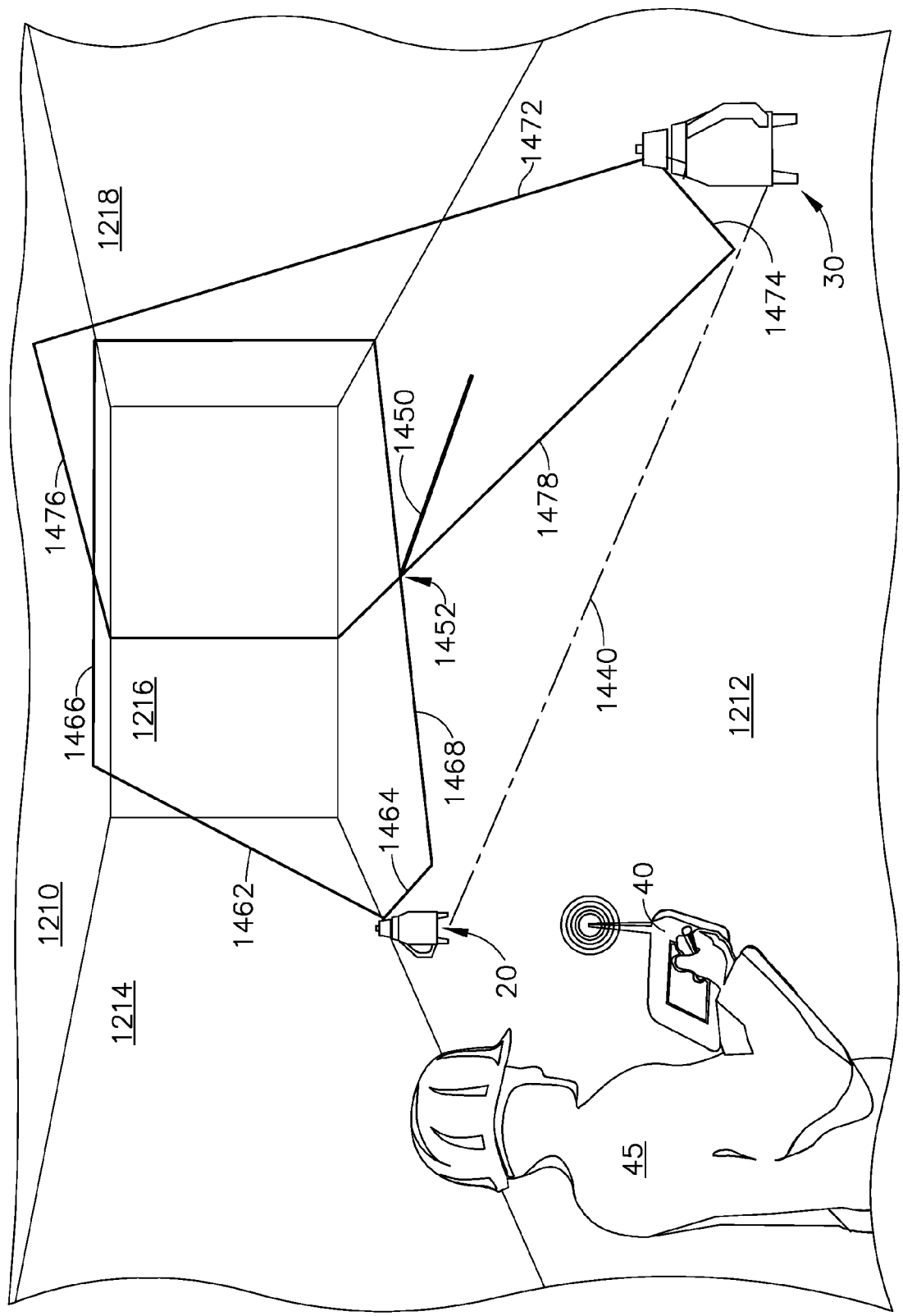

Referring now to FIG. 49, the two base units have their fan beams aimed at (or proximal to) one end of the rod, at a point 1452 (see step 1640). Base unit 20 emits a fan beam with an upper laser limit edge 1462 that creates a upper ceiling line 1466; it also emits a lower laser limit edge 1464, which creates a laser floor line 1468 that intersects the end point 1452 of the rod. Base unit 30 also has its fan beam turned on which emits an upper limit fan beam edge 1472 and a lower limit fan beam edge 1474. These create a ceiling laser line 1476 and a floor laser line 1478, and this last line intersects the point 1452. Once this intersection point is established by the two fan beams, that point can become a benchmark, if desired. The recorded azimuth angles and the established alignment axis will allow that point to be entered into a virtual floor plan on the remote unit 40 (see step 1642). At this time, the floor plan is not scaled.

Figure 50:
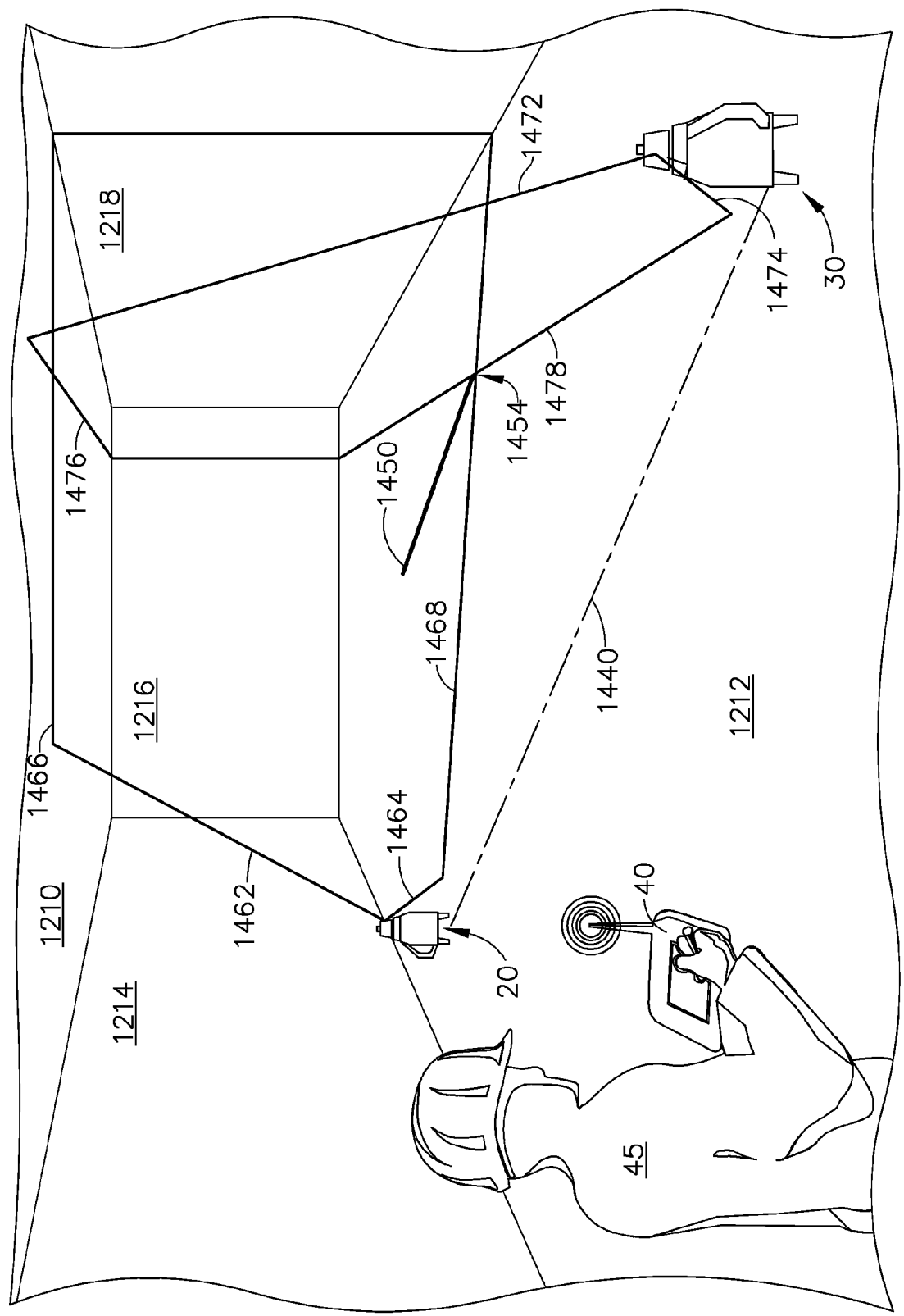

Referring now to FIG. 50, the two fan beams of the base units are now directed at (or proximal to) the opposite end of the fixed rod, at a point 1454 (see step 1650). Once that point has been intersected by the two fan beams, the azimuth angles of the base units can be recorded, and the floor plan on the remote unit 40 will receive that information (see step 1652). Since the rod 1450 is of a known length, the room can now be scaled, and all points of the virtual floor plan can be related to a true physical distance and axis transformation can take place (see step 1654).

The fixed rod 1450 can be physically constructed in a great many numbers of ways. The surface of the rod preferably will have some type of indicia thereon to provide two precise locations on the rod that are to be used for the intersection points 1452 and 1454. Such indicia can be of four general categories: (1) a marking directly on the rod's surface, (2) a protrusion on the rod's surface, presumably one that extends upward to make its appearance more visible, (3) an indentation (such as a notch) in the rod's surface, or (4) a fixture that can be used to hold an active target—in other words, active targets could be affixed to one or both ends of the rod. The indicia can be located directly at the two ends of the rod (e.g., along the rod's longitudinal axis), or the indicia can be located very near the two ends; in either case, the two indicia locations are deemed to be proximal to the two ends of the rod. And in all cases the distance between the two indicia points will be the "known actual length" that is of importance in establishing the true (actual, or physical) sizes of the jobsite for the virtual floor plan.

It will be understood that, for all of the systems described above, the laser fan beams represent a static laser system. In other words, the laser light itself is not moving along the vertical plane, but instead is at a static position. Moreover, even if a rotating laser line or beam is used instead of a pure fan beam, or if a dithering laser line or beam is used (instead of a fan beam), this still represents a static system, because the overall effect of those dithering/rotating laser beams is a single plane of laser light that is fixed in place, and it makes no difference exactly where the laser beam is aimed at a given instant in time, because they all sweep quickly enough that it will make no difference to the user. It will also make no difference to the equipment being used to create the alignment axis or the benchmark axes, or the points of interest axes. This is quite different than certain conventional systems known in the prior art, in which the laser beams sweep through various angles, and tend to intercept each other only at certain points in time to establish certain positional relationships, but only during certain moments. Those are the opposite of "static" pieces of equipment.

It will be understood that some of the logical operations described in relation to the flow charts of FIGS. 5-7 and FIGS. 51-56 can be implemented in electronic equipment using sequential logic (such as by using microprocessor technology), or using a logic state machine, or perhaps by discrete logic; it even could be implemented using parallel processors. One preferred embodiment may use a microprocessor or microcontroller (e.g., one of the microprocessor 110, 210, or 310) to execute software instructions that are stored in memory cells within an ASIC. In fact, the one entire microprocessor (or a microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the point coordinates data stored, for example, in memory elements 312 or 316), or perhaps by a type of memory device not yet invented.

It will also be understood that the precise logical operations depicted in the flow charts of FIGS. 5-7 and FIGS. 51-56, and discussed above, could be somewhat modified to perform similar, although not exact, functions without departing from the principles of the technology disclosed herein. The exact nature of some of the decision steps and other commands in these flow charts are directed toward specific future models of laser transmitter and receiver systems, and floor layout portable computers (those involving Trimble Navigation laser and floor layout equipment, for example) and certainly similar, but somewhat different, steps would be taken for use with other models or brands of laser equipment and floor layout computer systems in many instances, with the overall inventive results being the same.

With regard to process or method steps that are described herein, it will be understood that the order in which some of the steps occur is not always important or critical to correct interpretation of the technology disclosed herein. This is true with respect to some of the method steps that are recited in the appended claims. For example, in the flow chart on FIG. 55, step 1602 (establishing an alignment axis between the two base units) can occur before the active target is placed on the floor of the jobsite, which is part of the previous step 1600 on that flow chart. As another example, after base unit "A" has been aimed at the active target in step 1610, a portion of the step 1614 could be performed (i.e., recording the azimuth angle for base unit "A") before the step 1612 occurs, which aims base unit "B" at the active target. While it is true that the method steps must proceed in a logical order, there is more than one possible logical order in many of the methodologies for the technology disclosed herein—i.e., there can be "parallel" logical flows in some cases. What is important is that the necessary steps all occur in one of the possible logical orders.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; or a vertical wall structure could be positioned at or near a specific point on a horizontal floor or ceiling surface; such a relationship could be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A base unit for use in a layout and point transfer system, said base unit comprising:
   a laser light transmitter that emits a substantially vertical first plane of laser light, said laser light transmitter being rotatable about a substantially vertical axis;
   a laser light receiver having:
   (a) a null-position photosensor that detects laser light emitted by an external laser light source that emits a substantially vertical second plane of laser light, wherein said null-position photosensor is mounted to detect an offset position of where said second plane of laser light strikes said base unit in a substantially horizontal direction with respect to a predetermined location on said base unit, and
   (b) an amplifier circuit that is in communication with said null-position photosensor; and
   a leveling mechanism.

2. The base unit of claim 1, further comprising:
   (a) a distance measuring device that is rotatable about said substantially vertical axis; and
   (b) an azimuth motor drive for automatic control of an aiming position of said laser light transmitter and said distance measuring device.

3. The base unit of claim 1, wherein said laser light transmitter comprises one of: (a) a fan beam laser light emitting unit; (b) a rotating laser light beam emitting unit; and (c) a dithering laser light beam emitting unit.

4. The base unit of claim 1, further comprising: a distance measuring device that is rotatable about said substantially vertical axis;
   wherein:
   (a) said distance measuring device comprises a laser distance meter; and
   (b) a laser light beam emitted by said laser distance meter is coplanar with said substantially vertical first plane of laser light emitted by said laser light transmitter.

5. The base unit of claim 4, wherein said laser distance meter comprises a modulated light laser transmitter, a modulated light laser receiver, and a processing circuit that determines a flight time of a modulated light laser beam that is emitted by said modulated light laser transmitter until its reflected light beam is received by said laser receiver, and converts said flight time into a distance.

6. The base unit of claim 1, further comprising: a wireless transmitter and a receiver for communicating signals with a remote unit that allows a user to enter commands to said base unit.

7. The base unit of claim 1, further comprising: an angle encoder for automatic position sensing in an azimuth direction.

8. A method for setting up a layout and point transfer system, said method comprising:
   (a) providing a first base unit which includes a first processing circuit, a first communications circuit, a first azimuth angle measuring instrument, and a rotatable first laser light transmitter that emits a first laser light plane;
   (b) providing a second base unit which includes a second processing circuit, a second communications circuit, a second azimuth angle measuring instrument, and a rotatable second laser light transmitter that emits a second laser light plane;
   (c) providing a remote unit that includes a third processing circuit, a third communications circuit, a memory circuit, a display, and an input sensing device that allows a user to enter commands to said remote unit, said remote unit being in communication with said first and second base units;
   (d) positioning said first base unit and said second base unit at two different locations on a solid surface of a jobsite;
   (e) determining an alignment axis between said first base unit and said second base unit;
   (f) starting a new virtual jobsite floor plan in said memory circuit of the remote unit;
   (g) selecting a first physical point on said jobsite and aiming said first laser light transmitter and said second laser light transmitter so that said first physical point is indicated by intersecting laser light lines that are produced by said first and second laser light planes; determining a first set of azimuth angles of said first and second laser light transmitters; and recording said first set of azimuth angles in said memory circuit of the remote unit, and thereby creating a first benchmark for said virtual floor plan stored in said memory circuit;
   (h) selecting a second physical point on said jobsite and aiming said first laser light transmitter and said second laser light transmitter so that said second physical point is indicated by intersecting laser light lines that are produced by said first and second laser light planes; determining a second set of azimuth angles of said first and second laser light transmitters; and recording said second set of azimuth angles in said memory circuit of the remote unit, and thereby creating a second benchmark for said virtual floor plan stored in said memory circuit;
   (i) determining an actual distance between said first benchmark and said second benchmark, and recording said actual distance in said memory circuit of the remote unit; and
   (j) scaling said virtual floor plan to actual dimensions of said jobsite, based upon said actual distance between said first and second benchmarks.

9. The method of claim 8, wherein said first physical point comprises a visible feature that is selected by said user.

10. The method of claim 9, wherein said first physical point is located at a corner of an existing room on said jobsite.

11. The method of claim 8, wherein said first and second base units each include a motorized azimuth drive that is controlled, respectively, by said first and second processing circuits, and further comprising the step of:
   controlling, by said user of said remote unit, the aiming of said first and second laser light transmitters.

12. A method for determining a perpendicular line up to a wall, said method comprising:
   (a) providing a base unit which includes a processing circuit, an azimuth angle measuring instrument, a rotatable laser light transmitter that emits a laser light plane, and a rotatable distance measuring device that measures distance to a target;
   (b) positioning said base unit at a user-selected location on a solid surface of a space on a jobsite;
   (c) scanning a wall of said space by rotating said distance measuring device and recording a plurality of angles and distances to said wall for a plurality of angular positions;
   (d) determining two angular positions where a distance to said wall is substantially equal at both said angular positions; and
   (e) aiming said laser light transmitter at an angular direction that bi-sects said two angular positions, and turning on said laser light transmitter so that it creates a visible laser light line along said solid surface, thereby indicating a visible perpendicular line to said wall.

13. The method of claim 12, further comprising the step of:
(a) creating a first chalk line along said indicated visible perpendicular line.

14. The method of claim 13, further comprising the step of:
(a) creating a second perpendicular chalk line by offsetting from said first chalk line.

15. The method of claim 13, further comprising the steps of:
(a) moving said base unit to a different user-selected location on said solid surface;
(b) scanning said wall by rotating said distance measuring device and recording a second plurality of angles and distances to said wall for a plurality of angular positions;
(c) determining two different angular positions where a second distance to said wall is substantially equal at both said different angular positions;
(d) aiming said laser light transmitter at an angular direction that bi-sects said two different angular positions, and turning on said laser light transmitter so that it creates a visible laser light line along said solid surface, thereby indicating a second visible perpendicular line to said wall; and
(a) creating a second perpendicular chalk line along said indicated second visible perpendicular line.

16. A method for setting up a layout and point transfer system, said method comprising:
(a) providing a first base unit which includes a first processing circuit, a first communications circuit, a first azimuth angle measuring instrument, a rotatable first laser light transmitter that emits a first laser light plane, and a rotatable first distance measuring device that measures distance to a target;
(b) providing a second base unit which includes a second processing circuit, a second communications circuit, a second azimuth angle measuring instrument, and a rotatable second laser light transmitter that emits a second laser light plane;
(c) providing a remote unit that includes a third processing circuit, a third communications circuit, a memory circuit, a display, and an input sensing device that allows a user to enter commands to said remote unit, said remote unit being in communication with said first and second base units;
(d) positioning said first base unit and said second base unit at two different locations on a solid surface of a jobsite;
(e) determining an alignment axis between said first base unit and said second base unit;
(f) starting a new virtual jobsite floor plan in said memory circuit of the remote unit, for a field of work at said jobsite;
(g) selecting a first physical point on said solid surface of the jobsite and aiming said first laser light transmitter and said second laser light transmitter so that said first physical point is indicated by both laser light lines that are produced by said first and second laser light planes;
(h) determining a first set of azimuth angles of said first and second laser light transmitters;
(i) determining a first distance between said first physical point and said first distance measuring device;
(j) recording said first set of azimuth angles and first distance in said memory circuit of the remote unit, thereby creating a first benchmark for said virtual floor plan stored in said memory circuit; and
(k) calculating a second distance between said first and second base units, thereby scaling the field of work.

17. The method of claim 16, further comprising the steps of: orienting said field of work with respect to said alignment axis by:
(a) selecting a second physical point on said solid surface of the jobsite and aiming said first laser light transmitter and said second laser light transmitter so that said second physical point is indicated by both laser light lines that are produced by said first and second laser light planes;
(b) determining a second set of azimuth angles of said first and second laser light transmitters;
(c) determining a second distance between said second physical point and said first distance measuring device; and
(c) recording said second set of azimuth angles and second distance in said memory circuit of the remote unit, thereby creating a second benchmark for said virtual floor plan stored in said memory circuit which is scaled for said field of work.

18. The method of claim 16, wherein said first physical point comprises a wall of an existing space on said jobsite.

19. The method of claim 16, wherein said first physical point comprises a corner of two intersecting walls of an existing space on said jobsite.

20. The method of claim 16, further comprising the step of: laying out other points of interest, which will be automatically scaled for actual distances in said field of work by the virtual floor plan.

21. A method for setting up a layout and point transfer system, said method comprising:
(a) providing a first base unit which includes a first processing circuit, a first communications circuit, a first azimuth angle measuring instrument, a rotatable first laser light transmitter that emits a first laser light plane, and a rotatable first distance measuring device that measures distance to a target;
(b) providing a second base unit which includes a second processing circuit, a second communications circuit, a rotatable second laser light transmitter that emits a second laser light plane, and a rotatable second distance measuring device that measures distance to a target;
(c) providing a remote unit that includes a third processing circuit, a third communications circuit, a memory circuit, a display, and an input sensing device that allows a user to enter commands to said remote unit, said remote unit being in communication with said first and second base units;
(d) positioning said first base unit and said second base unit at two different locations on a solid surface of a jobsite;
(e) determining an alignment axis between said first base unit and said second base unit;
(f) starting a new virtual jobsite floor plan in said memory circuit of the remote unit, for a field of work at said jobsite;
(g) selecting a first physical point on said solid surface of the jobsite and aiming said first laser light transmitter and said second laser light transmitter so that said first physical point is indicated by both laser light lines that are produced by said first and second laser light planes;
(h) determining a first azimuth angle of said first laser light transmitter;
(i) determining a first set of distances between said first physical point and said first and second distance measuring devices;
(j) recording said first azimuth angle and first set of distances in said memory circuit of the remote unit, thereby creating a first benchmark for said virtual floor plan stored in said memory circuit; and (k) calculating a second distance between said first and second base units, thereby scaling the field of work.

22. The method of claim 21, further comprising the steps of: orienting said field of work with respect to said alignment axis by:

(a) selecting a second physical point on said solid surface of the jobsite and aiming said first laser light transmitter and said second laser light transmitter so that said second physical point is indicated by both laser light lines that are produced by said first and second laser light planes;

(b) determining a second azimuth angle of said first laser light transmitter;

(c) determining a second set of distances between said second physical point and said first and second distance measuring devices; and (c) recording said second azimuth angle and second set of distances in said memory circuit of the remote unit, thereby creating a second benchmark for said virtual floor plan stored in said memory circuit which is scaled for said field of work.

23. A method for setting up a layout and point transfer system, said method comprising:

(a) providing a first base unit which includes a first processing circuit, a first communications circuit, a first azimuth angle measuring instrument, and a rotatable first laser light transmitter that emits a first laser light plane;

(b) providing a second base unit which includes a second processing circuit, a second communications circuit, a second azimuth angle measuring instrument, and a rotatable second laser light transmitter that emits a second laser light plane;

(c) providing a remote unit that includes a third processing circuit, a third communications circuit, a memory circuit, a display, and an input sensing device that allows a user to enter commands to said remote unit, said remote unit being in communication with said first and second base units;

(d) providing a fixed-length rod, said rod having a first indicia proximal to a first end and a second indicia proximal to a second, opposite end along a longitudinal axis, said rod having a known actual length between said first and second indicia;

(e) positioning said first base unit and said second base unit at two different locations on a solid surface of a jobsite, and positioning said fixed-length rod at a third location on said solid surface;

(f) determining an alignment axis between said first base unit and said second base unit;

(g) starting a new virtual jobsite floor plan in said memory circuit of the remote unit;

(h) aiming said first laser light transmitter and said second laser light transmitter so that said first indicia of the rod is indicated by intersecting laser light lines that are produced by said first and second laser light planes; determining a first set of azimuth angles of said first and second laser light transmitters; and recording said first set of azimuth angles in said memory circuit of the remote unit, and thereby creating a first benchmark for said virtual floor plan stored in said memory circuit;

(i) aiming said first laser light transmitter and said second laser light transmitter so that said second indicia of the rod is indicated by intersecting laser light lines that are produced by said first and second laser light planes; determining a second set of azimuth angles of said first and second laser light transmitters; and recording said second set of azimuth angles in said memory circuit of the remote unit, and thereby creating a second benchmark for said virtual floor plan stored in said memory circuit; and (j) scaling said virtual floor plan to said known actual length, which represents the physical distance between said first and second benchmarks.

24. The method of claim 23, wherein: at least one of said first end and said second end of the rod is placed proximal to a point of interest as selected by said user.

25. The method of claim 23, wherein said first and second indicia comprise at least one of:

(a) a marking on a surface of said rod;
(b) a protrusion on a surface of said rod; and
(c) an indentation on a surface of said rod.

26. The method of claim 23, wherein at least one of said first and second indicia comprise a fixture for holding at least one active target onto said rod.

27. A base unit for use in a layout and point transfer system, said base unit comprising:

a laser light transmitter that emits a substantially vertical first plane of laser light, said laser light transmitter being rotatable about a substantially vertical axis;

a laser light receiver having:

(a) a null-position photosensor that detects laser light emitted by an external laser light source that emits a substantially vertical second plane of laser light, wherein said null-position photosensor is mounted to detect laser light offsets between a predetermined location on said null-position photosensor and a position where said second plane of laser light strikes said null-position photosensor in a substantially horizontal direction, and (b) an amplifier circuit that is in communication with said null-position photosensor; and a leveling mechanism.

28. The base unit of claim 27, wherein:

(a) said null-position photosensor comprises a butt cell arrangement; and
(b) said predetermined location on said null-position photosensor comprises a deadband width between two photosensitivity areas of said butt cell arrangement.

* * * * *